(12) United States Patent
Forood et al.

(10) Patent No.: US 10,178,530 B2
(45) Date of Patent: Jan. 8, 2019

(54) SYSTEM AND METHOD FOR PERFORMING ASSET AND CROWD TRACKING IN AN IOT SYSTEM

(71) Applicant: AFERO, INC., Los Altos, CA (US)

(72) Inventors: Houman Forood, San Francisco, CA (US); Joe Britt, Los Altos, CA (US); Omar Zakaria, Santa Clara, CA (US); Justin Lee, Berkeley, CA (US); Gilbert Gallardo, Los Altos, CA (US)

(73) Assignee: Afero, Inc., Los Altos, CA (US)

( * ) Notice: Subject to any disclaimer, the term of this patent is extended or adjusted under 35 U.S.C. 154(b) by 0 days.

(21) Appl. No.: 14/967,702

(22) Filed: Dec. 14, 2015

(65) Prior Publication Data

US 2017/0171204 A1 Jun. 15, 2017

(51) Int. Cl.
*H04W 4/70* (2018.01)
*G08B 21/04* (2006.01)
(Continued)

(52) U.S. Cl.
CPC .............. *H04W 4/70* (2018.02); *G08B 3/10* (2013.01); *G08B 13/1436* (2013.01);
(Continued)

(58) Field of Classification Search
CPC combination set(s) only.
See application file for complete search history.

(56) References Cited

U.S. PATENT DOCUMENTS 4,654,793 A 3/1987 Elrod
5,574,750 A 11/1996 Peponides et al.
(Continued)

FOREIGN PATENT DOCUMENTS

CN 1054693 A 9/1991
EP 2806356 A1 11/2014
(Continued)

OTHER PUBLICATIONS

Final Office Action from U.S. Appl. No. 14/673,551, dated Feb. 23, 2017, 36 pages.
(Continued)

*Primary Examiner* — Phy Anh T Vu
(74) *Attorney, Agent, or Firm* — Nicholson De Vos Webster & Elliott LLP

(57) ABSTRACT

A system and method are described for performing asset and user tracking. For example, one embodiment of a system comprises: an Internet of Things (IoT) device or hub ("IoT device/hub") comprising authorized user detection logic to detect a security IoT device of a user in wireless proximity to the IoT device/hub, the IoT device/hub to be affixed or integrated within a data processing asset; location detection logic to determine a current location of the IoT device/hub based on signals received from one or more wireless devices within its wireless range; wherein the authorized user detection logic is to arm the location detection logic upon detecting that the security IoT device has moved out of wireless proximity to the IoT device/hub; and wherein the location detection logic is to generate an alert and/or notification after being armed by the authorized user detection logic upon detecting that the IoT device/hub has moved outside of a designated protected location, the alert and/or notification being transmitted from the IoT device/hub to an IoT service.

13 Claims, 60 Drawing Sheets

(51) Int. Cl.
*H04W 4/00* (2018.01)
*G08B 3/10* (2006.01)
*G08B 13/14* (2006.01)
*G08B 25/08* (2006.01)
*H04W 4/38* (2018.01)
*H04W 4/029* (2018.01)
*H04W 4/80* (2018.01)

(52) U.S. Cl.
CPC ............ *G08B 21/04* (2013.01); *G08B 25/08* (2013.01); *H04W 4/00* (2013.01); *H04W 4/029* (2018.02); *H04W 4/38* (2018.02); *H04W 4/80* (2018.02)

(56) References Cited

U.S. PATENT DOCUMENTS

| | | |
|---|---|---|
| 6,199,161 B1 | 3/2001 | Ahvenainen |
| 7,142,674 B2 | 11/2006 | Brickell |
| 7,146,613 B2 | 12/2006 | Chauvel et al. |
| 7,165,180 B1 | 1/2007 | Ducharme |
| 7,234,062 B2 * | 6/2007 | Daum ................ H04L 12/2803 380/277 |
| 7,493,661 B2 | 2/2009 | Liu et al. |
| 7,548,623 B2 | 6/2009 | Manabe |
| 7,779,136 B2 | 8/2010 | Krishnan |
| 7,903,822 B1 | 3/2011 | Hair et al. |
| 7,966,021 B2 | 6/2011 | Dietrich et al. |
| 8,396,449 B2 | 3/2013 | Hatton |
| 8,477,948 B2 | 7/2013 | Shon et al. |
| 8,570,168 B2 | 10/2013 | Logan et al. |
| 8,700,236 B1 | 4/2014 | Berman |
| 8,761,821 B2 | 6/2014 | Tibbitts et al. |
| 8,903,351 B2 | 12/2014 | Berry et al. |
| 9,319,223 B2 | 4/2016 | Nix |
| 9,319,317 B1 | 4/2016 | Spadaro et al. |
| 9,338,638 B1 | 5/2016 | Palin et al. |
| 9,378,634 B1 | 6/2016 | Kashyap et al. |
| 9,832,173 B2 | 11/2017 | Britt et al. |
| 2002/0013784 A1 | 1/2002 | Swanson |
| 2002/0055924 A1 | 5/2002 | Liming |
| 2002/0142746 A1 | 10/2002 | Li et al. |
| 2003/0043073 A1 * | 3/2003 | Gray ................ G01S 5/0215 342/465 |
| 2003/0120555 A1 | 6/2003 | Kitagawa |
| 2003/0174836 A1 | 9/2003 | Vadekar |
| 2004/0047324 A1 | 3/2004 | Diener |
| 2004/0174264 A1 * | 9/2004 | Reisman ................ G07C 1/10 340/573.4 |
| 2004/0203826 A1 | 10/2004 | Sugar et al. |
| 2004/0253923 A1 | 12/2004 | Braley et al. |
| 2006/0018485 A1 | 1/2006 | Diefenderfer et al. |
| 2006/0135064 A1 | 6/2006 | Cho et al. |
| 2006/0185393 A1 * | 8/2006 | Cherry ................ A44C 25/001 63/40 |
| 2006/0195883 A1 | 8/2006 | Proctor et al. |
| 2007/0064725 A1 | 3/2007 | Minami et al. |
| 2007/0126560 A1 | 6/2007 | Seymour et al. |
| 2007/0150740 A1 | 6/2007 | Davis et al. |
| 2007/0205876 A1 * | 9/2007 | Nguyen ................ B60R 25/00 340/426.12 |
| 2008/0001764 A1 * | 1/2008 | Douglas ............ G07C 9/00111 340/573.1 |
| 2008/0026718 A1 | 1/2008 | Wangard et al. |
| 2008/0039203 A1 | 2/2008 | Ackley et al. |
| 2008/0120701 A1 | 5/2008 | Schiller et al. |
| 2008/0129545 A1 | 6/2008 | Johnson et al. |
| 2008/0180222 A1 | 7/2008 | Hollister et al. |
| 2008/0200195 A1 | 8/2008 | Abe et al. |
| 2008/0204555 A1 | 8/2008 | Hughes et al. |
| 2008/0312946 A1 | 12/2008 | Valentine et al. |
| 2009/0011739 A1 | 1/2009 | Cofta |
| 2009/0019423 A1 | 1/2009 | Halter et al. |
| 2009/0061806 A1 | 3/2009 | Saito et al. |
| 2009/0082017 A1 | 3/2009 | Chang et al. |
| 2009/0158921 A1 * | 6/2009 | Norman ............ F41H 13/0018 89/1.11 |
| 2009/0315714 A1 * | 12/2009 | Sher ........................ G06F 21/88 340/568.1 |
| 2009/0327996 A1 | 12/2009 | Siegemund et al. |
| 2010/0030695 A1 * | 2/2010 | Chen .................... G06Q 20/204 705/67 |
| 2010/0075655 A1 | 3/2010 | Howarter et al. |
| 2010/0091995 A1 * | 4/2010 | Chen .................... H04L 63/0492 380/278 |
| 2010/0115291 A1 | 5/2010 | Buer |
| 2010/0122083 A1 | 5/2010 | Gim et al. |
| 2010/0135494 A1 | 6/2010 | Armknecht et al. |
| 2010/0201482 A1 | 8/2010 | Robertson et al. |
| 2011/0081860 A1 | 4/2011 | Brown et al. |
| 2011/0151768 A1 | 6/2011 | Snider et al. |
| 2011/0191787 A1 | 8/2011 | Poleg et al. |
| 2011/0200188 A1 | 8/2011 | Ghouti et al. |
| 2011/0252235 A1 | 10/2011 | Dolan et al. |
| 2011/0302078 A1 | 12/2011 | Failing |
| 2011/0319088 A1 | 12/2011 | Zhou et al. |
| 2012/0011360 A1 | 1/2012 | Engels et al. |
| 2012/0036552 A1 | 2/2012 | Dare et al. |
| 2012/0079045 A1 | 3/2012 | Plotkin |
| 2012/0108230 A1 * | 5/2012 | Stepanian ................ G06F 21/10 455/422.1 |
| 2012/0122461 A1 | 5/2012 | Hossain et al. |
| 2012/0142271 A1 | 6/2012 | Zhodzishsky et al. |
| 2012/0187187 A1 | 7/2012 | Duff et al. |
| 2012/0225640 A1 | 9/2012 | Bosch et al. |
| 2012/0230210 A1 | 9/2012 | Reed |
| 2012/0322384 A1 | 12/2012 | Zerr et al. |
| 2012/0331287 A1 | 12/2012 | Bowman et al. |
| 2013/0012123 A1 | 1/2013 | Deluca |
| 2013/0012134 A1 | 1/2013 | Jin et al. |
| 2013/0042244 A1 | 2/2013 | Li et al. |
| 2013/0054863 A1 | 2/2013 | Imes et al. |
| 2013/0085614 A1 | 4/2013 | Wenzel et al. |
| 2013/0154819 A1 | 6/2013 | Stefanovski et al. |
| 2013/0173484 A1 | 7/2013 | Wesby |
| 2013/0190010 A1 | 7/2013 | Chiou et al. |
| 2013/0246996 A1 | 9/2013 | Duggal et al. |
| 2013/0257604 A1 | 10/2013 | Mirle et al. |
| 2013/0307702 A1 | 11/2013 | Pal et al. |
| 2013/0342314 A1 | 12/2013 | Chen et al. |
| 2014/0020073 A1 | 1/2014 | Ronda et al. |
| 2014/0038526 A1 | 2/2014 | Ennis et al. |
| 2014/0039691 A1 | 2/2014 | Gupta et al. |
| 2014/0047322 A1 | 2/2014 | Kim et al. |
| 2014/0066098 A1 | 3/2014 | Stern et al. |
| 2014/0075075 A1 | 3/2014 | Morrill et al. |
| 2014/0075198 A1 | 3/2014 | Peirce et al. |
| 2014/0098957 A1 | 4/2014 | Larsson |
| 2014/0148196 A1 | 5/2014 | Bassan-Eskenazi et al. |
| 2014/0155031 A1 | 6/2014 | Lee et al. |
| 2014/0179338 A1 | 6/2014 | Shang et al. |
| 2014/0225730 A1 * | 8/2014 | DePascale ......... G08B 21/0288 340/539.13 |
| 2014/0244825 A1 | 8/2014 | Cao et al. |
| 2014/0270166 A1 | 9/2014 | Avanzi et al. |
| 2014/0279546 A1 | 9/2014 | Poole et al. |
| 2014/0281547 A1 | 9/2014 | Modzelewski et al. |
| 2014/0282357 A1 | 9/2014 | Padaliak et al. |
| 2014/0289366 A1 | 9/2014 | Choi et al. |
| 2014/0304381 A1 | 10/2014 | Savolainen et al. |
| 2014/0310515 A1 | 10/2014 | Kim et al. |
| 2014/0317293 A1 | 10/2014 | Shatzkamer |
| 2014/0329467 A1 | 11/2014 | Ewing et al. |
| 2014/0351312 A1 | 11/2014 | Lu et al. |
| 2014/0351790 A1 | 11/2014 | Ghose et al. |
| 2015/0006696 A1 | 1/2015 | Hershberg |
| 2015/0019553 A1 | 1/2015 | Shaashua et al. |
| 2015/0019714 A1 | 1/2015 | Shaashua et al. |
| 2015/0029880 A1 | 1/2015 | Burns et al. |
| 2015/0035672 A1 * | 2/2015 | Housley ............ G08B 21/0275 340/539.13 |
| 2015/0058802 A1 | 2/2015 | Turaj et al. |
| 2015/0067329 A1 | 3/2015 | Ben et al. |
| 2015/0067580 A1 | 3/2015 | Um et al. |

(56) References Cited

U.S. PATENT DOCUMENTS

| | | |
|---|---|---|
| 2015/0071139 A1 | 3/2015 | Nix |
| 2015/0089568 A1 | 3/2015 | Sprague et al. |
| 2015/0106616 A1 | 4/2015 | Nix |
| 2015/0112963 A1 | 4/2015 | Mojtahedi et al. |
| 2015/0113275 A1 | 4/2015 | Kim et al. |
| 2015/0113592 A1 | 4/2015 | Curtis et al. |
| 2015/0119070 A1 | 4/2015 | Harris et al. |
| 2015/0121470 A1 | 4/2015 | Rongo et al. |
| 2015/0134761 A1 | 5/2015 | Sharma et al. |
| 2015/0148989 A1 | 5/2015 | Cooper et al. |
| 2015/0149042 A1 | 5/2015 | Cooper et al. |
| 2015/0201022 A1 | 7/2015 | Kim et al. |
| 2015/0207796 A1 | 7/2015 | Love et al. |
| 2015/0222517 A1 | 8/2015 | McLaughlin et al. |
| 2015/0229563 A1 | 8/2015 | Luo |
| 2015/0288667 A1 | 10/2015 | Alder |
| 2015/0295713 A1 | 10/2015 | Oxford |
| 2015/0296325 A1 | 10/2015 | Lee et al. |
| 2015/0312041 A1 | 10/2015 | Choi |
| 2015/0319046 A1 | 11/2015 | Plummer et al. |
| 2015/0324181 A1 | 11/2015 | Segal |
| 2015/0326398 A1 | 11/2015 | Modarresi et al. |
| 2015/0358157 A1 | 12/2015 | Zhang et al. |
| 2015/0358777 A1* | 12/2015 | Gupta ............... H04L 12/2807 370/254 |
| 2015/0365787 A1 | 12/2015 | Farrell |
| 2016/0006729 A1 | 1/2016 | Yang et al. |
| 2016/0063767 A1 | 3/2016 | Lee et al. |
| 2016/0085960 A1 | 3/2016 | Priev et al. |
| 2016/0112870 A1 | 4/2016 | Pathuri |
| 2016/0127874 A1 | 5/2016 | Kingsmill et al. |
| 2016/0149696 A1 | 5/2016 | Winslow et al. |
| 2016/0150350 A1* | 5/2016 | Ingale ............... H04W 4/70 370/255 |
| 2016/0150357 A1 | 5/2016 | Jung et al. |
| 2016/0182228 A1 | 6/2016 | Smith et al. |
| 2016/0182459 A1 | 6/2016 | Britt et al. |
| 2016/0182549 A1 | 6/2016 | Bachar et al. |
| 2016/0292938 A1 | 10/2016 | Zakaria |
| 2016/0295364 A1 | 10/2016 | Zakaria |
| 2016/0379464 A1* | 12/2016 | Sedayao ............... G08B 21/22 340/686.6 |
| 2017/0127304 A1 | 5/2017 | Britt et al. |
| 2017/0331860 A1 | 11/2017 | Ofversten et al. |
| 2017/0332330 A1* | 11/2017 | Dhandu ............... H04W 4/70 |

FOREIGN PATENT DOCUMENTS

| | | |
|---|---|---|
| WO | 2013179634 A1 | 12/2013 |
| WO | 2014131021 A2 | 8/2014 |

OTHER PUBLICATIONS

Non-Final Office Action from U.S. Appl. No. 14/791,373, dated Dec. 30, 2016, 18 pages.
Notice of Allowance from U.S. Appl. No. 14/673,582, dated Mar. 1, 2017, 28 pages.
Qiao Q.,"The Design of Electronic Thermometer Based on Bluetooth Low Energy," IEEE, 2013, pp. 1-5.
Final Office Action from U.S. Appl. No. 14/575,463 dated Aug. 30, 2016, 25 pages.
Galeev, "Bluetooth 4.0: An introduction to Bluetooth Low Energy" (Part I and II), EETimes, accessed on eetimes.com, Jul. 2011, 14 pages.
Hasbro Playskool Alphie toy; all pages; http://www.hasbro.com/common/documents/dad2af771c4311ddbd0b0800200c9a66/6135ABCA1989F3691034808DE78694FF.pdf.
IBM, "The IBM vision of a smarter home enabled by cloud technology", Global Electronics Industry, white paper Sep. 2010, 16 pages.
International Search Report and the Written Opinion of the International Searching Authority from counterpart PCT Application No. PCT/US2015/061308, dated Mar. 16, 2016, 16 pages.
International Search Report and the Written Opinion of the International Searching Authority from counterpart PCT Application No. PCT/US2015/065539, dated Feb. 12, 2016, 19 pages.
International Search Report and Written Opinion for Application No. PCT/US16/25069 dated Jul. 1, 2016, 11 pages.
International Search Report and Written Opinion for Application No. PCT/US2016/035161 dated Aug. 31, 2016, 9 pages.
International Search Report and Written opinion for Application No. PCT/US2016/040819 dated Oct. 31, 2016, 12 pages.
Kainda et al., Usability and Security of Out-Of-Band Channels in Secure Device Pairing Protocols, Symposium on Usable Privacy and Security (SOUPS) Jul. 2009, 12 pages.
Non-Final Office Action from U.S. Appl. No. 14/550,667 dated Dec. 17, 2015, 10 pages.
Non-Final Office Action from U.S. Appl. No. 14/550,775 dated Sep. 21, 2016, 19 pages.
Non-Final Office Action from U.S. Appl. No. 14/575,463 dated Mar. 11, 2016, 23 pages.
Non-Final Office Action from U.S. Appl. No. 14/575,535 dated Aug. 12, 2016, 11 pages.
Non-Final Office Action from U.S. Appl. No. 14/673,551 dated Oct. 21, 2016, 27 pages.
Non-Final Office Action from U.S. Appl. No. 14/673,582 dated Nov. 3, 2016, 6 pages.
Non-Final Office Action from U.S. Appl. No. 14/727,811 dated Sep. 23, 2016, 17 pages.
Non-Final Office Action from U.S. Appl. No. 14/791,371 dated Nov. 4, 2016, 16 pages.
Non-Final Office Action from U.S. Appl. No. 14/927,732 dated Aug. 15, 2016, 14 pages.
Non-Final Office Action from U.S. Appl. No. 14/927,732 dated Dec. 5, 2016, 16 pages.
Notice of Allowance from U.S. Appl. No. 14/550,667 dated Oct. 7, 2016, 3 pages.
Notice of Allowance from U.S. Appl. No. 14/550,735, dated Dec. 22, 2016, 11 pages.
Notice of Allowance dated Jul. 11, 2016 for U.S. Appl. No. 14/550,667, filed Nov. 21, 2014, 9 pages.
Perera et al, Dynamic Configuration of Sensors Using Mobile Sensor Hub in Internet o Things Paradigm, Research School of Computer Science, The Australian National University, arXiv:1302.1131 v1, Feb. 2013, 6 pages.
Restriction Requirement for U.S. Appl. No. 14/575,535 dated Apr. 11, 2016, 5 pages.
Saxena et al., "Secure Device Pairing based on a Visual Channel", Proceedings of the 2006 IEEE Symposium on Security and Privacy, ISBN: 0769525741, 2006, 7 pages.
Sye Loong Keoh, Securing the Internet of Things: A Standardization Perspective, IEEE Internet of Things Journal, vol. 1, No. 3, Jun. 2014; p. 265-275.
Wikipedia, "Bluetooth low energy" found at en.wikipedia.org/wiki/Biuetooth_low_energy, May 2010, 10 pages.
Abandonment from U.S. Appl. No. 14/575,463, dated Jul. 26, 2017, 1 page.
Abandonment from U.S. Appl. No. 14/575,535, dated May 18, 2017, 2 pages.
Blackstock et al., "IoT Interoperability: A Hub-based Approach," International Conference on the Internet of Things, 2014, pp. 79-84.
Final Office Action from U.S. Appl. No. 14/550,775, dated Apr. 6, 2017, 39 pages.
Final Office Action from U.S. Appl. No. 141927,732, dated Apr. 27, 2017, 35 pages.
International Preliminary Report on Patentability for Application No. PCT/US2015/061308, dated Jun. 1, 2017, 13 pages.
International Preliminary Report on Patentability for Application No. PCT/US2015/065539, dated Jun. 29, 2017, 17 pages.
Non-Final Office Action from U.S. Appl. No. 14/673,551, dated Aug. 25, 2017, 24 pages.
Non-Final Office Action from U.S. Appl. No. 14/799,436, dated Mar. 24, 2017, 32 pages.
Notice of Allowance from U.S. Appl. No. 14/550,735, dated Mar. 22, 2017, 32 pages.

(56) References Cited

OTHER PUBLICATIONS

Notice of Allowance from U.S. Appl. No. 14/575,463, dated Apr. 5, 2017, 35 pages.
Notice of Allowance from U.S. Appl. No. 14/727,811, dated Apr. 12, 2017, 38 pages.
Notice of Allowance from U.S. Appl. No. 14/791,371, dated May 30, 2017, 31 pages.
Notice of Allowance from U.S. Appl. No. 14/791,373, dated Apr. 21, 2017, 19 pages.
Notice of Allowance from U.S. Appl. No. 14/927,732, dated Aug. 18, 2017, 14 pages.
International Preliminary Report on Patentability for Application No. PCT/US2016/25069, dated Oct. 12, 2017, 10 pages.
Final Office Action from U.S. Appl. No. 14/550,775, dated Apr. 5, 2018, 23 pages.
Non-Final Office Action from U.S. Appl. No. 15/824,173, dated Apr. 3, 2018, 12 pages.
Notice of Allowance from U.S. Appl. No. 14/799,436, dated Apr. 6, 2018, 18 pages.
Final Office Action from U.S. Appl. No. 14/799,436, dated Nov. 28, 2017, 19 pages.
International Preliminary Report on Patentability for Application No. PCT/US2016/035161, dated Dec. 14, 2017, 8 pages.
Non-Final Office Action from U.S. Appl. No. 14/550,775, dated Oct. 6, 2017, 19 pages.
Notice of Allowance from U.S. Appl. No. 15/473,423, dated Oct. 4, 2017, 32 pages.
Bonetto R., et al., "Secure Communication for Smart IoT Devices: Protocol Stacks, Use Cases and Practical Examples," IEEE, 2012, pp. 1-7.
Final Office Action from U.S. Appl. No. 14/673,551, dated Jan. 9, 2018, 24 pages.
International Preliminary Report on Patentability for Application No. PCT/US2016/040819, dated Jan. 18, 2018, 9 pages.
Non-Final Office Action from U.S. Appl. No. 15/670,306, dated Dec. 29, 2017, 37 pages.
Corrected Notice of Allowability from U.S. Appl. No. 14/673,551, dated Jul. 3, 2018, 6 pages.
Notice of Allowance from U.S. Appl. No. 14/673,551, dated May 7, 2018, 13 pages.

\* cited by examiner

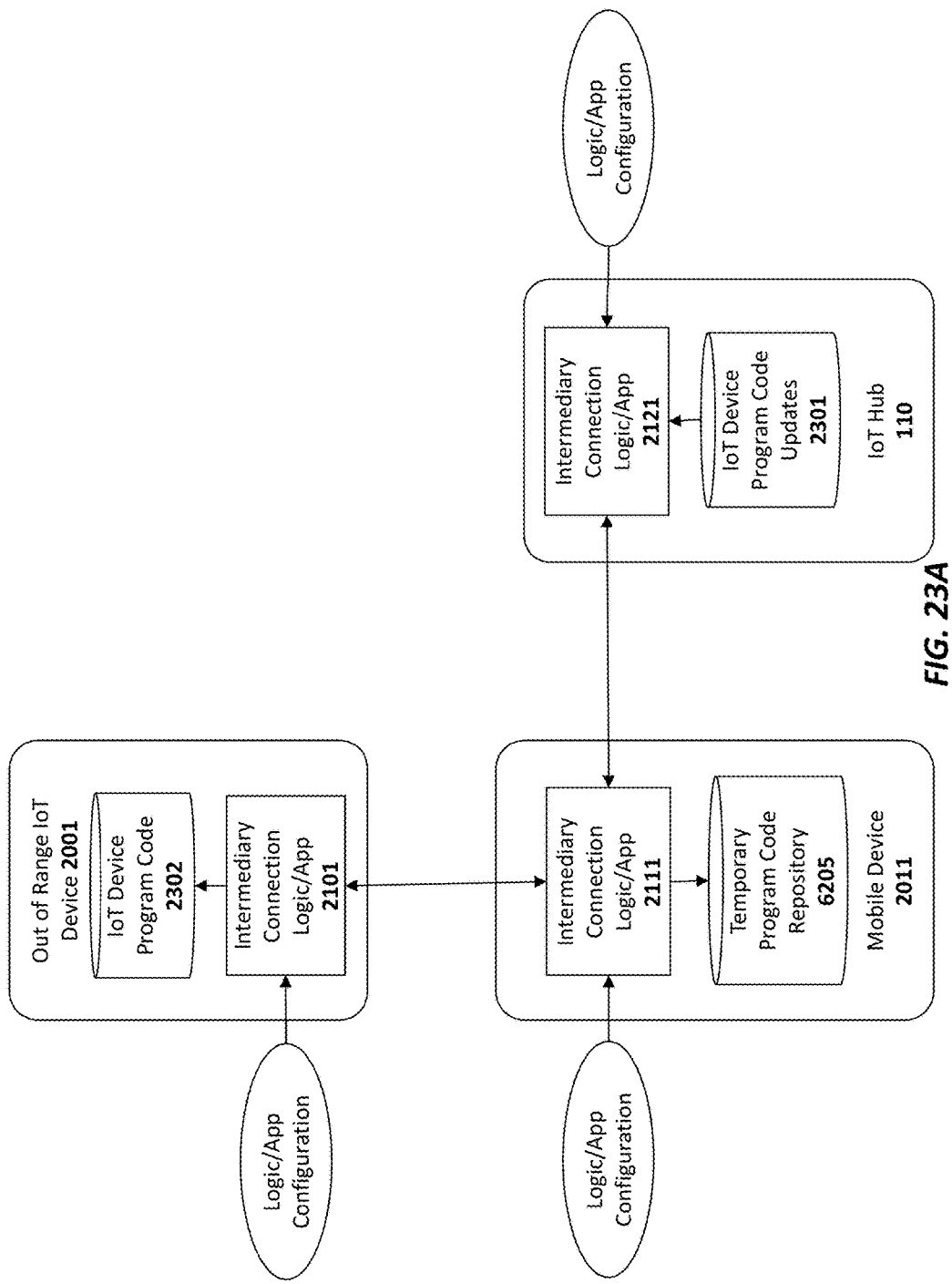

SYSTEM AND METHOD FOR PERFORMING ASSET AND CROWD TRACKING IN AN IOT SYSTEM

BACKGROUND

Field of the Invention

This invention relates generally to the field of computer systems. More particularly, the invention relates to a system and method for performing asset and crowd tracking in an IoT system.

Description of the Related Art

The "Internet of Things" refers to the interconnection of uniquely-identifiable embedded devices within the Internet infrastructure. Ultimately, IoT is expected to result in new, wide-ranging types of applications in which virtually any type of physical thing may provide information about itself or its surroundings and/or may be controlled remotely via client devices over the Internet.

IoT development and adoption has been slow due to issues related to connectivity, power, and a lack of standardization. For example, one obstacle to IoT development and adoption is that no standard platform exists to allow developers to design and offer new IoT devices and services. In order enter into the IoT market, a developer must design the entire IoT platform from the ground up, including the network protocols and infrastructure, hardware, software and services required to support the desired IoT implementation. As a result, each provider of IoT devices uses proprietary techniques for designing and connecting the IoT devices, making the adoption of multiple types of IoT devices burdensome for end users. Another obstacle to IoT adoption is the difficulty associated with connecting and powering IoT devices. Connecting appliances such as refrigerators, garage door openers, environmental sensors, home security sensors/controllers, etc, for example, requires an electrical source to power each connected IoT device, and such an electrical source is often not conveniently located.

Another problem which exists is that the wireless technologies used to interconnect IoT devices such as Bluetooth LE are generally short range technologies. Thus, if the data collection hub for an IoT implementation is outside the range of an IoT device, the IoT device will not be able to transmit data to the IoT hub (and vice versa). Consequently, techniques are needed which would allow an IoT device to provide data to an IoT hub (or other IoT device) which is out of range.

BRIEF DESCRIPTION OF THE DRAWINGS

A better understanding of the present invention can be obtained from the following detailed description in conjunction with the following drawings, in which:

FIG. 23A illustrates an embodiment in which program code and data updates are provided to the IoT device;

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

One embodiment of the invention comprises an Internet of Things (IoT) platform which may be utilized by developers to design and build new IoT devices and applications. In particular, one embodiment includes a base hardware/software platform for IoT devices including a predefined networking protocol stack and an IoT hub through which the IoT devices are coupled to the Internet. In addition, one embodiment includes an IoT service through which the IoT hubs and connected IoT devices may be accessed and managed as described below. In addition, one embodiment of the IoT platform includes an IoT app or Web application (e.g., executed on a client device) to access and configured the IoT service, hub and connected devices. Existing online retailers and other Website operators may leverage the IoT platform described herein to readily provide unique IoT functionality to existing user bases.

Figure 1A:
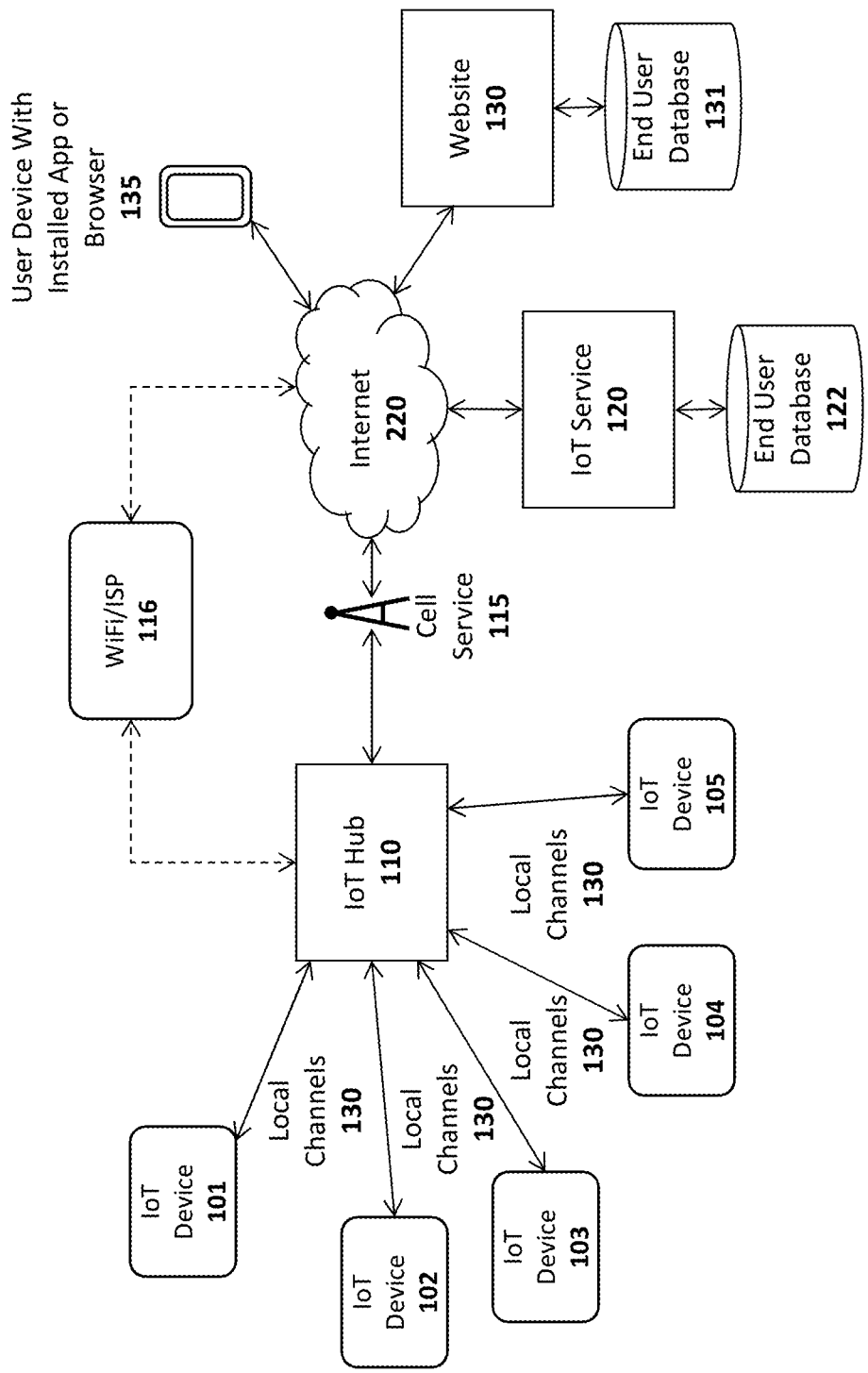
FIGS. 1A-B illustrates different embodiments of an IoT system architecture.

FIG. 1A illustrates an overview of an architectural platform on which embodiments of the invention may be implemented. In particular, the illustrated embodiment includes a plurality of IoT devices 101-105 communicatively coupled over local communication channels 130 to a central IoT hub 110 which is itself communicatively coupled to an IoT service 120 over the Internet 220. Each of the IoT devices 101-105 may initially be paired to the IoT hub 110 (e.g., using the pairing techniques described below) in order to enable each of the local communication channels 130. In one embodiment, the IoT service 120 includes an end user database 122 for maintaining user account information and data collected from each user's IoT devices. For example, if the IoT devices include sensors (e.g., temperature sensors, accelerometers, heat sensors, motion detectore, etc), the database 122 may be continually updated to store the data collected by the IoT devices 101-105. The data stored in the database 122 may then be made accessible to the end user via the IoT app or browser installed on the user's device 135 (or via a desktop or other client computer system) and to web clients (e.g., such as websites 130 subscribing to the IoT service 120).

The IoT devices 101-105 may be equipped with various types of sensors to collect information about themselves and their surroundings and provide the collected information to the IoT service 120, user devices 135 and/or external Websites 130 via the IoT hub 110. Some of the IoT devices 101-105 may perform a specified function in response to control commands sent through the IoT hub 110. Various specific examples of information collected by the IoT devices 101-105 and control commands are provided below. In one embodiment described below, the IoT device 101 is a user input device designed to record user selections and send the user selections to the IoT service 120 and/or Website.

In one embodiment, the IoT hub 110 includes a cellular radio to establish a connection to the Internet 220 via a cellular service 115 such as a 4G (e.g., Mobile WiMAX, LTE) or 5G cellular data service. Alternatively, or in addition, the IoT hub 110 may include a WiFi radio to establish a WiFi connection through a WiFi access point or router 116 which couples the IoT hub 110 to the Internet (e.g., via an Internet Service Provider providing Internet service to the end user). Of course, it should be noted that the underlying principles of the invention are not limited to any particular type of communication channel or protocol.

In one embodiment, the IoT devices 101-105 are ultra low-power devices capable of operating for extended periods of time on battery power (e.g., years). To conserve power, the local communication channels 130 may be implemented using a low-power wireless communication technology such as Bluetooth Low Energy (LE). In this embodiment, each of the IoT devices 101-105 and the IoT hub 110 are equipped with Bluetooth LE radios and protocol stacks.

As mentioned, in one embodiment, the IoT platform includes an IoT app or Web application executed on user devices 135 to allow users to access and configure the connected IoT devices 101-105, IoT hub 110, and/or IoT service 120. In one embodiment, the app or web application may be designed by the operator of a Website 130 to provide IoT functionality to its user base. As illustrated, the Website may maintain a user database 131 containing account records related to each user.

Figure 1B:
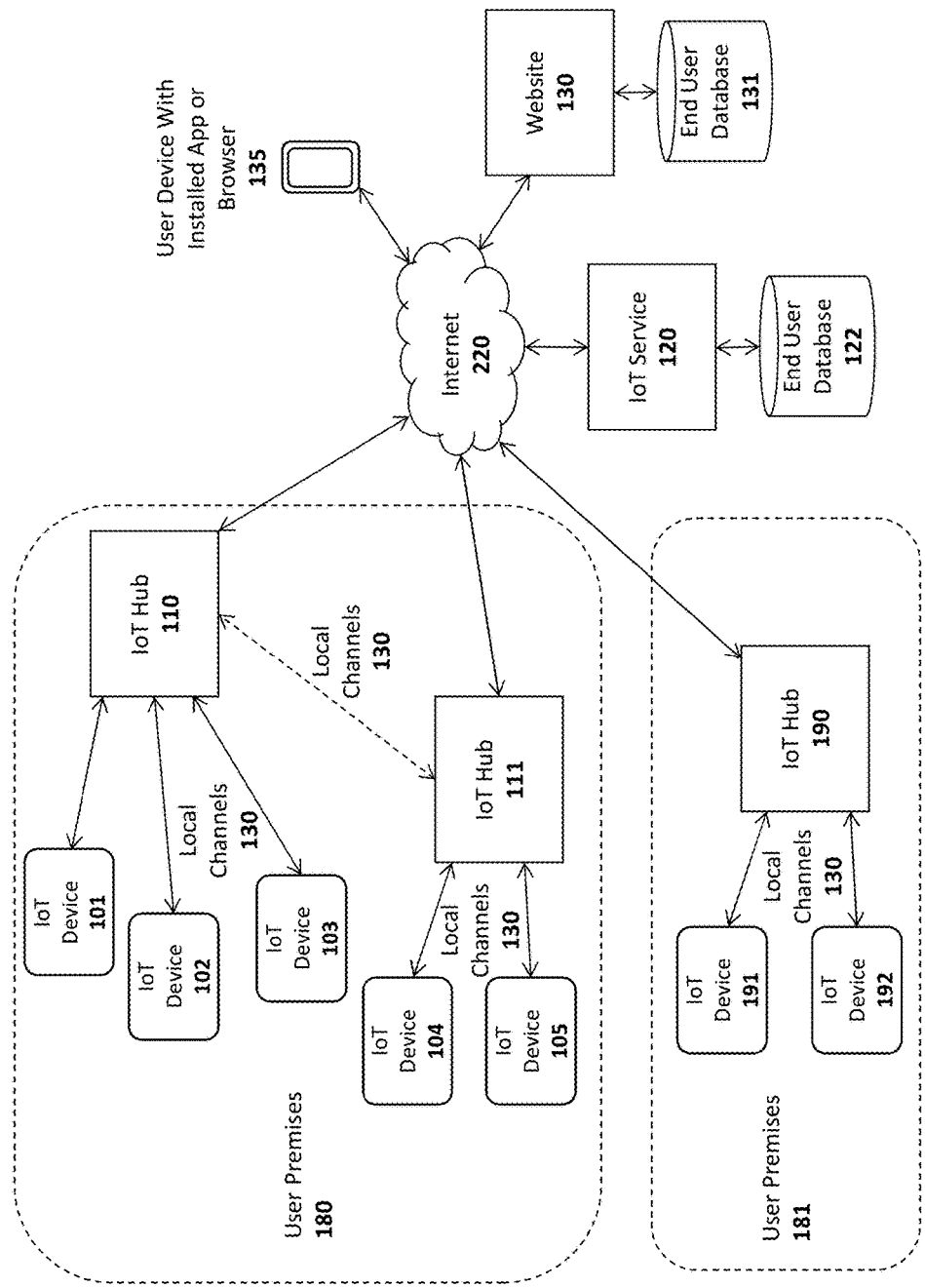

FIG. 1B illustrates additional connection options for a plurality of IoT hubs 110-111, 190 In this embodiment a single user may have multiple hubs 110-111 installed onsite at a single user premises 180 (e.g., the user's home or business). This may be done, for example, to extend the wireless range needed to connect all of the IoT devices 101-105. As indicated, if a user has multiple hubs 110, 111 they may be connected via a local communication channel (e.g., Wifi, Ethernet, Power Line Networking, etc). In one embodiment, each of the hubs 110-111 may establish a direct connection to the IoT service 120 through a cellular 115 or WiFi 116 connection (not explicitly shown in FIG. 1B). Alternatively, or in addition, one of the IoT hubs such as IoT hub 110 may act as a "master" hub which provides connectivity and/or local services to all of the other IoT hubs on the user premises 180, such as IoT hub 111 (as indicated by the dotted line connecting IoT hub 110 and IoT hub 111). For example, the master IoT hub 110 may be the only IoT hub to establish a direct connection to the IoT service 120. In one embodiment, only the "master" IoT hub 110 is equipped with a cellular communication interface to establish the connection to the IoT service 120. As such, all communication between the IoT service 120 and the other IoT hubs 111 will flow through the master IoT hub 110. In this role, the master IoT hub 110 may be provided with additional program code to perform filtering operations on the data exchanged between the other IoT hubs 111 and IoT service 120 (e.g., servicing some data requests locally when possible).

Regardless of how the IoT hubs 110-111 are connected, in one embodiment, the IoT service 120 will logically associate the hubs with the user and combine all of the attached IoT devices 101-105 under a single comprehensive user interface, accessible via a user device with the installed app 135 (and/or a browser-based interface).

In this embodiment, the master IoT hub 110 and one or more slave IoT hubs 111 may connect over a local network which may be a WiFi network 116, an Ethernet network, and/or a using power-line communications (PLC) networking (e.g., where all or portions of the network are run through the user's power lines). In addition, to the IoT hubs 110-111, each of the IoT devices 101-105 may be interconnected with the IoT hubs 110-111 using any type of local network channel such as WiFi, Ethernet, PLC, or Bluetooth LE, to name a few.

FIG. 1B also shows an IoT hub 190 installed at a second user premises 181. A virtually unlimited number of such IoT hubs 190 may be installed and configured to collect data from IoT devices 191-192 at user premises around the world. In one embodiment, the two user premises 180-181 may be configured for the same user. For example, one user premises 180 may be the user's primary home and the other user premises 181 may be the user's vacation home. In such a case, the IoT service 120 will logically associate the IoT hubs 110-111, 190 with the user and combine all of the attached IoT devices 101-105, 191-192 under a single comprehensive user interface, accessible via a user device with the installed app 135 (and/or a browser-based interface).

Figure 2:
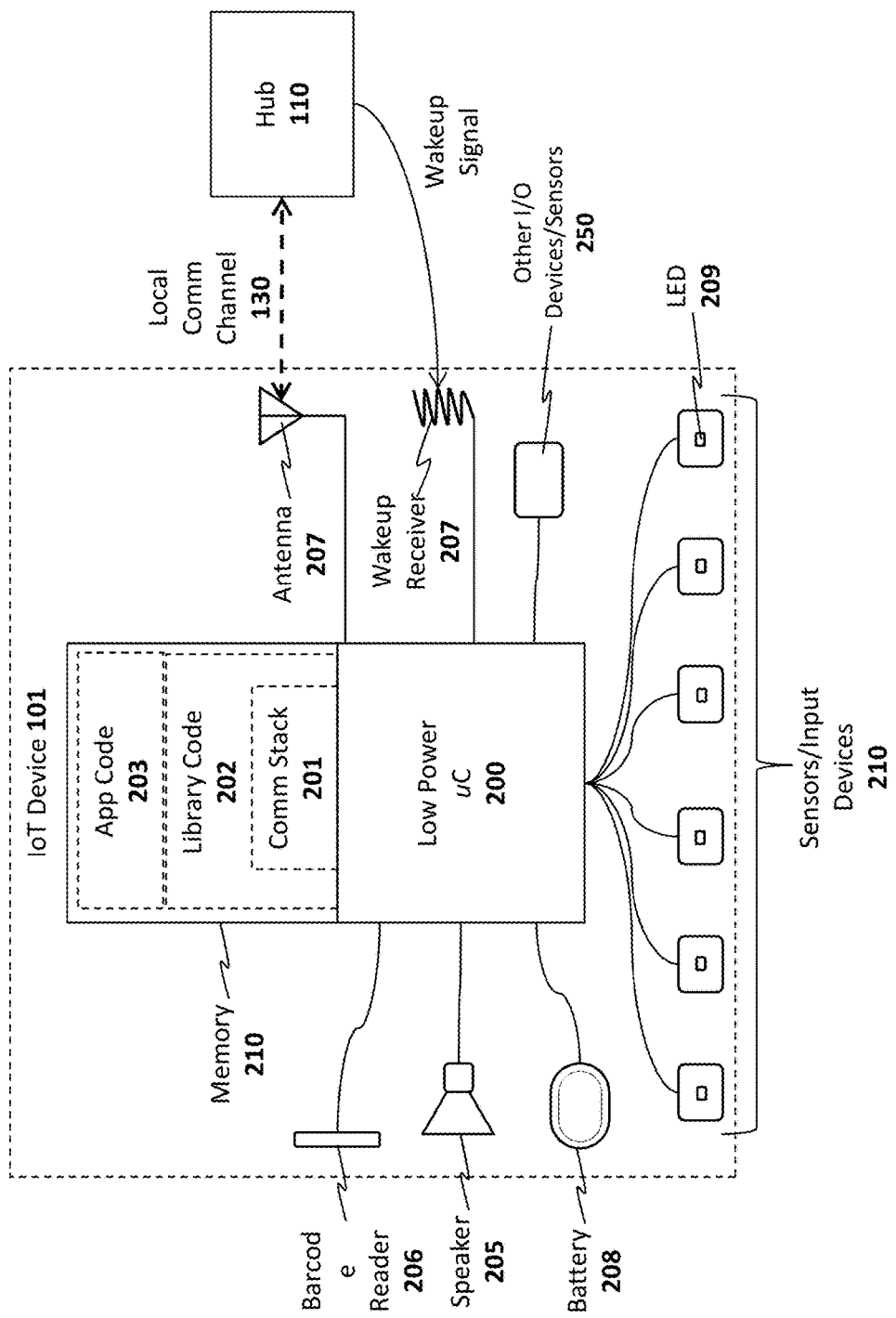
FIG. 2 illustrates an IoT device in accordance with one embodiment of the invention.

As illustrated in FIG. 2, an exemplary embodiment of an IoT device 101 includes a memory 210 for storing program code and data 201-203 and a low power microcontroller 200 for executing the program code and processing the data. The memory 210 may be a volatile memory such as dynamic random access memory (DRAM) or may be a non-volatile memory such as Flash memory. In one embodiment, a non-volatile memory may be used for persistent storage and a volatile memory may be used for execution of the program code and data at runtime. Moreover, the memory 210 may be integrated within the low power microcontroller 200 or may be coupled to the low power microcontroller 200 via a bus or communication fabric. The underlying principles of the invention are not limited to any particular implementation of the memory 210.

As illustrated, the program code may include application program code 203 defining an application-specific set of functions to be performed by the IoT device 201 and library code 202 comprising a set of predefined building blocks which may be utilized by the application developer of the IoT device 101. In one embodiment, the library code 202 comprises a set of basic functions required to implement an IoT device such as a communication protocol stack 201 for enabling communication between each IoT device 101 and the IoT hub 110. As mentioned, in one embodiment, the communication protocol stack 201 comprises a Bluetooth LE protocol stack. In this embodiment, Bluetooth LE radio and antenna 207 may be integrated within the low power microcontroller 200. However, the underlying principles of the invention are not limited to any particular communication protocol.

The particular embodiment shown in FIG. 2 also includes a plurality of input devices or sensors 210 to receive user input and provide the user input to the low power microcontroller, which processes the user input in accordance with the application code 203 and library code 202. In one embodiment, each of the input devices include an LED 209 to provide feedback to the end user.

In addition, the illustrated embodiment includes a battery 208 for supplying power to the low power microcontroller. In one embodiment, a non-chargeable coin cell battery is used. However, in an alternate embodiment, an integrated rechargeable battery may be used (e.g., rechargeable by connecting the IoT device to an AC power supply (not shown)).

A speaker 205 is also provided for generating audio. In one embodiment, the low power microcontroller 299 includes audio decoding logic for decoding a compressed audio stream (e.g., such as an MPEG-4/Advanced Audio Coding (AAC) stream) to generate audio on the speaker 205. Alternatively, the low power microcontroller 200 and/or the application code/data 203 may include digitally sampled snippets of audio to provide verbal feedback to the end user as the user enters selections via the input devices 210.

In one embodiment, one or more other/alternate I/O devices or sensors 250 may be included on the IoT device 101 based on the particular application for which the IoT device 101 is designed. For example, an environmental sensor may be included to measure temperature, pressure, humidity, etc. A security sensor and/or door lock opener may be included if the IoT device is used as a security device. Of course, these examples are provided merely for the purposes of illustration. The underlying principles of the invention are not limited to any particular type of IoT device. In fact, given the highly programmable nature of the low power microcontroller 200 equipped with the library code 202, an application developer may readily develop new application code 203 and new I/O devices 250 to interface with the low power microcontroller for virtually any type of IoT application.

In one embodiment, the low power microcontroller 200 also includes a secure key store for storing encryption keys for encrypting communications and/or generating signatures. Alternatively, the keys may be secured in a subscriber identify module (SIM).

Figure 3:
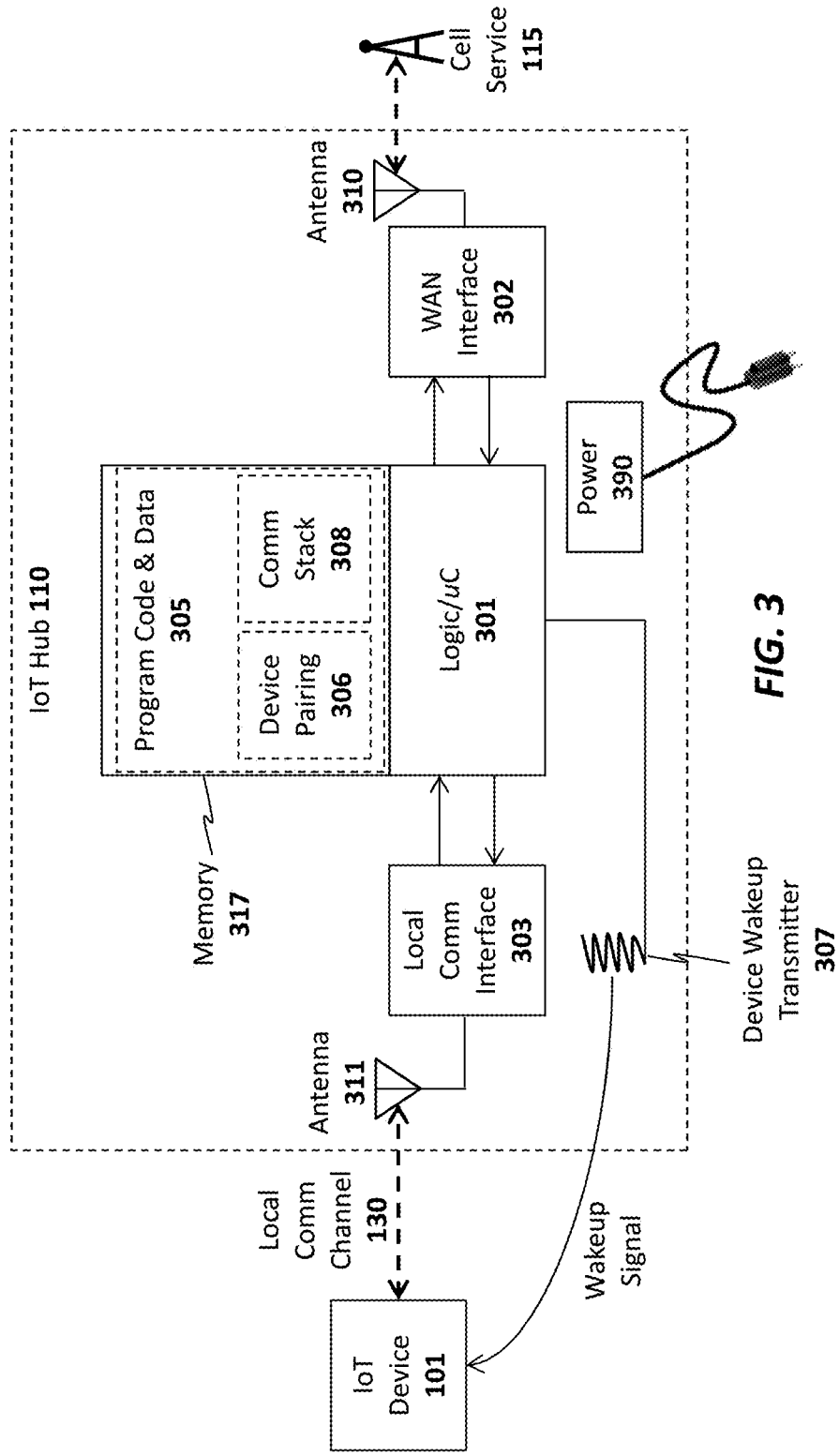
FIG. 3 illustrates an IoT hub in accordance with one embodiment of the invention.

A wakeup receiver 207 is included in one embodiment to wake the IoT device from an ultra low power state in which it is consuming virtually no power. In one embodiment, the wakeup receiver 207 is configured to cause the IoT device 101 to exit this low power state in response to a wakeup signal received from a wakeup transmitter 307 configured on the IoT hub 110 as shown in FIG. 3. In particular, in one embodiment, the transmitter 307 and receiver 207 together form an electrical resonant transformer circuit such as a Tesla coil. In operation, energy is transmitted via radio frequency signals from the transmitter 307 to the receiver 207 when the hub 110 needs to wake the IoT device 101 from a very low power state. Because of the energy transfer, the IoT device 101 may be configured to consume virtually no power when it is in its low power state because it does not need to continually "listen" for a signal from the hub (as is the case with network protocols which allow devices to be awakened via a network signal). Rather, the microcontroller 200 of the IoT device 101 may be configured to wake up after being effectively powered down by using the energy electrically transmitted from the transmitter 307 to the receiver 207.

As illustrated in FIG. 3, the IoT hub 110 also includes a memory 317 for storing program code and data 305 and hardware logic 301 such as a microcontroller for executing the program code and processing the data. A wide area network (WAN) interface 302 and antenna 310 couple the IoT hub 110 to the cellular service 115. Alternatively, as mentioned above, the IoT hub 110 may also include a local network interface (not shown) such as a WiFi interface (and WiFi antenna) or Ethernet interface for establishing a local area network communication channel. In one embodiment, the hardware logic 301 also includes a secure key store for storing encryption keys for encrypting communications and generating/verifying signatures. Alternatively, the keys may be secured in a subscriber identify module (SIM).

A local communication interface 303 and antenna 311 establishes local communication channels with each of the IoT devices 101-105. As mentioned above, in one embodiment, the local communication interface 303/antenna 311 implements the Bluetooth LE standard. However, the underlying principles of the invention are not limited to any particular protocols for establishing the local communication channels with the IoT devices 101-105. Although illustrated as separate units in FIG. 3, the WAN interface 302 and/or local communication interface 303 may be embedded within the same chip as the hardware logic 301.

In one embodiment, the program code and data includes a communication protocol stack 308 which may include separate stacks for communicating over the local communication interface 303 and the WAN interface 302. In addition, device pairing program code and data 306 may be stored in the memory to allow the IoT hub to pair with new IoT devices. In one embodiment, each new IoT device 101-105 is assigned a unique code which is communicated to the IoT hub 110 during the pairing process. For example, the unique code may be embedded in a barcode on the IoT device and may be read by the barcode reader 106 or may be communicated over the local communication channel 130. In an alternate embodiment, the unique ID code is embedded magnetically on the IoT device and the IoT hub has a magnetic sensor such as an radio frequency ID (RFID) or near field communication (NFC) sensor to detect the code when the IoT device 101 is moved within a few inches of the IoT hub 110.

In one embodiment, once the unique ID has been communicated, the IoT hub 110 may verify the unique ID by querying a local database (not shown), performing a hash to verify that the code is acceptable, and/or communicating with the IoT service 120, user device 135 and/or Website 130 to validate the ID code. Once validated, in one embodiment, the IoT hub 110 pairs the IoT device 101 and stores the pairing data in memory 317 (which, as mentioned, may include non-volatile memory). Once pairing is complete, the IoT hub 110 may connect with the IoT device 101 to perform the various IoT functions described herein.

In one embodiment, the organization running the IoT service 120 may provide the IoT hub 110 and a basic hardware/software platform to allow developers to easily design new IoT services. In particular, in addition to the IoT hub 110, developers may be provided with a software development kit (SDK) to update the program code and data 305 executed within the hub 110. In addition, for IoT devices 101, the SDK may include an extensive set of library code 202 designed for the base IoT hardware (e.g., the low power microcontroller 200 and other components shown in FIG. 2) to facilitate the design of various different types of applications 101. In one embodiment, the SDK includes a graphical design interface in which the developer needs only to specify input and outputs for the IoT device. All of the networking code, including the communication stack 201 that allows the IoT device 101 to connect to the hub 110 and the service 120, is already in place for the developer. In addition, in one embodiment, the SDK also includes a library code base to facilitate the design of apps for mobile devices (e.g., iPhone and Android devices).

In one embodiment, the IoT hub 110 manages a continuous bi-directional stream of data between the IoT devices 101-105 and the IoT service 120. In circumstances where updates to/from the IoT devices 101-105 are required in real time (e.g., where a user needs to view the current status of security devices or environmental readings), the IoT hub may maintain an open TCP socket to provide regular updates to the user device 135 and/or external Websites 130. The specific networking protocol used to provide updates may be tweaked based on the needs of the underlying application. For example, in some cases, where may not make sense to have a continuous bi-directional stream, a simple request/response protocol may be used to gather information when needed.

In one embodiment, both the IoT hub 110 and the IoT devices 101-105 are automatically upgradeable over the network. In particular, when a new update is available for the IoT hub 110 it may automatically download and install the update from the IoT service 120. It may first copy the updated code into a local memory, run and verify the update before swapping out the older program code. Similarly, when updates are available for each of the IoT devices 101-105, they may initially be downloaded by the IoT hub 110 and pushed out to each of the IoT devices 101-105. Each IoT device 101-105 may then apply the update in a similar manner as described above for the IoT hub and report back the results of the update to the IoT hub 110. If the update is successful, then the IoT hub 110 may delete the update from its memory and record the latest version of code installed on each IoT device (e.g., so that it may continue to check for new updates for each IoT device).

In one embodiment, the IoT hub 110 is powered via A/C power. In particular, the IoT hub 110 may include a power unit 390 with a transformer for transforming A/C voltage supplied via an A/C power cord to a lower DC voltage.

Figure 4A:
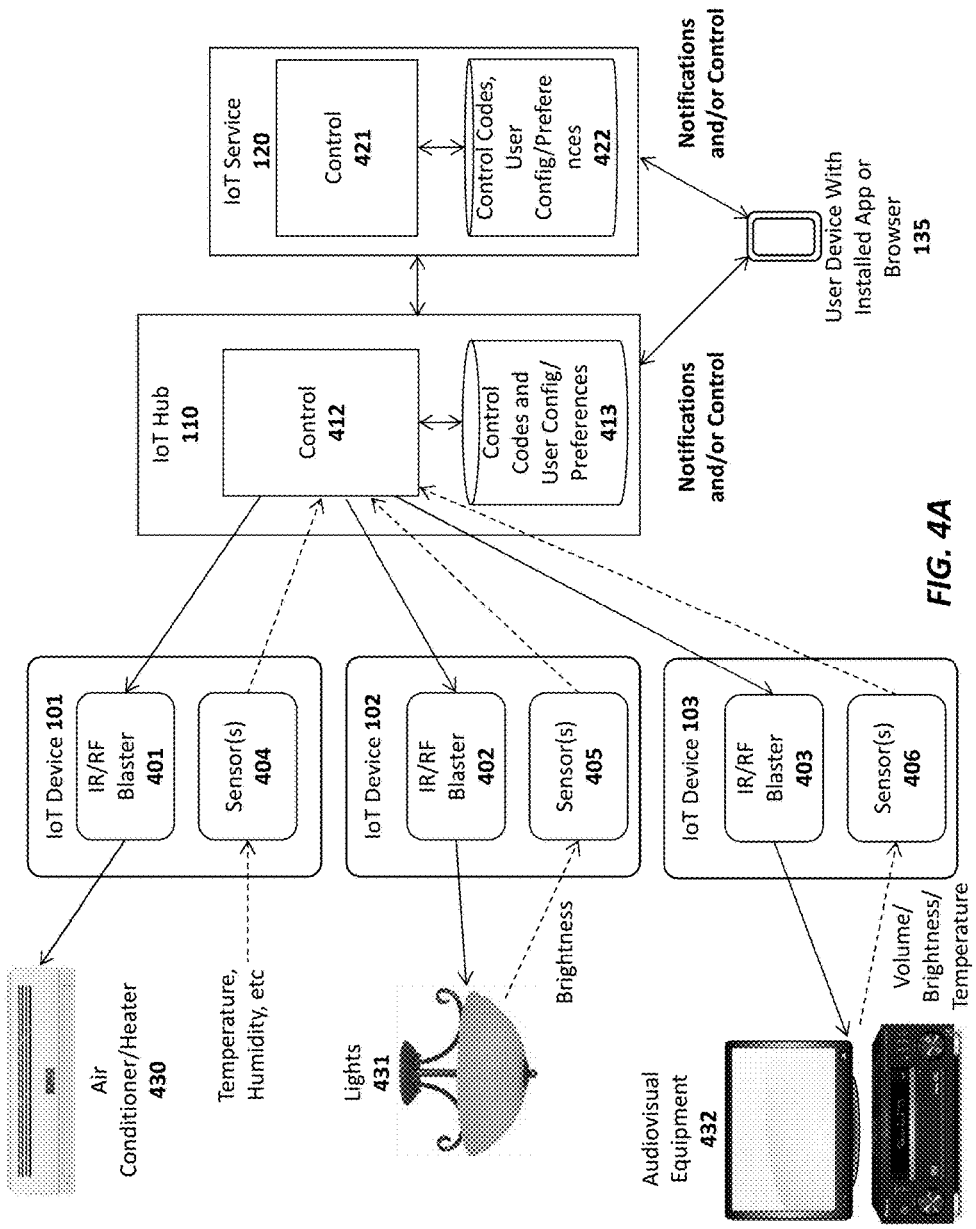
FIG. 4A-B illustrate embodiments of the invention for controlling and collecting data from IoT devices, and generating notifications.

FIG. 4A illustrates one embodiment of the invention for performing universal remote control operations using the IoT system. In particular, in this embodiment, a set of IoT devices 101-103 are equipped with infrared (IR) and/or radio frequency (RF) blasters 401-403, respectively, for transmitting remote control codes to control various different types of electronics equipment including air conditioners/heaters 430, lighting systems 431, and audiovisual equipment 432 (to name just a few). In the embodiment shown in FIG. 4A, the IoT devices 101-103 are also equipped with sensors 404-406, respectively, for detecting the operation of the devices which they control, as described below.

For example, sensor 404 in IoT device 101 may be a temperature and/or humidity sensor for sensing the current temperature/humidity and responsively controlling the air conditioner/heater 430 based on a current desired temperature. In this embodiment, the air conditioner/heater 430 is one which is designed to be controlled via a remote control device (typically a remote control which itself has a temperature sensor embedded therein). In one embodiment, the user provides the desired temperature to the IoT hub 110 via an app or browser installed on a user device 135. Control logic 412 executed on the IoT hub 110 receives the current temperature/humidity data from the sensor 404 and responsively transmits commands to the IoT device 101 to control the IR/RF blaster 401 in accordance with the desired temperature/humidity. For example, if the temperature is below the desired temperature, then the control logic 412 may transmit a command to the air conditioner/heater via the IR/RF blaster 401 to increase the temperature (e.g., either by turning off the air conditioner or turning on the heater). The command may include the necessary remote control code stored in a database 413 on the IoT hub 110. Alternatively, or in addition, the IoT service 421 may implement control logic 421 to control the electronics equipment 430-432 based on specified user preferences and stored control codes 422.

IoT device 102 in the illustrated example is used to control lighting 431. In particular, sensor 405 in IoT device 102 may photosensor or photodetector configured to detect the current brightness of the light being produced by a light fixture 431 (or other lighting apparatus). The user may specify a desired lighting level (including an indication of ON or OFF) to the IoT hub 110 via the user device 135. In response, the control logic 412 will transmit commands to the IR/RF blaster 402 to control the current brightness level of the lights 431 (e.g., increasing the lighting if the current brightness is too low or decreasing the lighting if the current brightness is too high; or simply turning the lights ON or OFF).

IoT device 103 in the illustrated example is configured to control audiovisual equipment 432 (e.g., a television, A/V receiver, cable/satellite receiver, AppleTV™, etc). Sensor 406 in IoT device 103 may be an audio sensor (e.g., a microphone and associated logic) for detecting a current ambient volume level and/or a photosensor to detect whether a television is on or off based on the light generated by the television (e.g., by measuring the light within a specified spectrum). Alternatively, sensor 406 may include a temperature sensor connected to the audiovisual equipment to detect whether the audio equipment is on or off based on the detected temperature. Once again, in response to user input via the user device 135, the control logic 412 may transmit commands to the audiovisual equipment via the IR blaster 403 of the IoT device 103.

It should be noted that the foregoing are merely illustrative examples of one embodiment of the invention. The underlying principles of the invention are not limited to any particular type of sensors or equipment to be controlled by IoT devices.

In an embodiment in which the IoT devices 101-103 are coupled to the IoT hub 110 via a Bluetooth LE connection, the sensor data and commands are sent over the Bluetooth LE channel. However, the underlying principles of the invention are not limited to Bluetooth LE or any other communication standard.

Figure 4B:
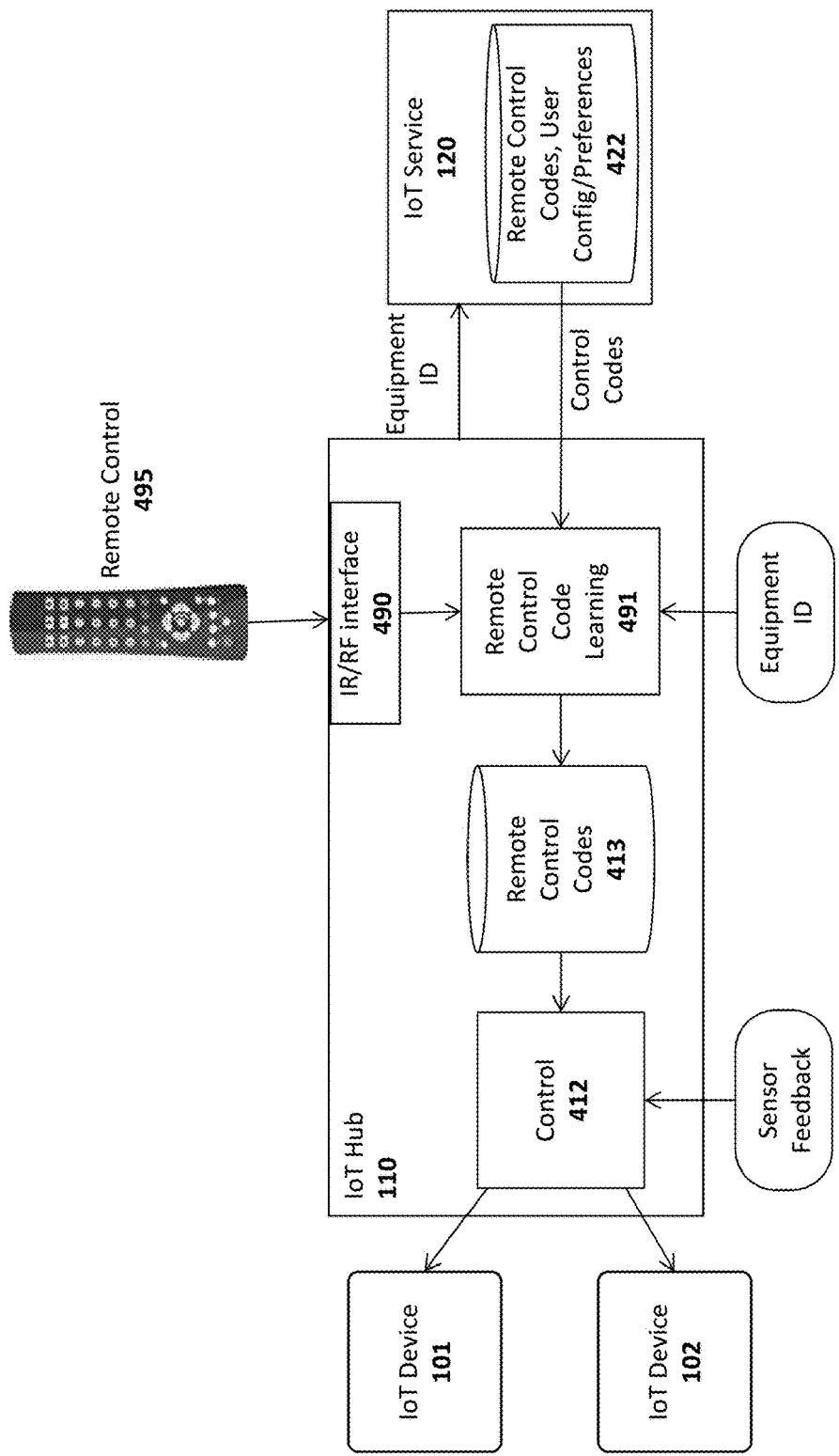

In one embodiment, the control codes required to control each of the pieces of electronics equipment are stored in a database 413 on the IoT hub 110 and/or a database 422 on the IoT service 120. As illustrated in FIG. 4B, the control codes may be provided to the IoT hub 110 from a master database of control codes 422 for different pieces of equipment maintained on the IoT service 120. The end user may specify the types of electronic (or other) equipment to be controlled via the app or browser executed on the user device 135 and, in response, a remote control code learning module 491 on the IoT hub may retrieve the required IR/RF codes from the remote control code database 492 on the IoT service 120 (e.g., identifying each piece of electronic equipment with a unique ID).

In addition, in one embodiment, the IoT hub 110 is equipped with an IR/RF interface 490 to allow the remote control code learning module 491 to "learn" new remote control codes directly from the original remote control 495 provided with the electronic equipment. For example, if control codes for the original remote control provided with the air conditioner 430 is not included in the remote control database, the user may interact with the IoT hub 110 via the app/browser on the user device 135 to teach the IoT hub 110 the various control codes generated by the original remote control (e.g., increase temperature, decrease temperature, etc). Once the remote control codes are learned they may be stored in the control code database 413 on the IoT hub 110 and/or sent back to the IoT service 120 to be included in the central remote control code database 492 (and subsequently used by other users with the same air conditioner unit 430).

In one embodiment, each of the IoT devices 101-103 have an extremely small form factor and may be affixed on or near their respective electronics equipment 430-432 using double-sided tape, a small nail, a magnetic attachment, etc. For control of a piece of equipment such as the air conditioner 430, it would be desirable to place the IoT device 101 sufficiently far away so that the sensor 404 can accurately measure the ambient temperature in the home (e.g., placing the IoT device directly on the air conditioner would result in a temperature measurement which would be too low when the air conditioner was running or too high when the heater was running). In contrast, the IoT device 102 used for controlling lighting may be placed on or near the lighting fixture 431 for the sensor 405 to detect the current lighting level.

In addition to providing general control functions as described, one embodiment of the IoT hub 110 and/or IoT service 120 transmits notifications to the end user related to the current status of each piece of electronics equipment. The notifications, which may be text messages and/or app-specific notifications, may then be displayed on the display of the user's mobile device 135. For example, if the user's air conditioner has been on for an extended period of time but the temperature has not changed, the IoT hub 110 and/or IoT service 120 may send the user a notification that the air conditioner is not functioning properly. If the user is not home (which may be detected via motion sensors or based on the user's current detected location), and the sensors 406 indicate that audiovisual equipment 430 is on or sensors 405 indicate that the lights are on, then a notification may be sent to the user, asking if the user would like to turn off the audiovisual equipment 432 and/or lights 431. The same type of notification may be sent for any equipment type.

Once the user receives a notification, he/she may remotely control the electronics equipment 430-432 via the app or browser on the user device 135. In one embodiment, the user device 135 is a touchscreen device and the app or browser displays an image of a remote control with user-selectable buttons for controlling the equipment 430-432. Upon receiving a notification, the user may open the graphical remote control and turn off or adjust the various different pieces of equipment. If connected via the IoT service 120, the user's selections may be forwarded from the IoT service 120 to the IoT hub 110 which will then control the equipment via the control logic 412. Alternatively, the user input may be sent directly to the IoT hub 110 from the user device 135.

In one embodiment, the user may program the control logic 412 on the IoT hub 110 to perform various automatic control functions with respect to the electronics equipment 430-432. In addition to maintaining a desired temperature, brightness level, and volume level as described above, the control logic 412 may automatically turn off the electronics equipment if certain conditions are detected. For example, if the control logic 412 detects that the user is not home and that the air conditioner is not functioning, it may automatically turn off the air conditioner. Similarly, if the user is not home, and the sensors 406 indicate that audiovisual equipment 430 is on or sensors 405 indicate that the lights are on, then the control logic 412 may automatically transmit commands via the IR/RF blasters 403 and 402, to turn off the audiovisual equipment and lights, respectively.

Figure 5:
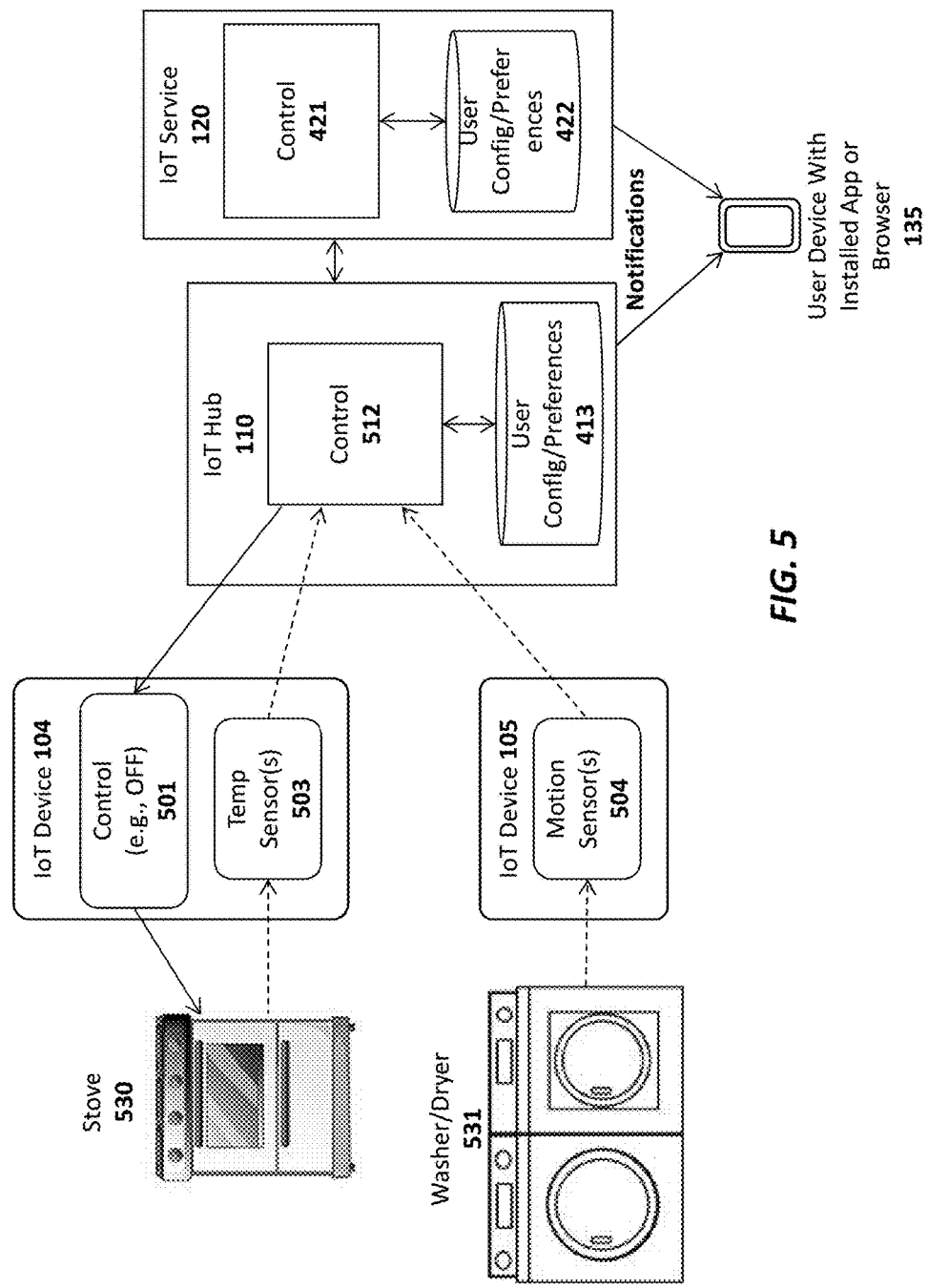
FIG. 5 illustrates embodiments of the invention for collecting data from IoT devices and generating notifications from an IoT hub and/or IoT service.

FIG. 5 illustrates additional embodiments of IoT devices 104-105 equipped with sensors 503-504 for monitoring electronic equipment 530-531. In particular, the IoT device 104 of this embodiment includes a temperature sensor 503 which may be placed on or near a stove 530 to detect when the stove has been left on. In one embodiment, the IoT device 104 transmits the current temperature measured by the temperature sensor 503 to the IoT hub 110 and/or the IoT service 120. If the stove is detected to be on for more than a threshold time period (e.g., based on the measured temperature), then control logic 512 may transmit a notification to the end user's device 135 informing the user that the stove 530 is on. In addition, in one embodiment, the IoT device 104 may include a control module 501 to turn off the stove, either in response to receiving an instruction from the user or automatically (if the control logic 512 is programmed to do so by the user). In one embodiment, the control logic 501 comprises a switch to cut off electricity or gas to the stove 530. However, in other embodiments, the control logic 501 may be integrated within the stove itself.

FIG. 5 also illustrates an IoT device 105 with a motion sensor 504 for detecting the motion of certain types of electronics equipment such as a washer and/or dryer. Another sensor that may be used is an audio sensor (e.g., microphone and logic) for detecting an ambient volume level. As with the other embodiments described above, this embodiment may transmit notifications to the end user if certain specified conditions are met (e.g., if motion is detected for an extended period of time, indicating that the washer/dryer are not turning off). Although not shown in FIG. 5, IoT device 105 may also be equipped with a control module to turn off the washer/dryer 531 (e.g., by switching off electric/gas), automatically, and/or in response to user input.

In one embodiment, a first IoT device with control logic and a switch may be configured to turn off all power in the user's home and a second IoT device with control logic and a switch may be configured to turn off all gas in the user's home. IoT devices with sensors may then be positioned on or near electronic or gas-powered equipment in the user's home. If the user is notified that a particular piece of equipment has been left on (e.g., the stove 530), the user may then send a command to turn off all electricity or gas in the home to prevent damage. Alternatively, the control logic 512 in the IoT hub 110 and/or the IoT service 120 may be configured to automatically turn off electricity or gas in such situations.

In one embodiment, the IoT hub 110 and IoT service 120 communicate at periodic intervals. If the IoT service 120 detects that the connection to the IoT hub 110 has been lost (e.g., by failing to receive a request or response from the IoT hub for a specified duration), it will communicate this information to the end user's device 135 (e.g., by sending a text message or app-specific notification).

Apparatus and Method for Accurately Sensing User Location in an IoT System

Current wireless "smart" locks and garage door openers allow an end user to control a lock and/or garage door via a mobile device. To operate these systems, the user must open an app on the mobile device and select an open/unlock or close/lock option. In response, a wireless signal is sent to a receiver on or coupled to the wireless lock or garage door which implements the desired operation. While the discussion below focuses on wireless "locks", the term "lock" is used broadly herein to refer to standard door locks, wireless garage door openers, and any other device for limiting access to a building or other location.

Figure 6:
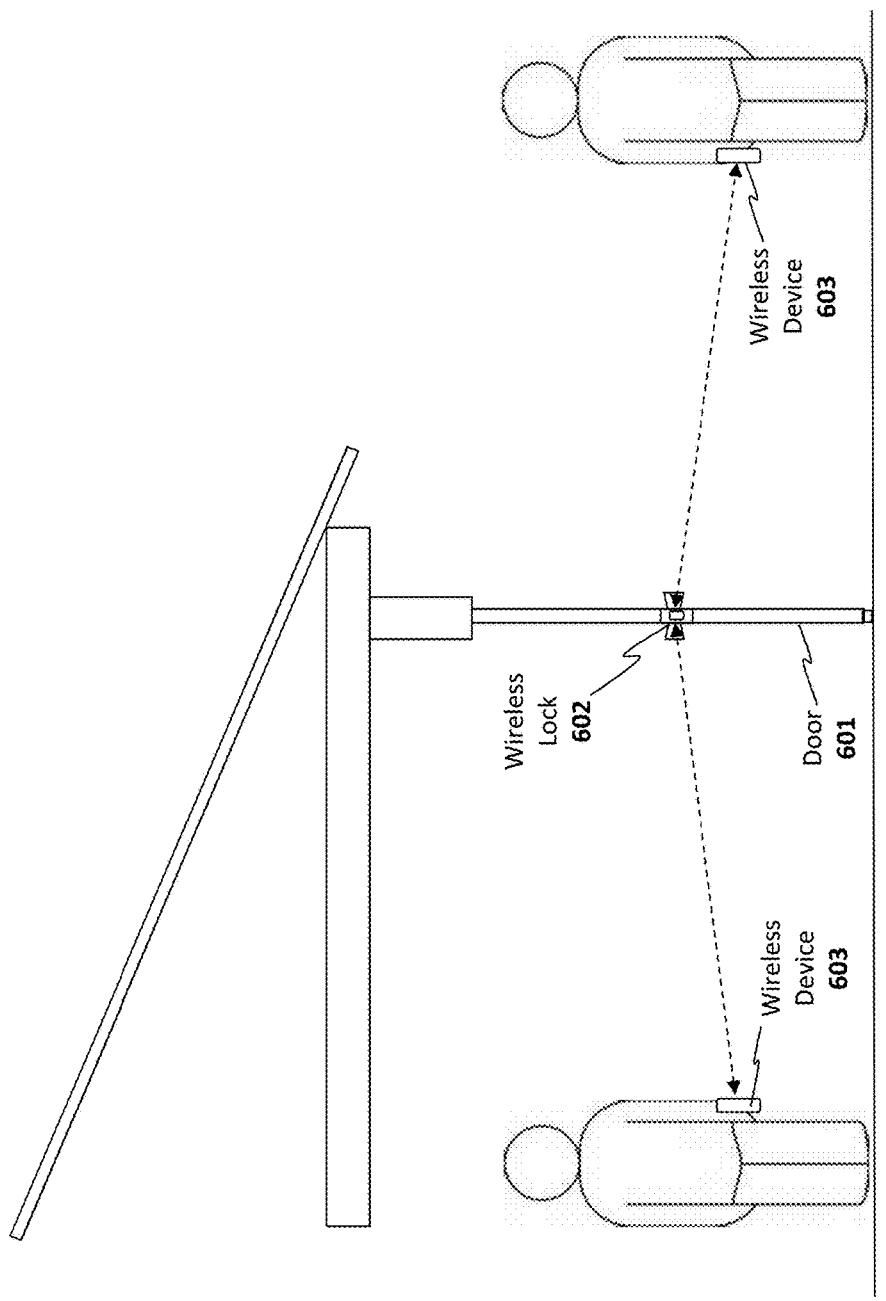
FIG. 6 illustrates problems with identifying a user in current wireless lock systems.

Some wireless locks attempt to determine when the user is outside the door and responsively trigger the open/unlock function. FIG. 6, for example, illustrates an example in which a wireless lock 602 is triggered in response to a user with a wireless device 603 approaching from the outside of the door 601, based on the signal strength of the signal from the wireless device 603. For example, the wireless lock 602 may measure the received signal strength indicator (RSSI) from the wireless device 603 and, when it reaches a threshold (e.g., −60 dbm), will unlock the door 601.

One obvious problem with these techniques is that the RSSI measurement is non-directional. For example, the user may move around the home with the wireless device 603 and pass by the wireless lock 602 or garage door opener, thereby causing it to trigger. For this reason, the use of wireless locks which operate based on user proximity detection has been limited.

Figure 7:
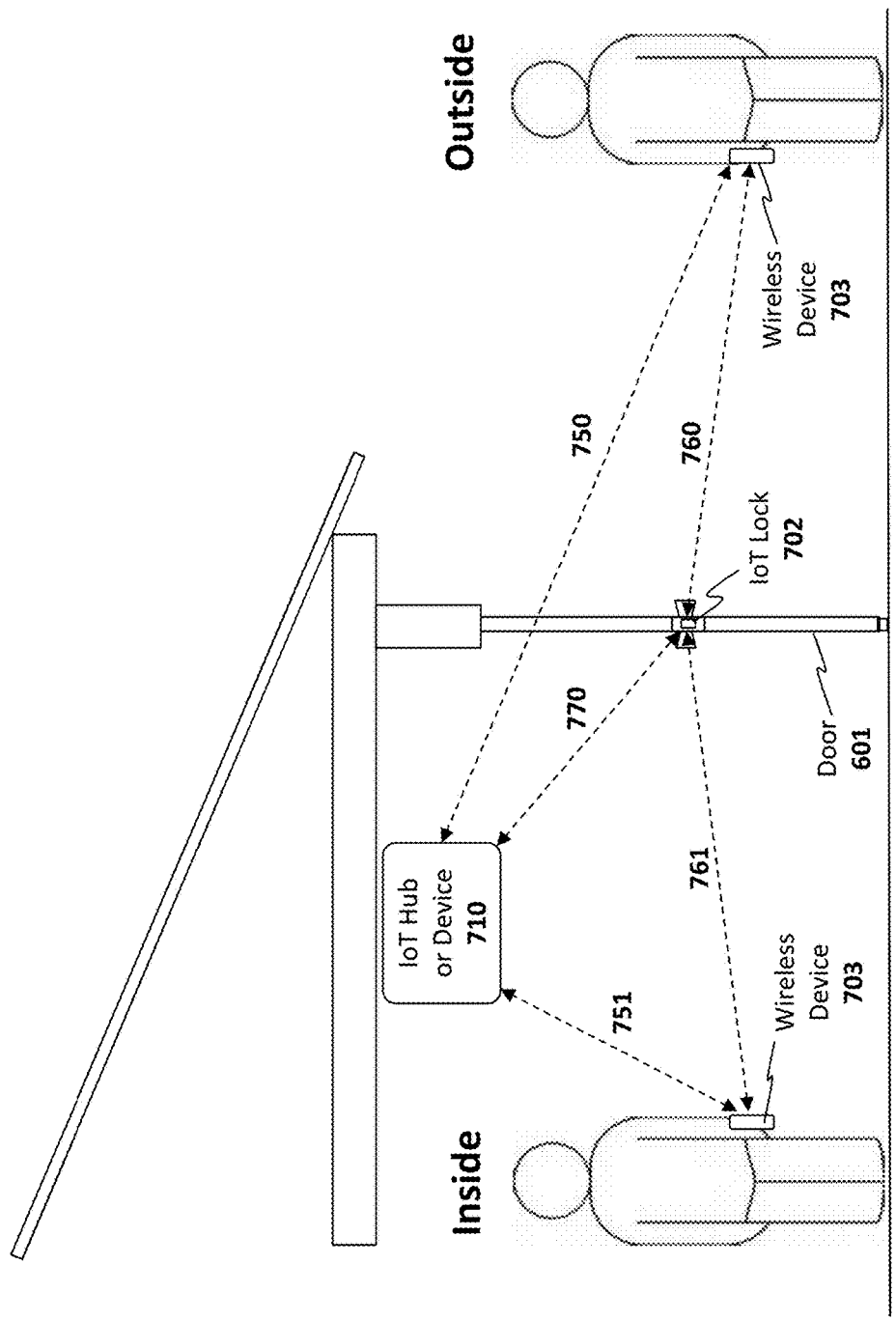
FIG. 7 illustrates a system in which IoT devices and/or IoT hubs are employed to accurately detect the location of a user of a wireless lock system.

FIG. 7 illustrates one embodiment of the invention which an IoT hub and/or IoT device 710 is used to determine the location of the user with greater accuracy. In particular, this embodiment of the invention measures signal strength between the wireless device 703 and the IoT lock device 702 and also measures signal strength between the wireless device 703 and one or more IoT devices/hubs 710 to differentiate between cases where the user is outside the home and inside the home. For example, if the user is a particular distance from the IoT lock 702 inside or outside the home, then the signal strength 761 from the position inside the home and signal strength 760 outside the home may be roughly the same. In prior systems, such as illustrated in FIG. 6, there was no way to differentiate between these two cases. However, in the embodiment shown in FIG. 7, the differences in signal strength measurements 750 and 751, measured between the IoT hub/device 710 and the wireless device 703 when the user is outside the home and inside the home, respectively, are used to determine the location of the user. For example, when the wireless device 703 is at the outside location, the signal strength 750 may be measurably different than the signal strength 751 when the wireless device 703 is at the inside location. While in most cases the signal strength 751 inside the home should be stronger, there may be instances where the signal strength 751 is actually weaker. The important point is that the signal strength may be used to differentiate the two positions.

The signal strength values 760-761, 750-751 may be evaluated at the IoT hub/device 710 or at the IoT lock 702 (if it has the intelligence to perform this evaluation). The remainder of this discussion will assume that the signal strength evaluation is performed by an IoT hub 710, which may then transmit a lock or unlock command (or no command if already locked/unlocked) to the IoT lock 702 over a wireless communication channel 770 (e.g., BTLE) based on the results of the evaluation. It should be noted, however that the same basic evaluation and result may be performed directly by the IoT lock 702 if it is configured with the logic to perform the evaluation (e.g., where the signal strength values are provided to the IoT lock 702).

Figure 8:
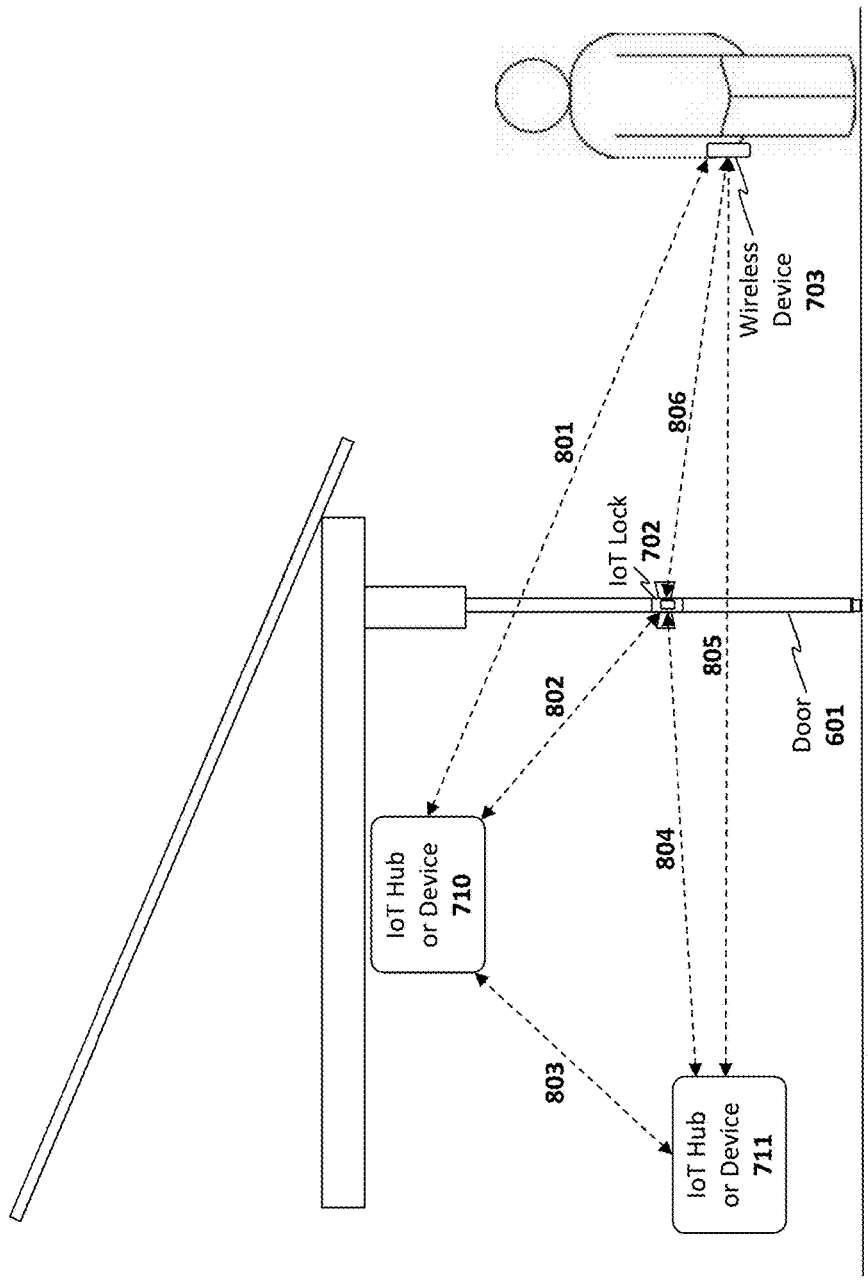
FIG. 8 illustrates another embodiment in which IoT devices and/or IoT hubs are employed to accurately detect the location of a user of a wireless lock system.

FIG. 8 illustrates another embodiment which is capable of providing greater accuracy, because it utilizes the signal strength values from two IoT hubs/devices 710-711. In this embodiment, the signal strength 805 is measured between the wireless device 703 and (1) IoT hub/device 711; (2) IoT hub/device 710; and (3) IoT lock 702. The wireless device is shown in a single position in FIG. 8 for simplicity.

In one embodiment, all of the collected signal strength values are provided to one of the IoT hub devices 710-711, which then evaluate the values to determine the location of the user (e.g., inside or outside). If it is determined that the user is outside, then the IoT hub/device 710 may send a command to the IoT lock 702 to unlock the door. Alternatively, if the IoT lock 702 has the logic to perform the evaluation, the IoT hubs/devices 710-711 may transmit the signal strength values to the IoT lock 702 which evaluates the signal strength values to determine the location of the user.

Figure 9:
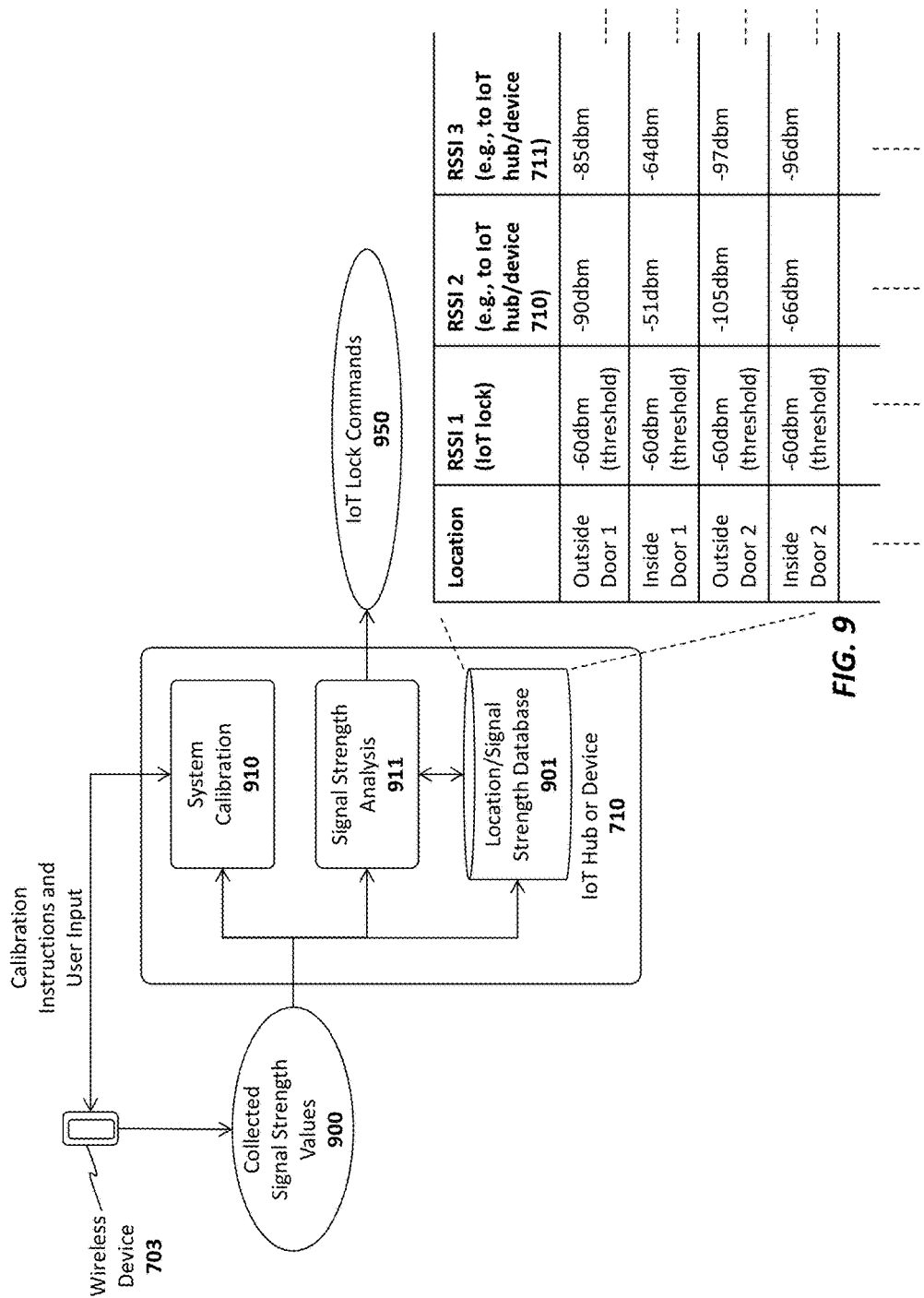
FIG. 9 illustrates one embodiment for calibrating a location detection system and detecting a location of a user based on signal strength values.

As illustrated in FIG. 9, in one embodiment, a calibration module 910 on the IoT hub 710 communicates with an app or browser-based code on the wireless device 703 to calibrate the signal strength measurements. During calibration, the system calibration module 910 and/or calibration app may instruct the user to stand in certain locations outside the door and inside the door (e.g., outside 6 ft outside door 1, 6 ft inside door 1, 6 ft outside door 2, etc). The user may indicate that he/she is in the desired position by selecting a graphic on the user interface. The system calibration app and/or system calibration module 910 will then associate the collected signal strength values 900 with each location within a location database 901 on the IoT hub/device 710.

Once the signal strength values for different known locations of the user are collected and stored in the database 901, a signal strength analysis module 911 uses these values to determine whether to send IoT lock commands 950 to lock/unlock the door based on the detected signal strength values. In the embodiment shown in FIG. 9, four exemplary locations are shown for two different doors: outside door 1, inside door 1, outside door 2, and inside door 2. The RSSI1 value is associated with the wireless lock and is set to a threshold value of −60 dbm. Thus, in one embodiment, the signal strength analysis module 911 will not perform its evaluation to determine the location of the user unless the RSSI1 value is at least −60 dmb. The RSSI2 and RSSI3 values are signal strength values measured between the user's wireless device and two different IoT hubs/devices.

Assuming that the RSSI1 threshold is reached, the signal strength analysis module 911 compares the current signal strength values 900 measured between the IoT hubs/devices and the user's wireless device with the RSSI2/RSSI3 values from the location database 901. If the current RSSI values are within a specified range of the values specified in the database for RSSI2 (e.g., for IoT hub/device 710) and RSSI3 (e.g. for IoT hub/device 711), then the wireless device is determined to be at or near the associated location. For example, because the RSSI2 value associated with the "outside door 1" location is −90 dbm (e.g., based on the measurement made during calibration), if the currently measured signal strength for RSSI2 is between −93 dbm and −87 dbm then the RSSI2 comparison may be verified (assuming a specified range of ±3 dbm). Similarly, because the RSSI3 value associated with the "outside door 1" location is −85 dbm (e.g., based on the measurement made during calibration), if the currently measured signal strength for RSSI3 is between −88 dbm and −82 dbm then the RSSI3 comparison may be verified. Thus, if the user is within the −60 dbm value for the IoT lock and within the above-specified ranges for RSSI2 and RSSI3, the signal strength analysis module 911 will send a command 950 to open the lock. By comparing the different RSSI values in this manner, the system avoids undesirable "unlock" events when the user passes within −60 dbm of the IoT lock from inside the home, because the RSSI measurements for RSSI2 and RSSI3 are used to differentiate the inside and outside cases.

In one embodiment, the signal strength analysis module 911 relies on on RSSI values which provide the greatest amount of differentiation between the inside and outside cases. For example, there may be some instances where the RSSI values for the inside and outside cases are equivalent or very close (e.g., such as the RSSI3 values of −96 dbm and −97 dbm for inside door 2 and outside door 2, respectively). In such a case, the signal strength analysis module will use the other RSSI value to differentiate the two cases. In addition, in one embodiment, the signal strength analysis module 911 may dynamically adjust the RSSI ranges used for the comparison when the recorded RSSI values are close (e.g., making the ranges smaller when the measured RSSI values are closer). Thus, while ±3 dbm is used as a comparison range for the example above, various different ranges may be set for the comparison based on the how close the RSSI measurements are.

In one embodiment, the system calibration module 910 system continues to train the system by measuring dbm values each time the user enters through a door. For example, in response to the user successfully entering the home following the initial calibration, the system calibration module 910 may store additional RSSI values for RSSI2 and RSSI3. In this manner, a range of RSSI values may be stored for each case in the location/signal strength database 901 to further differentiate between the inside and outside cases. The end result is a far more accurate wireless lock system than currently available.

Figure 10:
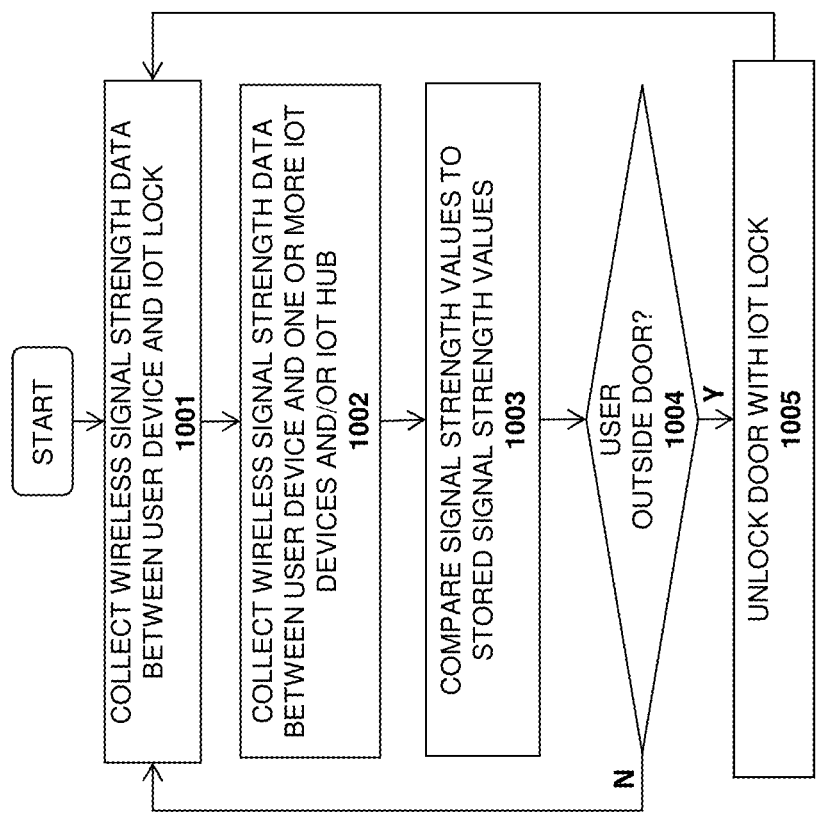
FIG. 10 illustrates a method for implementing a wireless lock system using IoT devices and/or IoT hubs.

A method in accordance with one embodiment of the invention is illustrated in FIG. 10. The method may be implemented within the context of the system architectures described above, but is not limited to any specific system architecture.

At 1001, the wireless signals strength between a user device and an IoT lock is measured. At 1002, if the signal strength is above a specified threshold (i.e., indicating that the user is near the door), then at 1002, the wireless signal strength between the user device and one or more IoT hubs/devices is measured. At 1003, the collected wireless signal strength values are compared with previously collected and stored signal strength values to determine the location of the user. For example, if the RSSI values are within a specified range of RSSI values when the user was previously outside of the door, then it may be determined that the user is presently outside of the door. At 1004, based on the evaluation, a determination is made as to whether the user is outside of the door. If so, then at 1005, the door is automatically unlocked using the IoT lock.

Figure 11:
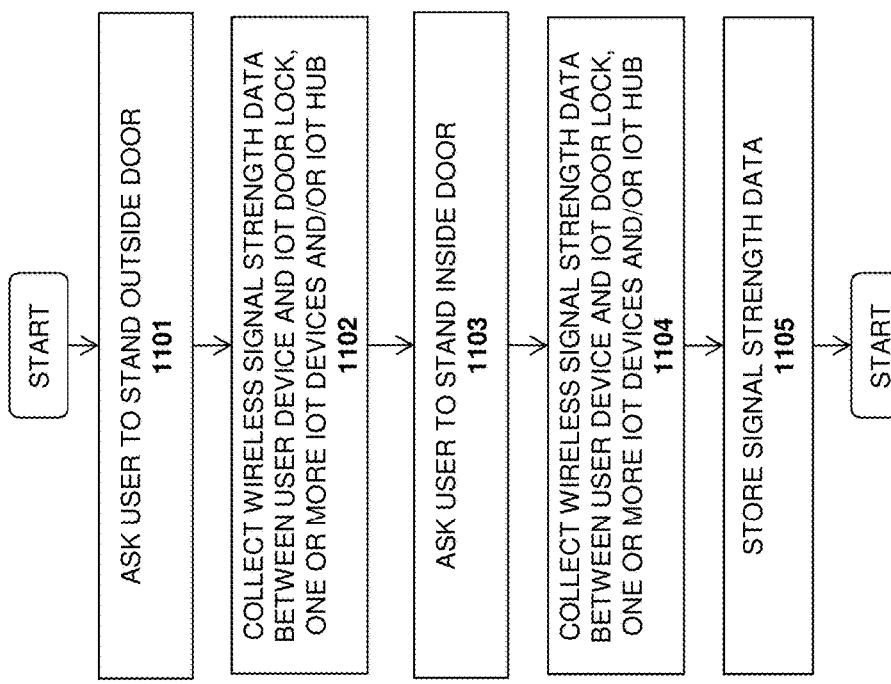
FIG. 11 illustrates one embodiment of a method for calibrating a wireless lock system.

A method for calibrating the IoT lock system is illustrated in FIG. 11. At 1101, the user is asked to stand outside of the door and at 1102, the wireless signal strength data is collected between the user device and one or more IoT devices/hubs. As mentioned, the request may be sent to the user via a user app installed on the user's wireless device. At 1103, the user is asked to stand inside of the door and at 1104, the wireless signal strength data is collected between the user device and the IoT devices/hubs. At 1105, the signal strength data is stored in a database so that it may be used to compare signal strength values as described herein to determine the user's current location.

Note that while a user's home is used herein as an exemplary embodiment, the embodiments of the invention are not limited to a consumer application. For example, these same techniques may be employed to provide access to businesses or other types of buildings.

In one embodiment, similar techniques as described above are used to track the user throughout the user's home. For example, by tracking the RSSI measurements between the user's wireless device and various IoT devices/hubs in the user's home, a "map" of different user locations may be compiled. This map may then be used to provide services to the end user, such as directing audio to speakers in the room in which the user is presently located.

Figure 12:
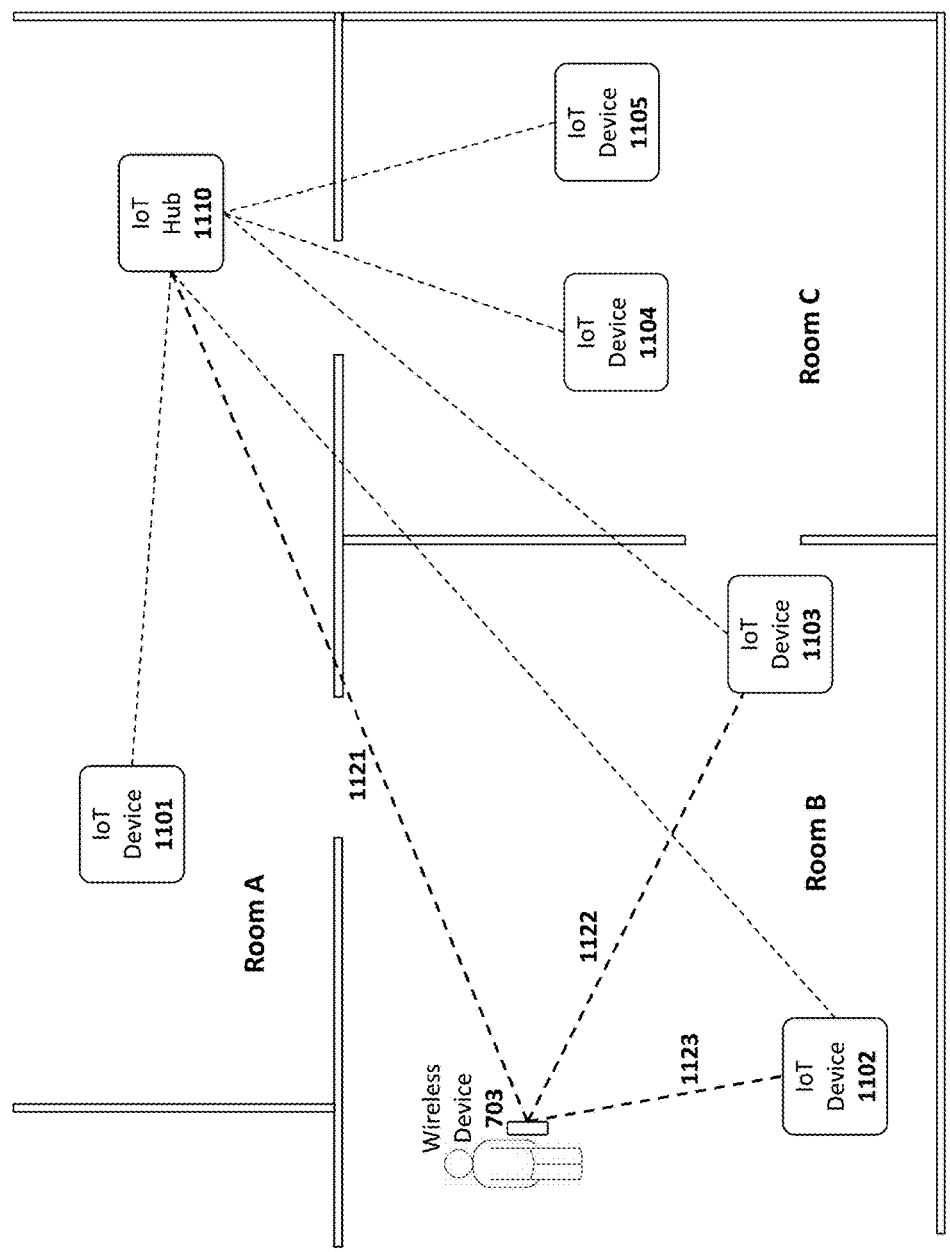
FIG. 12 illustrates one embodiment of the invention for determining the location of a user with signal strength values.

FIG. 12 provides an overview of an exemplary system in which RSSI values measured between the wireless device 703 and a plurality of IoT devices 1101-1105 and IoT hub 1110 are used to determine whether the user is in Rooms A, B, or C. In particular, based on the RSSI values 1121-1123 measured between the wireless device 703 and the IoT hub 1110, IoT device 1103, and IoT device 1102, the IoT hub 1110 may determine that the user is presently in Room B, as illustrated. Similarly, when the user moves into Room C, RSSI measurements between the wireless device 703 and IoT devices 1104-1105 and IoT hub 1110 may then be used to determine that the user is in Room C. While only 3 RSSI measurements 1121-1123 are shown in FIG. 12, RSSI measurements may be made between any IoT device or IoT hub within range of the wireless device 703 to provide greater accuracy.

In one embodiment, the IoT hub 1110 may employ triangulation techniques based on RSSI values between itself and the various IoT devices 1101-1105 and the wireless device 703 to triangulate the location of the user. For example, the RSSI triangle formed between IoT device 1102, the IoT hub 1110 and the wireless device 703 may be used to determine the present location of the wireless device 703, based on the RSSI values for each edge of the triangle.

Figure 13:
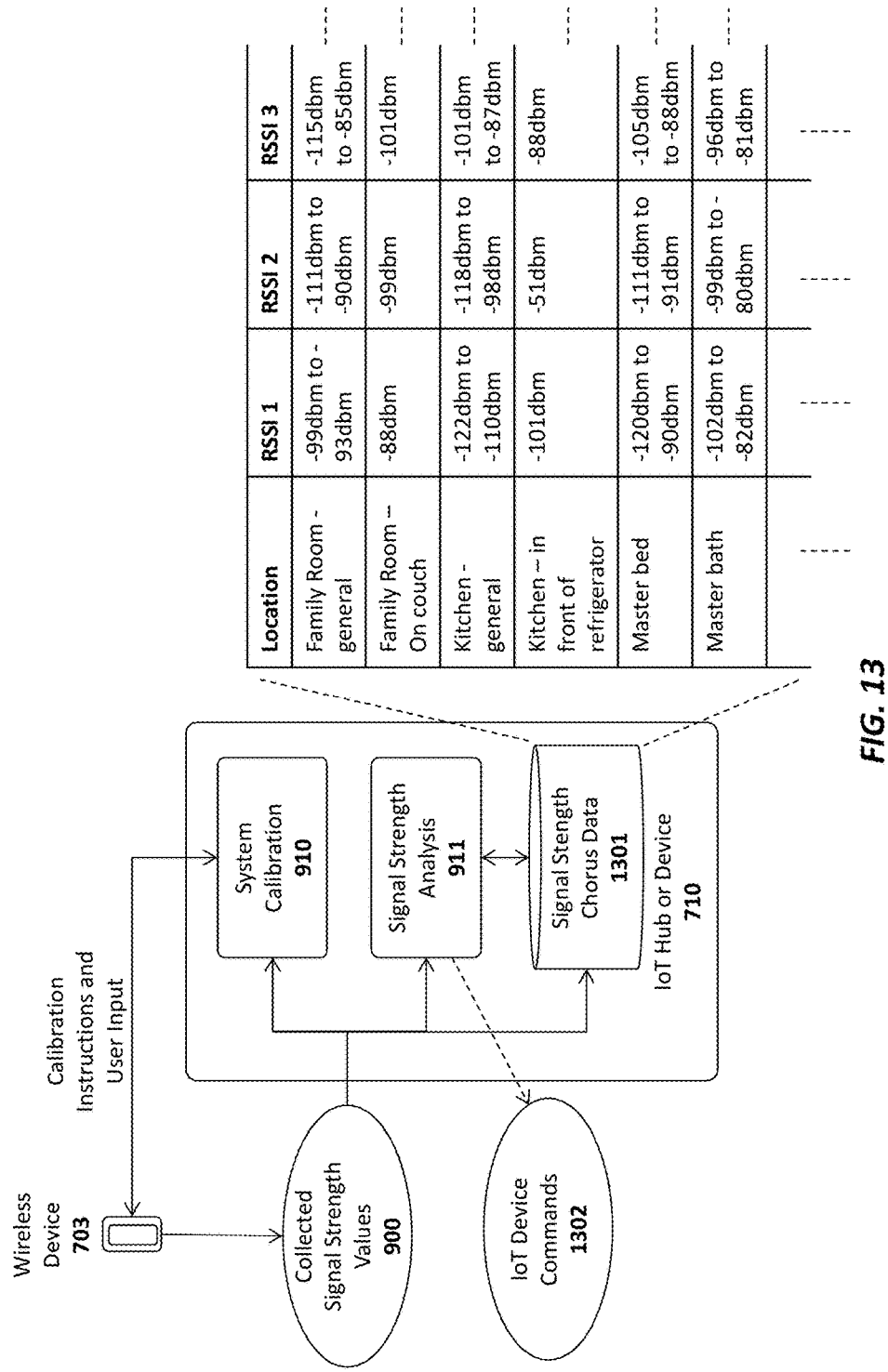
FIG. 13 illustrates another embodiment for calibrating a location detection system and detecting a location of a user based on signal strength values.

In one embodiment, similar calibration techniques to those described above may be used to collect signal strength values in each room. FIG. 13 illustrates the system calibration module 910 which, as in the embodiments described above, communicates with an app or browser-based code on the wireless device 703 to calibrate the signal strength measurements. During calibration, the system calibration module 910 and/or calibration app may instruct the user to stand in different rooms and in certain locations within each room, depending on the applications for which the IoT system is being used. As described above, the user may indicate that he/she is in the desired position by selecting a graphic on the user interface. The system calibration app and/or system calibration module 910 will then associate the collected signal strength values 900 with each location within a location database 1301 on the IoT hub/device 710.

Once the signal strength values for different known locations of the user are collected and stored in the database 1301, a signal strength analysis module 911 uses these values to control the various IoT devices 1101-1105 around the user's home. For example, if the IoT devices 1101-1105 comprise speakers or amplifiers for a home audio system, the signal strength analysis module 911 may transmit IoT device commands 1302 to control the rooms in which the audio is being played back (e.g., turning on speakers in the room in which the user is present and turning off speakers in other rooms). Similarly, if the IoT devices 1101-1105 comprise lighting control units, then the signal strength analysis module 911 may transmit IoT device commands 1302 to turn on lights in the room in which the user is present and turn off lights in the other rooms. Of course, the underlying principles of the invention are not limited to any specific end-user applications.

As mentioned, one embodiment of the system calibration module 910 will collect RSSI data for different points within a room based on the application. In FIG. 13, RSSI ranges are collected for each room by instructing the user to stand in different positions within the room. For example, for the user's Family Room, RSSI ranges of −99 dbm to −93 dbm, −111 dbm to −90 dbm and −115 dbm to −85 dbm are collected for RSSI1, RSSI2, and RSSI3, respectively (i.e., collected from three different IoT devices/hubs). When the current position of the wireless device 703 falls within each of these ranges, the signal strength analysis module 911 will determine that the user is in the Family Room and potentially send IoT device commands 1302 to perform a specified set of functions (e.g., turn on lights, audio, etc). In addition, for specific points within the room, specific RSSI values may be collected. For example, in FIG. 13, values of −88 dbm, −99 dbm, and −101 dbm have been collected when the user is sitting on the sofa in the family room. As in the embodiments described above, the signal strength analysis module 911 may determine that the user is on the couch if the RSSI values are within a specified range of the stored RSSI values (e.g., within while ±3 dbm). In addition, as in prior embodiments, the system calibration module 910 may continue to collect data for the different locations to ensure that the RSSI values remain current. For example, if the user rearranges the Family Room, the position of the couch may move. In this case, the system calibration module 910 may ask the user if the user is currently sitting the couch (e.g., given the similarity of the RSSI values from those stored in the database), and update the signal strength database 1301 with the new values.

In one embodiment, the user's interaction with various types of IoT devices may be used to determine the location of the user. For example, if the user's refrigerator is equipped with an IoT device, then the system may take RSSI measurements upon detecting that the user has opened the refrigerator door. Similarly, if the lighting system comprises an IoT system, when the user adjusts the lights in different rooms of the home or business, the system may automatically take RSSI measurements. By way of another example, when the user interacts with various appliances (e.g., washers, dryers, dishwasher), audiovisual equipment (e.g., televisions, audio equipment, etc), or HVAC systems (e.g., adjusting the thermostat), the system may capture RSSI measurements and associate the measurements with these locations.

While a single user is described in the embodiments set forth above, the embodiments of the invention may be implemented for multiple users. For example, the system calibration module 910 may collect signal strength values for both User A and User B to be stored in the signal strength database 1301. The signal strength analysis module 911 may then identify the current location of Users A and B based on comparisons of signal strength measurements and send IoT commands 1302 to control IoT devices around the home of Users A and B (e.g., keeping on lights/speakers in the rooms in which Users A and B are present).

The wireless device 703 employed in the embodiments of the invention described herein may be a smartphone, tablet, wearable device (e.g., a smartwatch, token on a neckless or bracelet), or any other form of wireless device 703 capable of detecting RSSI values. In one embodiment, the wireless device 703 communicates with the IoT devices 1101-1105 and IoT hub 1110 via a short range, low power wireless communication protocol such as Bluetooth LE (BTLE). In addition, in one embodiment, the wireless device 703 communicates with the IoT hub 1110 via a longer range wireless protocol such as Wifi. Thus, in this embodiment, the RSSI values may be gathered by the wireless device 703 and communicated back to the IoT hub 1110 using the longer range protocol. In addition, each of the individual IoT devices 1101-1105 may collect the RSSI values and communicate these values back to the IoT hub 1110 via the short range wireless protocol. The underlying principles of the invention are not limited to any specific protocol or technique used to collect the RSSI values.

One embodiment of the invention uses the techniques described herein to locate an ideal position for a wireless extender to extend the range of the IoT hub 1110 using the short range wireless protocol. For example, in one embodiment, upon purchasing a new extender the system calibration module 910 will send instructions for the user to move into each of the rooms of the user's home with the wireless extender device (e.g., by sending instructions to the app on the wireless device 703). A connection wizard may also be executed on the wireless device 703 to step the user through the process. Following the instructions sent by the system calibration module 910 or from the wizard, the user will walk into each room and press a button on the wireless device 703. The IoT hub 1110 will then measure signal strength between itself and the extender and also the signal strength between the extender and all of the other IoT devices in the system. The system calibration module 910 or wireless device wizard may then provide the user will a prioritized list of the best locations to place the wireless extender (i.e., selecting those locations with the highest signal strength between the wireless extender and the IoT hub 1110 and/or between the wireless extender and the IoT devices 1101-1105).

The embodiments of the invention described above provide for fine-tuned location awareness within an IoT system not found in current IoT systems. In addition, to improve location accuracy, in one embodiment the GPS system on the wireless device 703 may communicate precise GPS data to be used to provide an accurate map of the user's home which will include GPS data as well as RSSI data for each location.

Embodiments for Improved Security

In one embodiment, the low power microcontroller 200 of each IoT device 101 and the low power logic/microcontroller 301 of the IoT hub 110 include a secure key store for storing encryption keys used by the embodiments described below (see, e.g., FIGS. 14-19 and associated text). Alternatively, the keys may be secured in a subscriber identify module (SIM) as discussed below.

Figure 14:
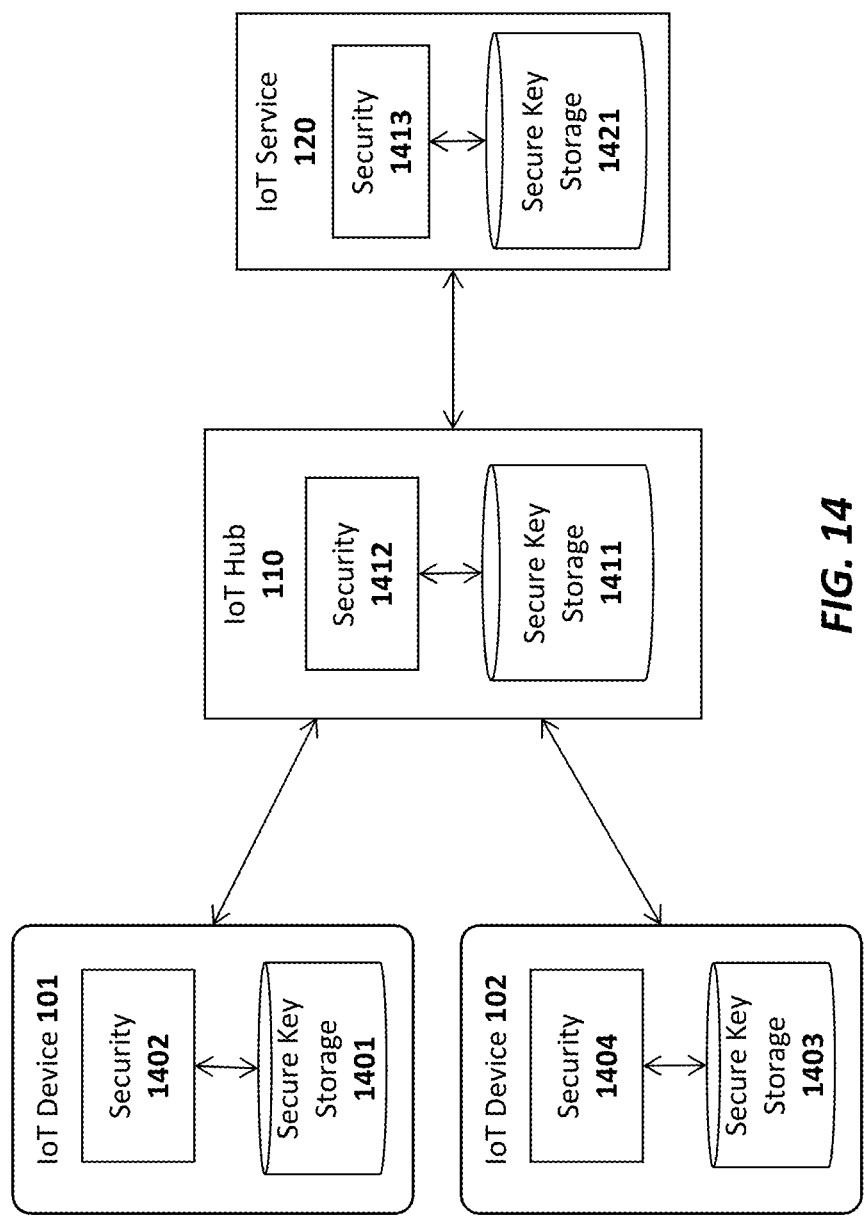
FIG. 14 illustrates embodiments of the invention which implements improved security techniques such as encryption and digital signatures.

FIG. 14 illustrates a high level architecture which uses public key infrastructure (PKI) techniques and/or symmetric key exchange/encryption techniques to encrypt communications between the IoT Service 120, the IoT hub 110 and the IoT devices 101-102.

Embodiments which use public/private key pairs will first be described, followed by embodiments which use symmetric key exchange/encryption techniques. In particular, in an embodiment which uses PKI, a unique public/private key pair is associated with each IoT device 101-102, each IoT hub 110 and the IoT service 120. In one embodiment, when a new IoT hub 110 is set up, its public key is provided to the IoT service 120 and when a new IoT device 101 is set up, it's public key is provided to both the IoT hub 110 and the IoT service 120. Various techniques for securely exchanging the public keys between devices are described below. In one embodiment, all public keys are signed by a master key known to all of the receiving devices (i.e., a form of certificate) so that any receiving device can verify the validity of the public keys by validating the signatures. Thus, these certificates would be exchanged rather than merely exchanging the raw public keys.

As illustrated, in one embodiment, each IoT device 101, 102 includes a secure key storage 1401, 1403, respectively, for security storing each device's private key. Security logic 1402, 1304 then utilizes the securely stored private keys to perform the encryption/decryption operations described herein. Similarly, the IoT hub 110 includes a secure storage 1411 for storing the IoT hub private key and the public keys of the IoT devices 101-102 and the IoT service 120; as well as security logic 1412 for using the keys to perform encryption/decryption operations. Finally, the IoT service 120 may include a secure storage 1421 for security storing its own private key, the public keys of various IoT devices and IoT hubs, and a security logic 1413 for using the keys to encrypt/decrypt communication with IoT hubs and devices. In one embodiment, when the IoT hub 110 receives a public key certificate from an IoT device it can verify it (e.g., by validating the signature using the master key as described above), and then extract the public key from within it and store that public key in it's secure key store 1411.

By way of example, in one embodiment, when the IoT service 120 needs to transmit a command or data to an IoT device 101 (e.g., a command to unlock a door, a request to read a sensor, data to be processed/displayed by the IoT device, etc) the security logic 1413 encrypts the data/command using the public key of the IoT device 101 to generate an encrypted IoT device packet. In one embodiment, it then encrypts the IoT device packet using the public key of the IoT hub 110 to generate an IoT hub packet and transmits the IoT hub packet to the IoT hub 110. In one embodiment, the service 120 signs the encrypted message with it's private key or the master key mentioned above so that the device 101 can verify it is receiving an unaltered message from a trusted source. The device 101 may then validate the signature using the public key corresponding to the private key and/or the master key. As mentioned above, symmetric key exchange/encryption techniques may be used instead of public/private key encryption. In these embodiments, rather than privately storing one key and providing a corresponding public key to other devices, the devices may each be provided with a copy of the same symmetric key to be used for encryption and to validate signatures. One example of a symmetric key algorithm is the Advanced Encryption Standard (AES), although the underlying principles of the invention are not limited to any type of specific symmetric keys.

Using a symmetric key implementation, each device 101 enters into a secure key exchange protocol to exchange a symmetric key with the IoT hub 110. A secure key provisioning protocol such as the Dynamic Symmetric Key Provisioning Protocol (DSKPP) may be used to exchange the keys over a secure communication channel (see, e.g., Request for Comments (RFC) 6063). However, the underlying principles of the invention are not limited to any particular key provisioning protocol.

Once the symmetric keys have been exchanged, they may be used by each device 101 and the IoT hub 110 to encrypt communications. Similarly, the IoT hub 110 and IoT service 120 may perform a secure symmetric key exchange and then use the exchanged symmetric keys to encrypt communications. In one embodiment a new symmetric key is exchanged periodically between the devices 101 and the hub 110 and between the hub 110 and the IoT service 120. In one embodiment, a new symmetric key is exchanged with each new communication session between the devices 101, the hub 110, and the service 120 (e.g., a new key is generated and securely exchanged for each communication session). In one embodiment, if the security module 1412 in the IoT hub is trusted, the service 120 could negotiate a session key with the hub security module 1312 and then the security module 1412 would negotiate a session key with each device 120. Messages from the service 120 would then be decrypted and verified in the hub security module 1412 before being re-encrypted for transmission to the device 101.

In one embodiment, to prevent a compromise on the hub security module 1412 a one-time (permanent) installation key may be negotiated between the device 101 and service 120 at installation time. When sending a message to a device 101 the service 120 could first encrypt/MAC with this device installation key, then encrypt/MAC that with the hub's session key. The hub 110 would then verify and extract the encrypted device blob and send that to the device.

In one embodiment of the invention, a counter mechanism is implemented to prevent replay attacks. For example, each successive communication from the device 101 to the hub 110 (or vice versa) may be assigned a continually increasing counter value. Both the hub 110 and device 101 will track this value and verify that the value is correct in each successive communication between the devices. The same techniques may be implemented between the hub 110 and the service 120. Using a counter in this manner would make it more difficult to spoof the communication between each of the devices (because the counter value would be incorrect). However, even without this a shared installation key between the service and device would prevent network (hub) wide attacks to all devices.

In one embodiment, when using public/private key encryption, the IoT hub 110 uses its private key to decrypt the IoT hub packet and generate the encrypted IoT device packet, which it transmits to the associated IoT device 101. The IoT device 101 then uses its private key to decrypt the IoT device packet to generate the command/data originated from the IoT service 120. It may then process the data and/or execute the command. Using symmetric encryption, each device would encrypt and decrypt with the shared symmetric key. If either case, each transmitting device may also sign the message with it's private key so that the receiving device can verify it's authenticity.

A different set of keys may be used to encrypt communication from the IoT device 101 to the IoT hub 110 and to the IoT service 120. For example, using a public/private key arrangement, in one embodiment, the security logic 1402 on the IoT device 101 uses the public key of the IoT hub 110 to encrypt data packets sent to the IoT hub 110. The security logic 1412 on the IoT hub 110 may then decrypt the data packets using the IoT hub's private key. Similarly, the security logic 1402 on the IoT device 101 and/or the security logic 1412 on the IoT hub 110 may encrypt data packets sent to the IoT service 120 using the public key of the IoT service 120 (which may then be decrypted by the security logic 1413 on the IoT service 120 using the service's private key). Using symmetric keys, the device 101 and hub 110 may share a symmetric key while the hub and service 120 may share a different symmetric key.

While certain specific details are set forth above in the description above, it should be noted that the underlying principles of the invention may be implemented using various different encryption techniques. For example, while some embodiments discussed above use asymmetric public/private key pairs, an alternate embodiment may use symmetric keys securely exchanged between the various IoT devices 101-102, IoT hubs 110, and the IoT service 120. Moreover, in some embodiments, the data/command itself is not encrypted, but a key is used to generate a signature over the data/command (or other data structure). The recipient may then use its key to validate the signature.

Figure 15:
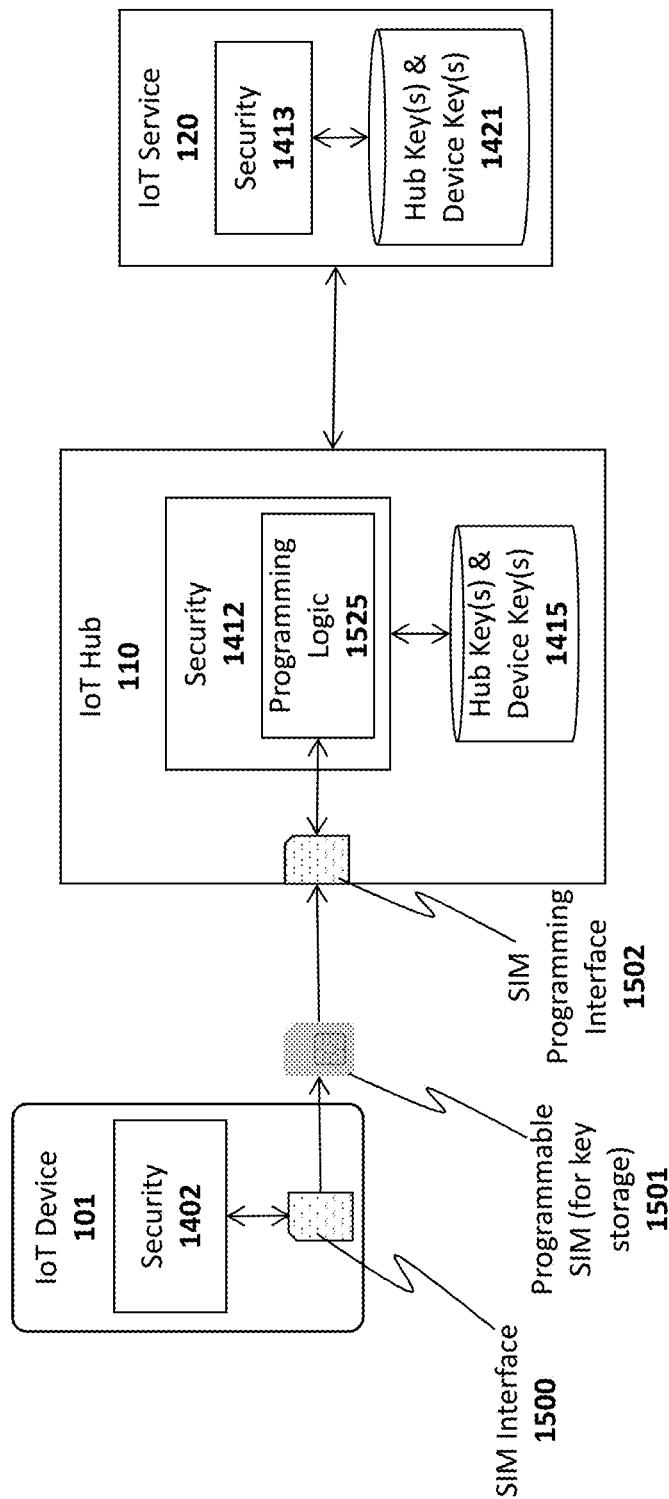
FIG. 15 illustrates one embodiment of an architecture in which a subscriber identity module (SIM) is used to store keys on IoT devices.

As illustrated in FIG. 15, in one embodiment, the secure key storage on each IoT device 101 is implemented using a programmable subscriber identity module (SIM) 1501. In this embodiment, the IoT device 101 may initially be provided to the end user with an un-programmed SIM card 1501 seated within a SIM interface 1500 on the IoT device 101. In order to program the SIM with a set of one or more encryption keys, the user takes the programmable SIM card 1501 out of the SIM interface 500 and inserts it into a SIM programming interface 1502 on the IoT hub 110. Programming logic 1525 on the IoT hub then securely programs the SIM card 1501 to register/pair the IoT device 101 with the IoT hub 110 and IoT service 120. In one embodiment, a public/private key pair may be randomly generated by the programming logic 1525 and the public key of the pair may then be stored in the IoT hub's secure storage device 411 while the private key may be stored within the programmable SIM 1501. In addition, the programming logic 525 may store the public keys of the IoT hub 110, the IoT service 120, and/or any other IoT devices 101 on the SIM card 1401 (to be used by the security logic 1302 on the IoT device 101 to encrypt outgoing data). Once the SIM 1501 is programmed, the new IoT device 101 may be provisioned with the IoT Service 120 using the SIM as a secure identifier (e.g., using existing techniques for registering a device using a SIM). Following provisioning, both the IoT hub 110 and the IoT service 120 will securely store a copy of the IoT device's public key to be used when encrypting communication with the IoT device 101.

The techniques described above with respect to FIG. 15 provide enormous flexibility when providing new IoT devices to end users. Rather than requiring a user to directly register each SIM with a particular service provider upon sale/purchase (as is currently done), the SIM may be programmed directly by the end user via the IoT hub 110 and the results of the programming may be securely communicated to the IoT service 120. Consequently, new IoT devices 101 may be sold to end users from online or local retailers and later securely provisioned with the IoT service 120.

While the registration and encryption techniques are described above within the specific context of a SIM (Subscriber Identity Module), the underlying principles of the invention are not limited to a "SIM" device. Rather, the underlying principles of the invention may be implemented using any type of device having secure storage for storing a set of encryption keys. Moreover, while the embodiments above include a removable SIM device, in one embodiment, the SIM device is not removable but the IoT device itself may be inserted within the programming interface 1502 of the IoT hub 110.

In one embodiment, rather than requiring the user to program the SIM (or other device), the SIM is pre-programmed into the IoT device 101, prior to distribution to the end user. In this embodiment, when the user sets up the IoT device 101, various techniques described herein may be used to securely exchange encryption keys between the IoT hub 110/IoT service 120 and the new IoT device 101.

Figure 16A:
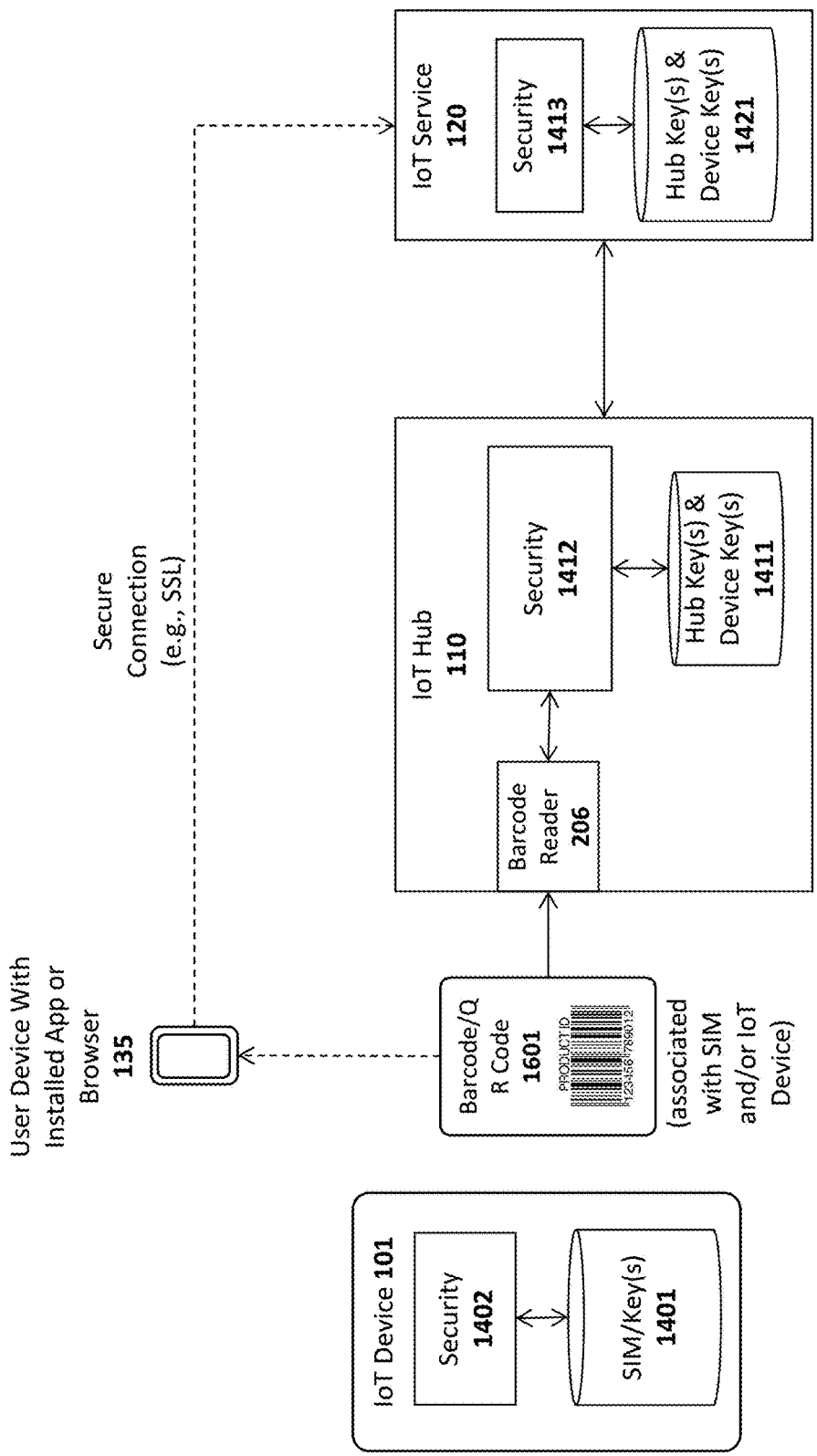
FIG. 16A illustrates one embodiment in which IoT devices are registered using barcodes or QR codes.

For example, as illustrated in FIG. 16A each IoT device 101 or SIM 401 may be packaged with a barcode or QR code 1501 uniquely identifying the IoT device 101 and/or SIM 1501. In one embodiment, the barcode or QR code 1601 comprises an encoded representation of the public key for the IoT device 101 or SIM 1001. Alternatively, the barcode or QR code 1601 may be used by the IoT hub 110 and/or IoT service 120 to identify or generate the public key (e.g., used as a pointer to the public key which is already stored in secure storage). The barcode or QR code 601 may be printed on a separate card (as shown in FIG. 16A) or may be printed directly on the IoT device itself. Regardless of where the barcode is printed, in one embodiment, the IoT hub 110 is equipped with a barcode reader 206 for reading the barcode and providing the resulting data to the security logic 1012 on the IoT hub 110 and/or the security logic 1013 on the IoT service 120. The security logic 1012 on the IoT hub 110 may then store the public key for the IoT device within its secure key storage 1011 and the security logic 1013 on the IoT service 120 may store the public key within its secure storage 1021 (to be used for subsequent encrypted communication).

In one embodiment, the data contained in the barcode or QR code 1601 may also be captured via a user device 135 (e.g., such as an iPhone or Android device) with an installed IoT app or browser-based applet designed by the IoT service provider. Once captured, the barcode data may be securely communicated to the IoT service 120 over a secure connection (e.g., such as a secure sockets layer (SSL) connection). The barcode data may also be provided from the client device 135 to the IoT hub 110 over a secure local connection (e.g., over a local WiFi or Bluetooth LE connection).

The security logic 1002 on the IoT device 101 and the security logic 1012 on the IoT hub 110 may be implemented using hardware, software, firmware or any combination thereof. For example, in one embodiment, the security logic 1002, 1012 is implemented within the chips used for establishing the local communication channel 130 between the IoT device 101 and the IoT hub 110 (e.g., the Bluetooth LE chip if the local channel 130 is Bluetooth LE). Regardless of the specific location of the security logic 1002, 1012, in one embodiment, the security logic 1002, 1012 is designed to establish a secure execution environment for executing certain types of program code. This may be implemented, for example, by using TrustZone technology (available on some ARM processors) and/or Trusted Execution Technology (designed by Intel). Of course, the underlying principles of the invention are not limited to any particular type of secure execution technology.

In one embodiment, the barcode or QR code 1501 may be used to pair each IoT device 101 with the IoT hub 110. For example, rather than using the standard wireless pairing process currently used to pair Bluetooth LE devices, a pairing code embedded within the barcode or QR code 1501 may be provided to the IoT hub 110 to pair the IoT hub with the corresponding IoT device.

Figure 16B:
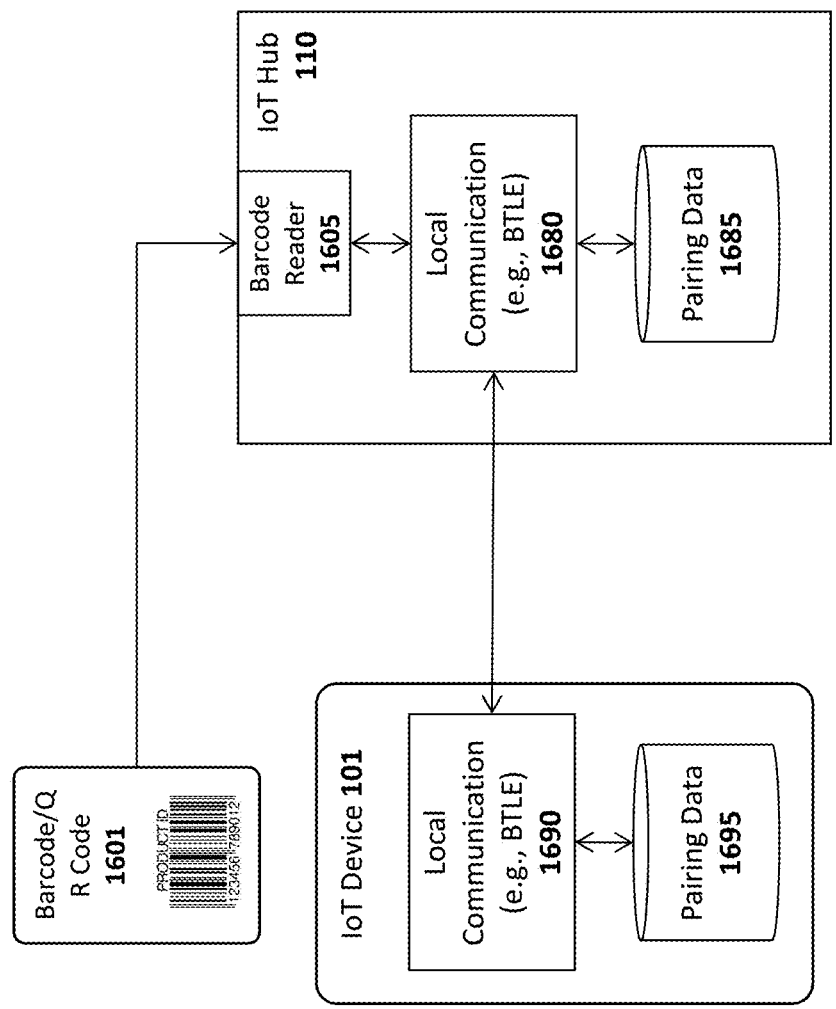
FIG. 16B illustrates one embodiment in which pairing is performed using barcodes or QR codes.

FIG. 16B illustrates one embodiment in which the barcode reader 206 on the IoT hub 110 captures the barcode/QR code 1601 associated with the IoT device 101. As mentioned, the barcode/QR code 1601 may be printed directly on the IoT device 101 or may be printed on a separate card provided with the IoT device 101. In either case, the barcode reader 206 reads the pairing code from the barcode/QR code 1601 and provides the pairing code to the local communication module 1680. In one embodiment, the local communication module 1680 is a Bluetooth LE chip and associated software, although the underlying principles of the invention are not limited to any particular protocol standard. Once the pairing code is received, it is stored in a secure storage containing pairing data 1685 and the IoT device 101 and IoT hub 110 are automatically paired. Each time the IoT hub is paired with a new IoT device in this manner, the pairing data for that pairing is stored within the secure storage 685. In one embodiment, once the local communication module 1680 of the IoT hub 110 receives the pairing code, it may use the code as a key to encrypt communications over the local wireless channel with the IoT device 101.

Similarly, on the IoT device 101 side, the local communication module 1590 stores pairing data within a local secure storage device 1595 indicating the pairing with the IoT hub. The pairing data 1695 may include the pre-programmed pairing code identified in the barcode/QR code 1601. The pairing data 1695 may also include pairing data received from the local communication module 1680 on the IoT hub 110 required for establishing a secure local communication channel (e.g., an additional key to encrypt communication with the IoT hub 110).

Thus, the barcode/QR code 1601 may be used to perform local pairing in a far more secure manner than current wireless pairing protocols because the pairing code is not transmitted over the air. In addition, in one embodiment, the same barcode/QR code 1601 used for pairing may be used to identify encryption keys to build a secure connection from the IoT device 101 to the IoT hub 110 and from the IoT hub 110 to the IoT service 120.

Figure 17:
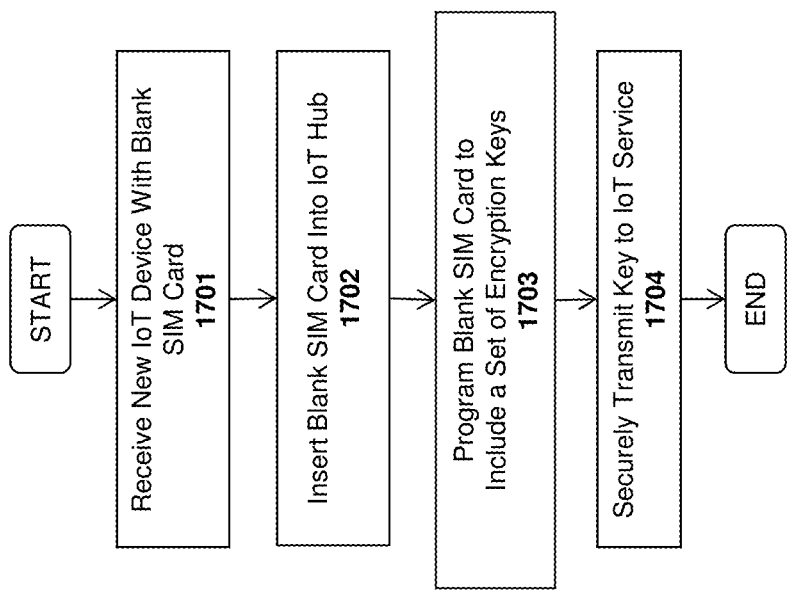
FIG. 17 illustrates one embodiment of a method for programming a SIM using an IoT hub.

A method for programming a SIM card in accordance with one embodiment of the invention is illustrated in FIG. 17. The method may be implemented within the system architecture described above, but is not limited to any particular system architecture.

At 1701, a user receives a new IoT device with a blank SIM card and, at 1602, the user inserts the blank SIM card into an IoT hub. At 1703, the user programs the blank SIM card with a set of one or more encryption keys. For example, as mentioned above, in one embodiment, the IoT hub may randomly generate a public/private key pair and store the private key on the SIM card and the public key in its local secure storage. In addition, at 1704, at least the public key is transmitted to the IoT service so that it may be used to identify the IoT device and establish encrypted communication with the IoT device. As mentioned above, in one embodiment, a programmable device other than a "SIM" card may be used to perform the same functions as the SIM card in the method shown in FIG. 17.

Figure 18:
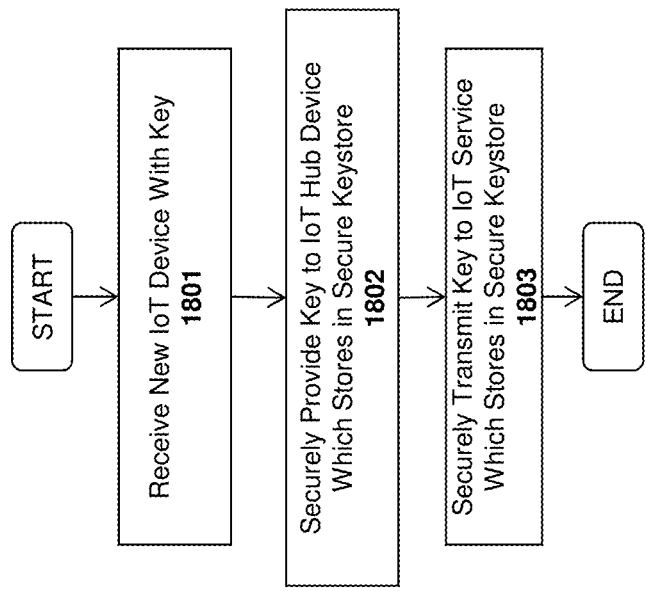
FIG. 18 illustrates one embodiment of a method for registering an IoT device with an IoT hub and IoT service.

A method for integrating a new IoT device into a network is illustrated in FIG. 18. The method may be implemented within the system architecture described above, but is not limited to any particular system architecture.

At 1801, a user receives a new IoT device to which an encryption key has been pre-assigned. At 1802, the key is securely provided to the IoT hub. As mentioned above, in one embodiment, this involves reading a barcode associated with the IoT device to identify the public key of a public/private key pair assigned to the device. The barcode may be read directly by the IoT hub or captured via a mobile device via an app or browser. In an alternate embodiment, a secure communication channel such as a Bluetooth LE channel, a near field communication (NFC) channel or a secure WiFi channel may be established between the IoT device and the IoT hub to exchange the key. Regardless of how the key is transmitted, once received, it is stored in the secure keystore of the IoT hub device. As mentioned above, various secure execution technologies may be used on the IoT hub to store and protect the key such as Secure Enclaves, Trusted Execution Technology (TXT), and/or Trustzone. In addition, at 1803, the key is securely transmitted to the IoT service which stores the key in its own secure keystore. It may then use the key to encrypt communication with the IoT device. One again, the exchange may be implemented using a certificate/signed key. Within the hub 110 it is particularly important to prevent modification/addition/removal of the stored keys.

Figure 19:
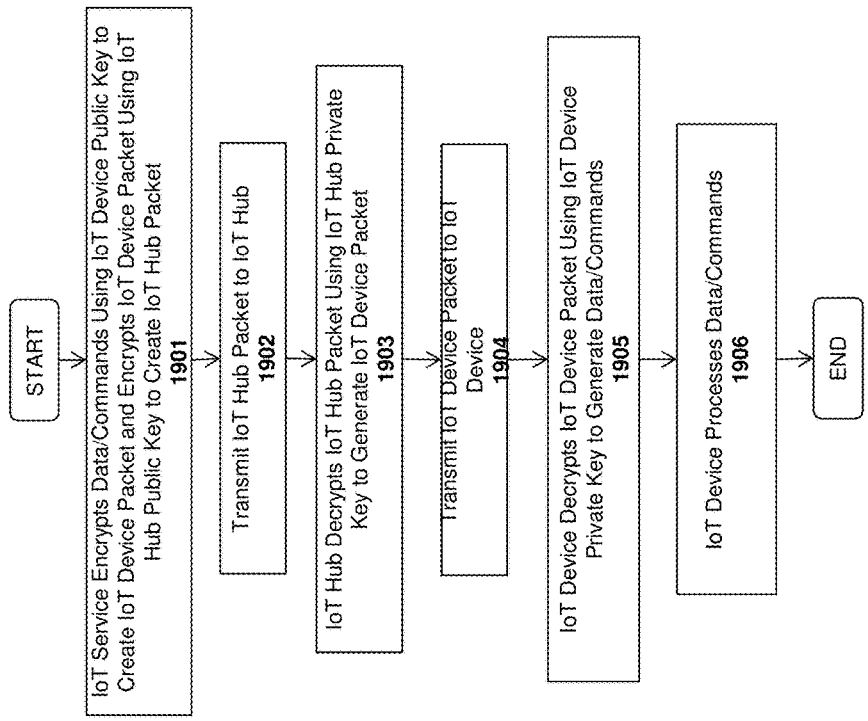
FIG. 19 illustrates one embodiment of a method for encrypting data to be transmitted to an IoT device.

A method for securely communicating commands/data to an IoT device using public/private keys is illustrated in FIG. 19. The method may be implemented within the system architecture described above, but is not limited to any particular system architecture.

At 1901, the IoT service encrypts the data/commands using the IoT device public key to create an IoT device packet. It then encrypts the IoT device packet using IoT hub's public key to create the IoT hub packet (e.g., creating an IoT hub wrapper around the IoT device packet). At 1902, the IoT service transmits the IoT hub packet to the IoT hub. At 1903, the IoT hub decrypts the IoT hub packet using the IoT hub's private key to generate the IoT device packet. At 1904 it then transmits the IoT device packet to the IoT device which, at 1905, decrypts the IoT device packet using the IoT device private key to generate the data/commands. At 1906, the IoT device processes the data/commands.

In an embodiment which uses symmetric keys, a symmetric key exchange may be negotiated between each of the devices (e.g., each device and the hub and between the hub and the service). Once the key exchange is complete, each transmitting device encrypts and/or signs each transmission using the symmetric key before transmitting data to the receiving device.

Apparatus and Method for Communicating Data Through an Intermediary Device

As mentioned above, because the wireless technologies used to interconnect IoT devices such as Bluetooth LE are generally short range technologies, if the hub for an IoT implementation is outside the range of an IoT device, the IoT device will not be able to transmit data to the IoT hub (and vice versa).

To address this deficiency, one embodiment of the invention provides a mechanism for an IoT device which is outside of the wireless range of the IoT hub to periodically connect with one or more mobile devices when the mobile devices are within range. Once connected, the IoT device can transmit any data which needs to be provided to the IoT hub to the mobile device which then forwards the data to the IoT hub.

Figure 20:
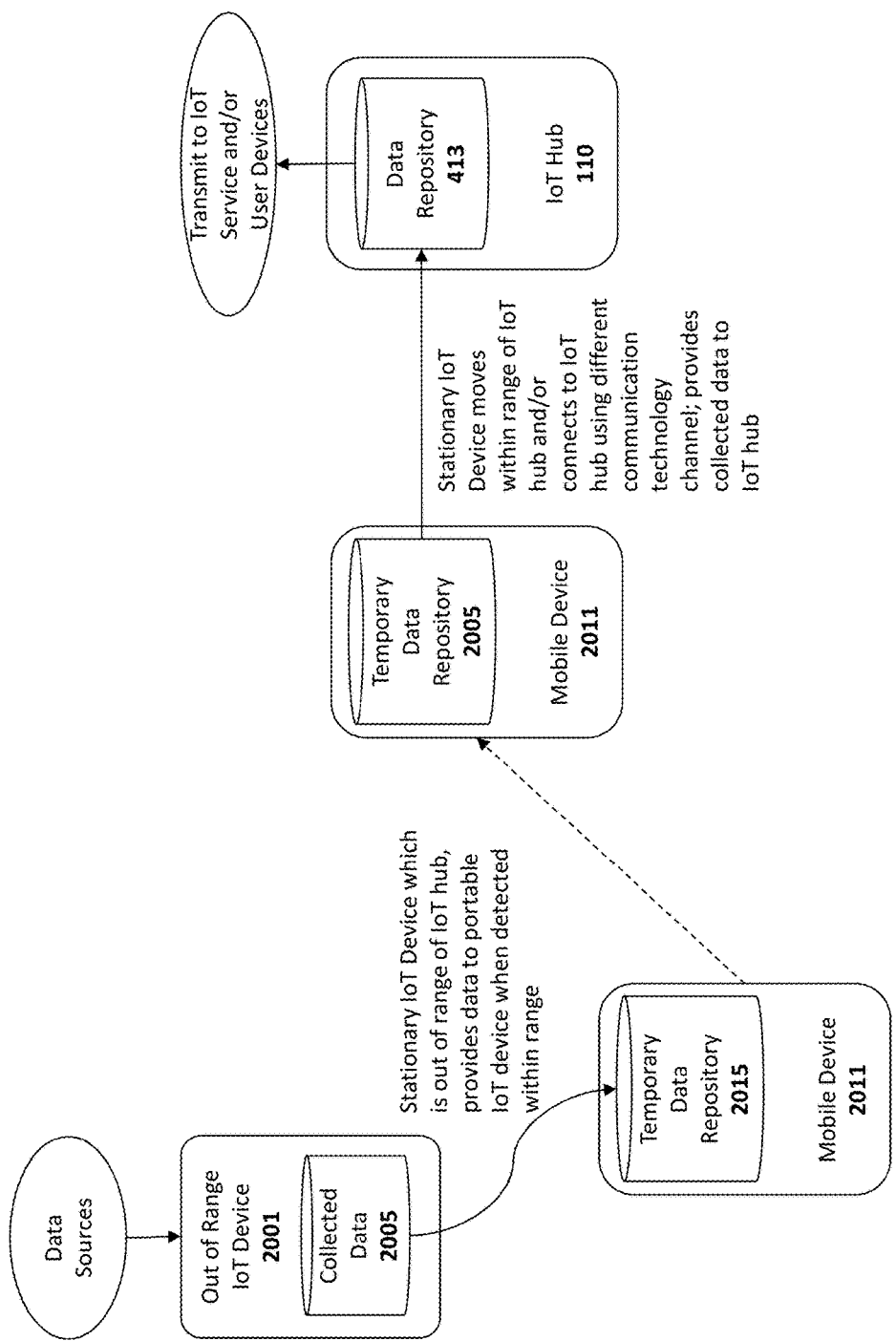
FIG. 20 illustrates one embodiment of a system in which an intermediary mobile device collects data from a stationary IoT device and provides the data to an IoT hub.

As illustrated in FIG. 20 one embodiment includes an IoT hub 110, an IoT device 2001 which is out of range of the IoT hub 110 and a mobile device 2011. The out of range IoT device 2001 may include any form of IoT device capable of collecting and communicating data. For example, the IoT device 2001 may comprise a data collection device configured within a refrigerator to monitor the food items available in the refrigerator, the users who consume the food items, and the current temperature. Of course, the underlying principles of the invention are not limited to any particular type of IoT device. The techniques described herein may be implemented using any type of IoT device including those used to collect and transmit data for smart meters, stoves, washers, dryers, lighting systems, HVAC systems, and audiovisual equipment, to name just a few.

Moreover, the mobile device In operation, the IoT device 2011 illustrated in FIG. 20 may be any form of mobile device capable of communicating and storing data. For example, in one embodiment, the mobile device 2011 is a smartphone with an app installed thereon to facilitate the techniques described herein. In another embodiment, the mobile device 2011 comprises a wearable device such as a communication token affixed to a neckless or bracelet, a smartwatch or a fitness device. The wearable token may be particularly useful for elderly users or other users who do not own a smartphone device.

In operation, the out of range IoT device 2001 may periodically or continually check for connectivity with a mobile device 2011. Upon establishing a connection (e.g., as the result of the user moving within the vicinity of the refrigerator) any collected data 2005 on the IoT device 2001 is automatically transmitted to a temporary data repository 2015 on the mobile device 2011. In one embodiment, the IoT device 2001 and mobile device 2011 establish a local wireless communication channel using a low power wireless standard such as BTLE. In such a case, the mobile device 2011 may initially be paired with the IoT device 2001 using known pairing techniques.

One the data has been transferred to the temporary data repository, the mobile device 2011 will transmit the data once communication is established with the IoT hub 110 (e.g., when the user walks within the range of the IoT hub 110). The IoT hub may then store the data in a central data repository 413 and/or send the data over the Internet to one or more services and/or other user devices. In one embodiment, the mobile device 2011 may use a different type of communication channel to provide the data to the IoT hub 110 (potentially a higher power communication channel such as WiFi).

Figure 21:
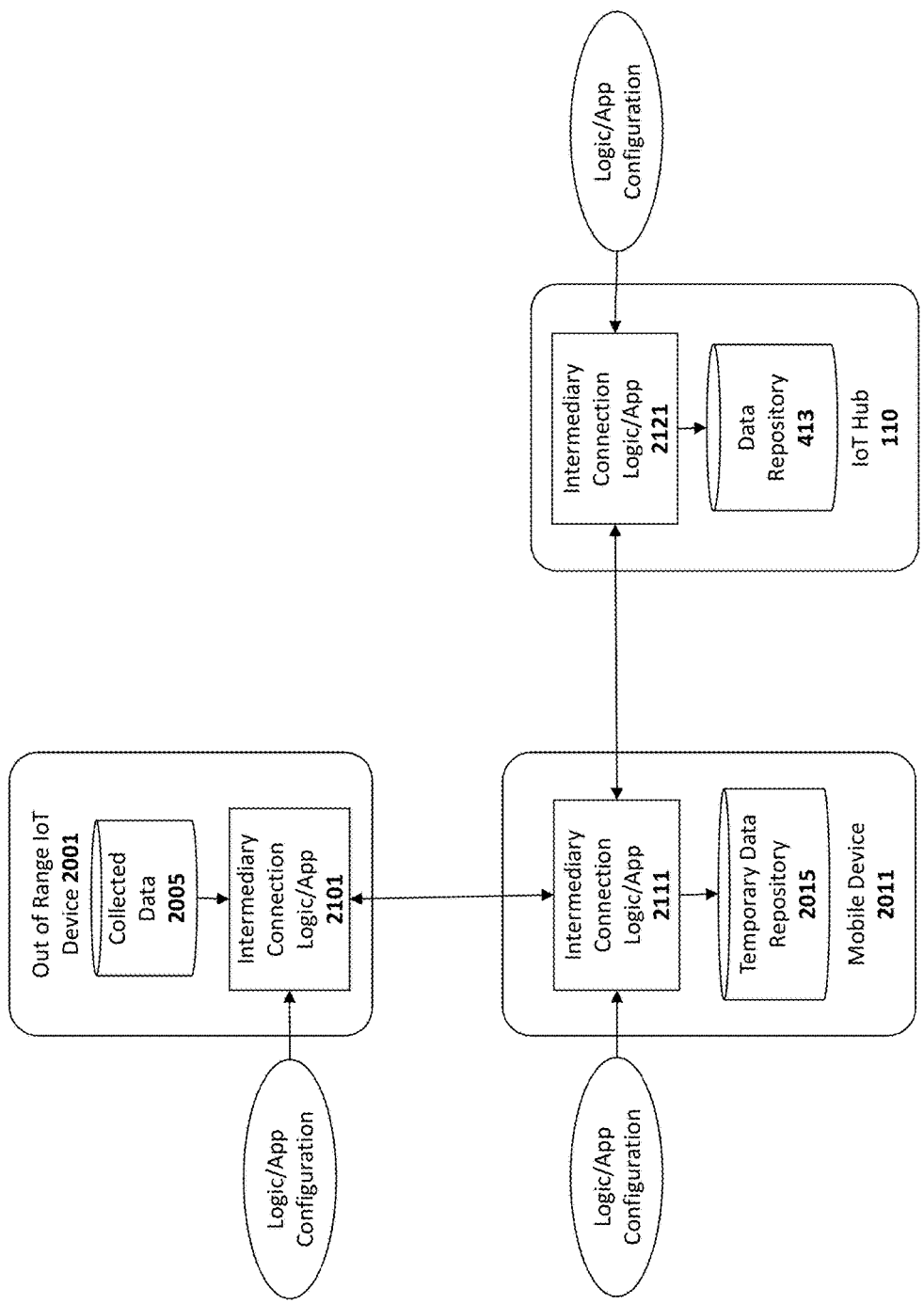
FIG. 21 illustrates intermediary connection logic implemented in one embodiment of the invention.

The out of range IoT device 2001, the mobile device 2011, and the IoT hub may all be configured with program code and/or logic to implement the techniques described herein. As illustrated in FIG. 21, for example, the IoT device 2001 may be configured with intermediary connection logic and/or application, the mobile device 2011 may be configured with an intermediary connection logic/application, and the IoT hub 110 may be configured with an intermediary connection logic/application 2121 to perform the operations described herein. The intermediary connection logic/application on each device may be implemented in hardware, software, or any combination thereof. In one embodiment, the intermediary connection logic/application 2101 of the IoT device 2001 searches and establishes a connection with the intermediary connection logic/application 2111 on the mobile device (which may be implemented as a device app) to transfer the data to the temporary data repository 2015. The intermediary connection logic/application 2101 on the mobile device 2011 then forwards the data to the intermediary connection logic/application on the IoT hub, which stores the data in the central data repository 413.

As illustrated in FIG. 21, the intermediary connection logic/applications 2101, 2111, 2121, on each device may be configured based on the application at hand. For example, for a refrigerator, the connection logic/application 2101 may only need to transmit a few packets on a periodic basis. For other applications (e.g., temperature sensors), the connection logic/application 2101 may need to transmit more frequent updates.

Rather than a mobile device 2011, in one embodiment, the IoT device 2001 may be configured to establish a wireless connection with one or more intermediary IoT devices, which are located within range of the IoT hub 110. In this embodiment, any IoT devices 2001 out of range of the IoT hub may be linked to the hub by forming a "chain" using other IoT devices.

In addition, while only a single mobile device 2011 is illustrated in FIGS. 20-21 for simplicity, in one embodiment, multiple such mobile devices of different users may be configured to communicate with the IoT device 2001. Moreover, the same techniques may be implemented for multiple other IoT devices, thereby forming an intermediary device data collection system across the entire home.

Moreover, in one embodiment, the techniques described herein may be used to collect various different types of pertinent data. For example, in one embodiment, each time the mobile device 2011 connects with the IoT device 2001, the identity of the user may be included with the collected data 2005. In this manner, the IoT system may be used to track the behavior of different users within the home. For example, if used within a refrigerator, the collected data 2005 may then include the identify of each user who passes by fridge, each user who opens the fridge, and the specific food items consumed by each user. Different types of data may be collected from other types of IoT devices. Using this data the system is able to determine, for example, which user washes clothes, which user watches TV on a given day, the times at which each user goes to sleep and wakes up, etc. All of this crowd-sourced data may then be compiled within the data repository 413 of the IoT hub and/or forwarded to an external service or user.

Another beneficial application of the techniques described herein is for monitoring elderly users who may need assistance. For this application, the mobile device 2011 may be a very small token worn by the elderly user to collect the information in different rooms of the user's home. Each time the user opens the refrigerator, for example, this data will be included with the collected data 2005 and transferred to the IoT hub 110 via the token. The IoT hub may then provide the data to one or more external users (e.g., the children or other individuals who care for the elderly user). If data has not been collected for a specified period of time (e.g., 12 hours), then this means that the elderly user has not been moving around the home and/or has not been opening the refrigerator. The IoT hub 110 or an external service connected to the IoT hub may then transmit an alert notification to these other individuals, informing them that they should check on the elderly user. In addition, the collected data 2005 may include other pertinent information such as the food being consumed by the user and whether a trip to the grocery store is needed, whether and how frequently the elderly user is watching TV, the frequency with which the elderly user washes clothes, etc.

In another implementation, the if there is a problem with an electronic device such as a washer, refrigerator, HVAC system, etc, the collected data may include an indication of a part that needs to be replaced. In such a case, a notification may be sent to a technician with a request to fix the problem. The technician may then arrive at the home with the needed replacement part.

Figure 22:
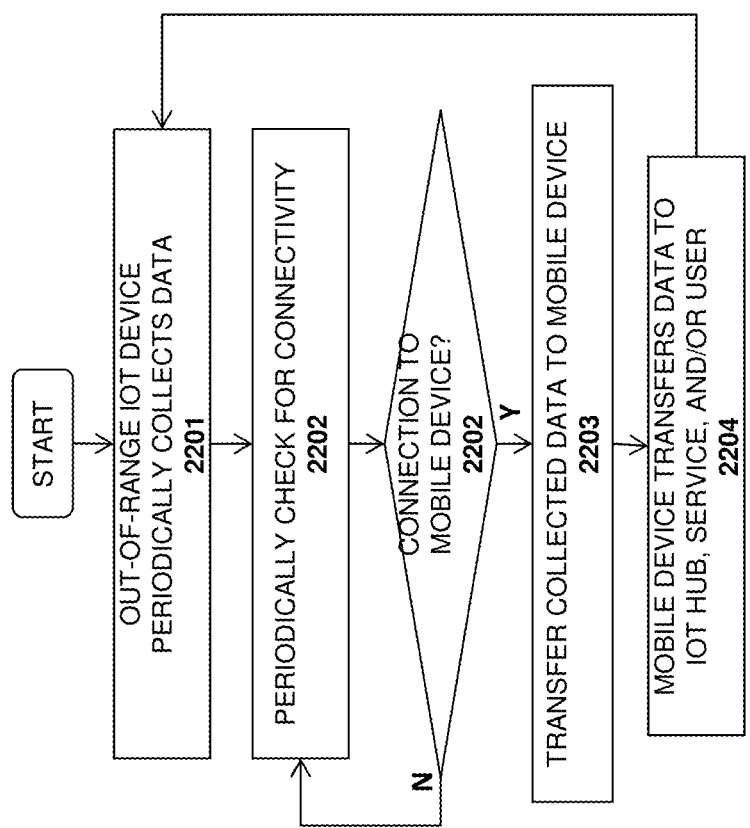
FIG. 22 illustrates a method in accordance with one embodiment of the invention.

A method in accordance with one embodiment of the invention is illustrated in FIG. 22. The method may be implemented within the context of the architectures described above, but is not limited to any particular architecture.

At 2201, an IoT device which is out of range of the IoT hub periodically collects data (e.g., opening of the refrigerator door, food items used, etc). At 2202 the IoT device periodically or continually checks for connectivity with a mobile device (e.g., using standard local wireless techniques for establishing a connection such as those specified by the BTLE standard). If the connection to the mobile device is established, determined at 2202, then at 2203, the collected data is transferred to the mobile device at 2203. At 2204, the mobile device transfers the data to the IoT hub, an external service and/or a user. As mentioned, the mobile device may transmit the data immediately if it is already connected (e.g., via a WiFi link).

In addition to collecting data from IoT devices, in one embodiment, the techniques described herein may be used to update or otherwise provide data to IoT devices. One example is shown in FIG. 23A, which shows an IoT hub 110 with program code updates 2301 that need to be installed on an IoT device 2001 (or a group of such IoT devices). The program code updates may include system updates, patches, configuration data and any other data needed for the IoT device to operate as desired by the user. In one embodiment, the user may specify configuration options for the IoT device 2001 via a mobile device or computer which are then stored on the IoT hub 110 and provided to the IoT device using the techniques described herein. Specifically, in one embodiment, the intermediary connection logic/application 2121 on the IoT hub 110 communicates with the intermediary connection logic/application 2111 on the mobile device 2011 to store the program code updates within a temporary storage 2015. When the mobile device 2011 enters the range of the IoT device 2001, the intermediary connection logic/application 2111 on the mobile device 2011 connects with the intermediary/connection logic/application 2101 on the IoT device 2001 to provide the program code updates to the device. In one embodiment, the IoT device 2001 may then enter into an automated update process to install the new program code updates and/or data.

Figure 23B:
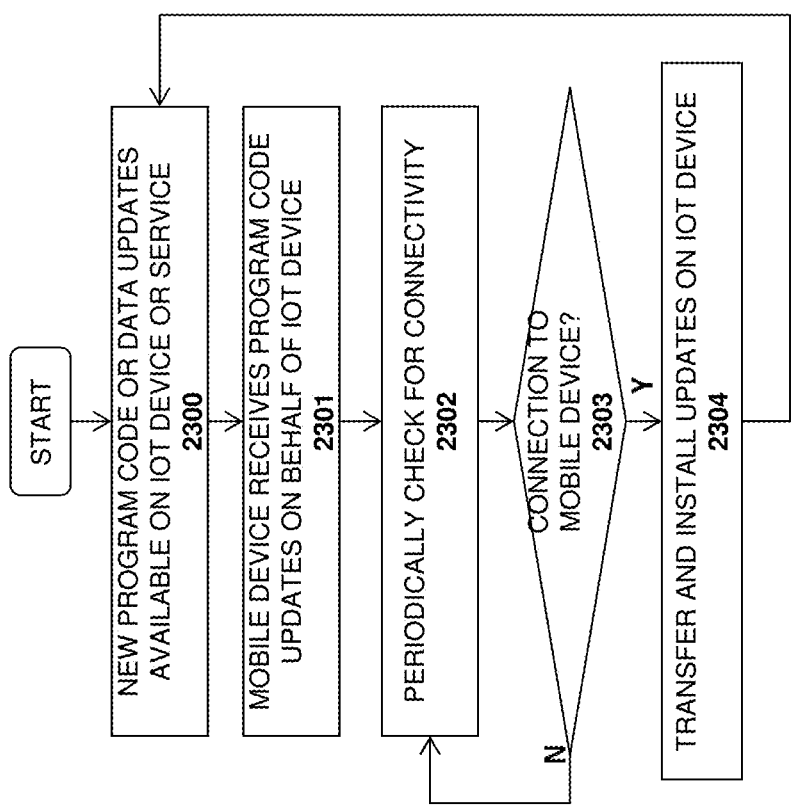
FIG. 23B illustrates an embodiment of a method in which program code and data updates are provided to the IoT device.

A method for updating an IoT device is shown in FIG. 23B. The method may be implemented within the context of the system architectures described above, but is not limited to any particular system architectures.

At 2300 new program code or data updates are made available on the IoT hub and/or an external service (e.g., coupled to the mobile device over the Internet). At 2301, the mobile device receives and stores the program code or data updates on behalf of the IoT device. The IoT device and/or mobile device periodically check to determine whether a connection has been established at 2302. If a connection is established, determined at 2303, then at 2304 the updates are transferred to the IoT device and installed.

Apparatus and Method for Establishing Secure Communication Channels in an Internet of Things (IoT) System In one embodiment of the invention, encryption and decryption of data is performed between the IoT service 120 and each IoT device 101, regardless of the intermediate devices used to support the communication channel (e.g., such as the user's mobile device 611 and/or the IoT hub 110). One embodiment which communicates via an IoT hub 110 is illustrated in FIG. 24A and another embodiment which does not require an IoT hub is illustrated in FIG. 24B.

Figure 24A:
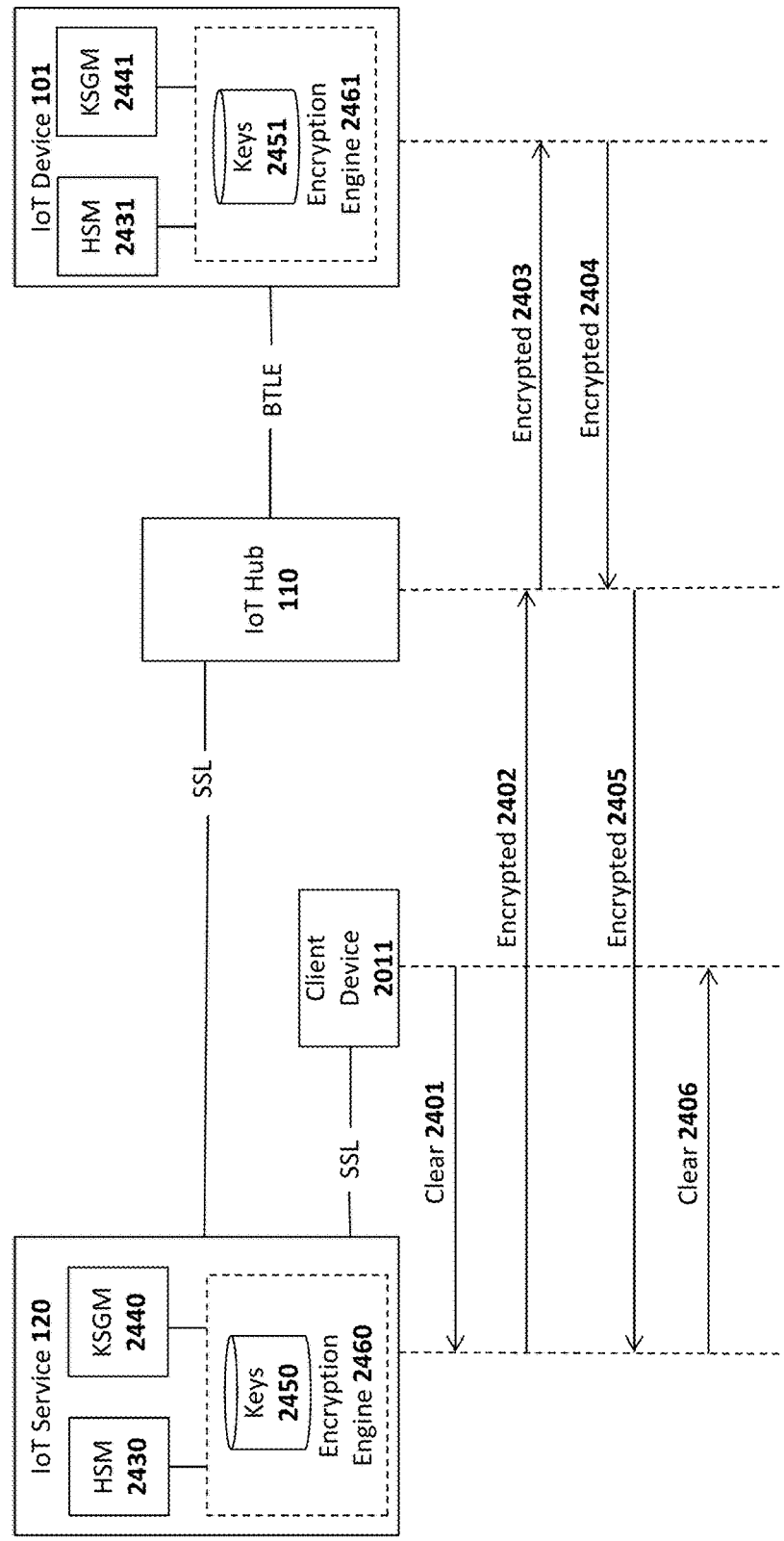
FIGS. 24A-B illustrate different embodiments of the invention for encrypting data between an IoT service and an IoT device.
Figure 24B:
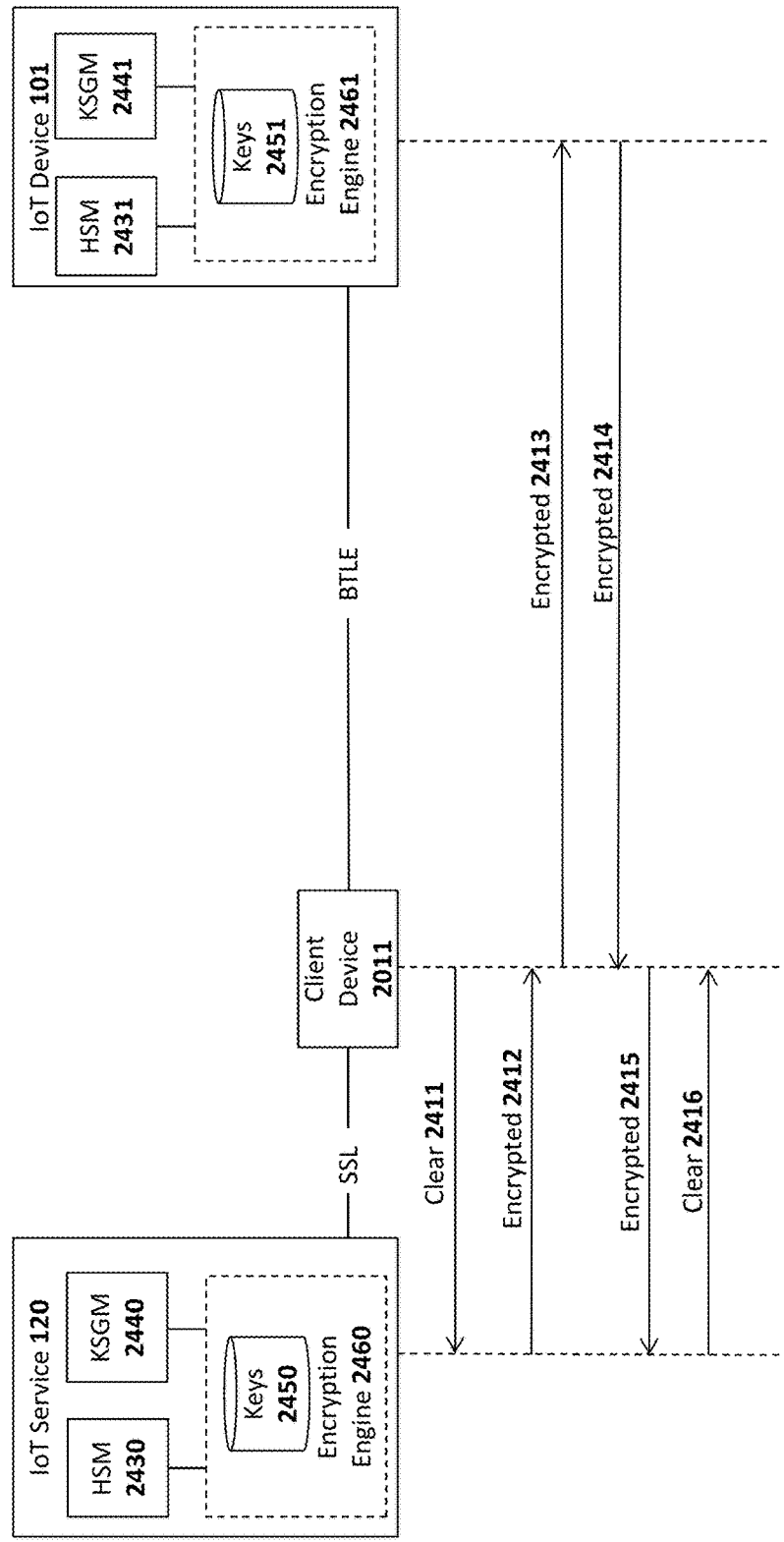

Turning first to FIG. 24A, the IoT service 120 includes an encryption engine 2460 which manages a set of "service session keys" 2450 and each IoT device 101 includes an encryption engine 2461 which manages a set of "device session keys" 2451 for encrypting/decrypting communication between the IoT device 101 and IoT service 120. The encryption engines may rely on different hardware modules when performing the security/encryption techniques described herein including a hardware security module 2430-2431 for (among other things) generating a session public/private key pair and preventing access to the private session key of the pair and a key stream generation module 2440-2441 for generating a key stream using a derived secret. In one embodiment, the service session keys 2450 and the device session keys 2451 comprise related public/private key pairs. For example, in one embodiment, the device session keys 2451 on the IoT device 101 include a public key of the IoT service 120 and a private key of the IoT device 101. As discussed in detail below, in one embodiment, to establish a secure communication session, the public/private session key pairs, 2450 and 2451, are used by each encryption engine, 2460 and 2461, respectively, to generate the same secret which is then used by the SKGMs 2440-2441 to generate a key stream to encrypt and decrypt communication between the IoT service 120 and the IoT device 101. Additional details associated with generation and use of the secret in accordance with one embodiment of the invention are provided below.

In FIG. 24A, once the secret has been generated using the keys 2450-2451, the client will always send messages to the IoT device 101 through the IoT service 120, as indicated by Clear transaction 2411. "Clear" as used herein is meant to indicate that the underlying message is not encrypted using the encryption techniques described herein. However, as illustrated, in one embodiment, a secure sockets layer (SSL) channel or other secure channel (e.g., an Internet Protocol Security (IPSEC) channel) is established between the client device 611 and IoT service 120 to protect the communication. The encryption engine 2460 on the IoT service 120 then encrypts the message using the generated secret and transmits the encrypted message to the IoT hub 110 at 2402. Rather than using the secret to encrypt the message directly, in one embodiment, the secret and a counter value are used to generate a key stream, which is used to encrypt each message packet. Details of this embodiment are described below with respect to FIG. 25.

As illustrated, an SSL connection or other secure channel may be established between the IoT service 120 and the IoT hub 110. The IoT hub 110 (which does not have the ability to decrypt the message in one embodiment) transmits the encrypted message to the IoT device at 2403 (e.g., over a Bluetooth Low Energy (BTLE) communication channel). The encryption engine 2461 on the IoT device 101 may then decrypt the message using the secret and process the message contents. In an embodiment which uses the secret to generate a key stream, the encryption engine 2461 may generate the key stream using the secret and a counter value and then use the key stream for decryption of the message packet.

The message itself may comprise any form of communication between the IoT service 120 and IoT device 101. For example, the message may comprise a command packet instructing the IoT device 101 to perform a particular function such as taking a measurement and reporting the result back to the client device 611 or may include configuration data to configure the operation of the IoT device 101.

If a response is required, the encryption engine 2461 on the IoT device 101 uses the secret or a derived key stream to encrypt the response and transmits the encrypted response to the IoT hub 110 at 2404, which forwards the response to the IoT service 120 at 2405. The encryption engine 2460 on the IoT service 120 then decrypts the response using the secret or a derived key stream and transmits the decrypted response to the client device 611 at 2406 (e.g., over the SSL or other secure communication channel).

FIG. 24B illustrates an embodiment which does not require an IoT hub. Rather, in this embodiment, communication between the IoT device 101 and IoT service 120 occurs through the client device 611 (e.g., as in the embodiments described above with respect to FIGS. 6-9B). In this embodiment, to transmit a message to the IoT device 101 the client device 611 transmits an unencrypted version of the message to the IoT service 120 at 2411. The encryption engine 2460 encrypts the message using the secret or the derived key stream and transmits the encrypted message back to the client device 611 at 2412. The client device 611 then forwards the encrypted message to the IoT device 101 at 2413, and the encryption engine 2461 decrypts the message using the secret or the derived key stream. The IoT device 101 may then process the message as described herein. If a response is required, the encryption engine 2461 encrypts the response using the secret and transmits the encrypted response to the client device 611 at 2414, which forwards the encrypted response to the IoT service 120 at 2415. The encryption engine 2460 then decrypts the response and transmits the decrypted response to the client device 611 at 2416.

Figure 25:
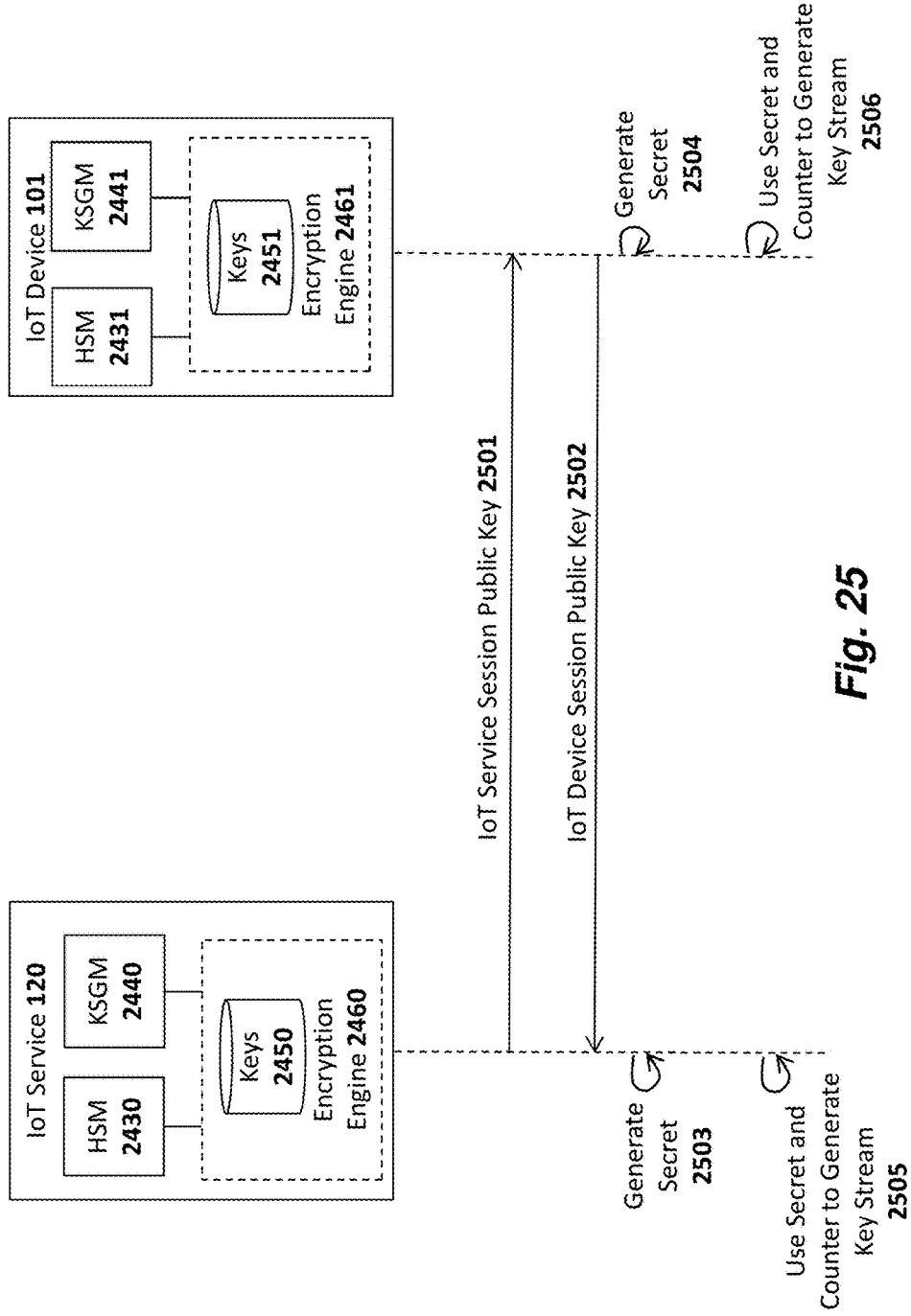
FIG. 25 illustrates embodiments of the invention for performing a secure key exchange, generating a common secret, and using the secret to generate a key stream.

FIG. 25 illustrates a key exchange and key stream generation which may initially be performed between the IoT service 120 and the IoT device 101. In one embodiment, this key exchange may be performed each time the IoT service 120 and IoT device 101 establish a new communication session. Alternatively, the key exchange may be performed and the exchanged session keys may be used for a specified period of time (e.g., a day, a week, etc). While no intermediate devices are shown in FIG. 25 for simplicity, communication may occur through the IoT hub 110 and/or the client device 611.

In one embodiment, the encryption engine 2460 of the IoT service 120 sends a command to the HSM 2430 (e.g., which may be such as a CloudHSM offered by Amazon®) to generate a session public/private key pair. The HSM 2430 may subsequently prevent access to the private session key of the pair. Similarly, the encryption engine on the IoT device 101 may transmit a command to the HSM 2431 (e.g., such as an Atecc508 HSM from Atmel Corporation®) which generates a session public/private key pair and prevents access to the session private key of the pair. Of course, the underlying principles of the invention are not limited to any specific type of encryption engine or manufacturer.

In one embodiment, the IoT service 120 transmits its session public key generated using the HSM 2430 to the IoT device 101 at 2501. The IoT device uses its HSM 2431 to generate its own session public/private key pair and, at 2502, transmits its public key of the pair to the IoT service 120. In one embodiment, the encryption engines 2460-2461 use an Elliptic curve Diffie-Hellman (ECDH) protocol, which is an anonymous key agreement that allows two parties with an elliptic curve public-private key pair, to establish a shared secret. In one embodiment, using these techniques, at 2503, the encryption engine 2460 of the IoT service 120 generates the secret using the IoT device session public key and its own session private key. Similarly, at 2504, the encryption engine 2461 of the IoT device 101 independently generates the same secret using the IoT service 120 session public key and its own session private key. More specifically, in one embodiment, the encryption engine 2460 on the IoT service 120 generates the secret according to the formula secret=IoT device session pub key*IoT service session private key, where '*' means that the IoT device session public key is point-multiplied by the IoT service session private key. The encryption engine 2461 on the IoT device 101 generates the secret according to the formula secret=IoT service session pub key*IoT device session private key, where the IoT service session public key is point multiplied by the IoT device session private key. In the end, the IoT service 120 and IoT device 101 have both generated the same secret to be used to encrypt communication as described below. In one embodiment, the encryption engines 2460-2461 rely on a hardware module such as the KSGMs 2440-2441 respectively to perform the above operations for generating the secret.

Once the secret has been determined, it may be used by the encryption engines 2460 and 2461 to encrypt and decrypt data directly. Alternatively, in one embodiment, the encryption engines 2460-2461 send commands to the KSGMs 2440-2441 to generate a new key stream using the secret to encrypt/decrypt each data packet (i.e., a new key stream data structure is generated for each packet). In particular, one embodiment of the key stream generation module 2440-2441 implements a Galois/Counter Mode (GCM) in which a counter value is incremented for each data packet and is used in combination with the secret to generate the key stream. Thus, to transmit a data packet to the IoT service 120, the encryption engine 2461 of the IoT device 101 uses the secret and the current counter value to cause the KSGMs 2440-2441 to generate a new key stream and increment the counter value for generating the next key stream. The newly-generated key stream is then used to encrypt the data packet prior to transmission to the IoT service 120. In one embodiment, the key stream is XORed with the data to generate the encrypted data packet. In one embodiment, the IoT device 101 transmits the counter value with the encrypted data packet to the IoT service 120. The encryption engine 2460 on the IoT service then communicates with the KSGM 2440 which uses the received counter value and the secret to generate the key stream (which should be the same key stream because the same secret and counter value are used) and uses the generated key stream to decrypt the data packet.

In one embodiment, data packets transmitted from the IoT service 120 to the IoT device 101 are encrypted in the same manner. Specifically, a counter is incremented for each data packet and used along with the secret to generate a new key stream. The key stream is then used to encrypt the data (e.g., performing an XOR of the data and the key stream) and the encrypted data packet is transmitted with the counter value to the IoT device 101. The encryption engine 2461 on the IoT device 101 then communicates with the KSGM 2441 which uses the counter value and the secret to generate the same key stream which is used to decrypt the data packet. Thus, in this embodiment, the encryption engines 2460-2461 use their own counter values to generate a key stream to encrypt data and use the counter values received with the encrypted data packets to generate a key stream to decrypt the data.

In one embodiment, each encryption engine 2460-2461 keeps track of the last counter value it received from the other and includes sequencing logic to detect whether a counter value is received out of sequence or if the same counter value is received more than once. If a counter value is received out of sequence, or if the same counter value is received more than once, this may indicate that a replay attack is being attempted. In response, the encryption engines 2460-2461 may disconnect from the communication channel and/or may generate a security alert.

Figure 26:
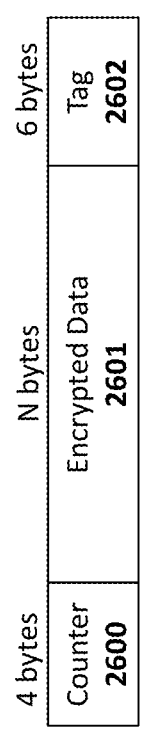
FIG. 26 illustrates a packet structure in accordance with one embodiment of the invention.

FIG. 26 illustrates an exemplary encrypted data packet employed in one embodiment of the invention comprising a 4-byte counter value 2600, a variable-sized encrypted data field 2601, and a 6-byte tag 2602. In one embodiment, the tag 2602 comprises a checksum value to validate the decrypted data (once it has been decrypted).

As mentioned, in one embodiment, the session public/private key pairs 2450-2451 exchanged between the IoT service 120 and IoT device 101 may be generated periodically and/or in response to the initiation of each new communication session.

One embodiment of the invention implements additional techniques for authenticating sessions between the IoT service 120 and IoT device 101. In particular, in one embodiment, hierarchy of public/private key pairs is used including a master key pair, a set of factory key pairs, and a set of IoT service key pairs, and a set of IoT device key pairs. In one embodiment, the master key pair comprises a root of trust for all of the other key pairs and is maintained in a single, highly secure location (e.g., under the control of the organization implementing the IoT systems described herein). The master private key may be used to generate signatures over (and thereby authenticate) various other key pairs such as the factory key pairs. The signatures may then be verified using the master public key. In one embodiment, each factory which manufactures IoT devices is assigned its own factory key pair which may then be used to authenticate IoT service keys and IoT device keys. For example, in one embodiment, a factory private key is used to generate a signature over IoT service public keys and IoT device public keys. These signature may then be verified using the corresponding factory public key. Note that these IoT service/device public keys are not the same as the "session" public/private keys described above with respect to FIGS. 24A-B. The session public/private keys described above are temporary (i.e., generated for a service/device session) while the IoT service/device key pairs are permanent (i.e., generated at the factory).

With the foregoing relationships between master keys, factory keys, service/device keys in mind, one embodiment of the invention performs the following operations to provide additional layers of authentication and security between the IoT service 120 and IoT device 101:

A. In one embodiment, the IoT service 120 initially generates a message containing the following:
  1. The IoT service's unique ID:
     The IoT service's serial number;
     a Timestamp;
     The ID of the factory key used to sign this unique ID;
     a Class of the unique ID (i.e., a service);
     IoT service's public key
     The signature over the unique ID.
  2. The Factory Certificate including:
     A timestamp
     The ID of the master key used to sign the certificate
     The factory public key
     The signature of the Factory Certificate
  3. IoT service session public key (as described above with respect to FIGS. 24A-B)
  4. IoT service session public key signature (e.g., signed with the IoT service's private key)
B. In one embodiment, the message is sent to the IoT device on the negotiation channel (described below). The IoT device parses the message and:
  1. Verifies the signature of the factory certificate (only if present in the message payload)
  2. Verifies the signature of the unique ID using the key identified by the unique ID
  3. Verifies the IoT service session public key signature using the IoT service's public key from the unique ID
  4. Saves the IoT service's public key as well as the IoT service's session public key
  5. Generates the IoT device session key pair
C. The IoT device then generates a message containing the following:
  1. IoT device's unique ID
     IoT device serial number
     Timestamp
     ID of factory key used to sign this unique ID
     Class of unique ID (i.e., IoT device)
     IoT device's public key
     Signature of unique ID
  2. IoT device's session public key
  3. Signature of (IoT device session public key+IoT service session public key) signed with IoT device's key
D. This message is sent back to the IoT service. The IoT service parses the message and:
  1. Verifies the signature of the unique ID using the factory public key
  2. Verifies the signature of the session public keys using the IoT device's public key
  3. Saves the IoT device's session public key
E. The IoT service then generates a message containing a signature of (IoT device session public key+IoT service session public key) signed with the IoT service's key.
F. The IoT device parses the message and:
  1. Verifies the signature of the session public keys using the IoT service's public key
  2. Generates the key stream from the IoT device session private key and the IoT service's session public key
  3. The IoT device then sends a "messaging available" message.
G. The IoT service then does the following:
  1. Generates the key stream from the IoT service session private key and the IoT device's session public key
  2. Creates a new message on the messaging channel which contains the following:
     Generates and stores a random 2 byte value
     Set attribute message with the boomerang attribute Id (discussed below) and the random value
H. The IoT device receives the message and:
  1. Attempts to decrypt the message
  2. Emits an Update with the same value on the indicated attribute Id
I. The IoT service recognizes the message payload contains a boomerang attribute update and:
  1. Sets its paired state to true
  2. Sends a pairing complete message on the negotiator channel
J. IoT device receives the message and sets his paired state to true While the above techniques are described with respect to an "IoT service" and an "IoT device," the underlying principles of the invention may be implemented to establish a secure communication channel between any two devices including user client devices, servers, and Internet services.

The above techniques are highly secure because the private keys are never shared over the air (in contrast to current Bluetooth pairing techniques in which a secret is transmitted from one party to the other). An attacker listening to the entire conversation will only have the public keys, which are insufficient to generate the shared secret. These techniques also prevent a man-in-the-middle attack by exchanging signed public keys. In addition, because GCM and separate counters are used on each device, any kind of "replay attack" (where a man in the middle captures the data and sends it again) is prevented. Some embodiments also prevent replay attacks by using asymmetrical counters.

Techniques for Exchanging Data and Commands Without Formally Pairing Devices

GATT is an acronym for the Generic Attribute Profile, and it defines the way that two Bluetooth Low Energy (BTLE) devices transfer data back and forth. It makes use of a generic data protocol called the Attribute Protocol (ATT), which is used to store Services, Characteristics and related data in a simple lookup table using 16-bit Characteristic IDs for each entry in the table. Note that while the "characteristics" are sometimes referred to as "attributes."

On Bluetooth devices, the most commonly used characteristic is the devices "name" (having characteristic ID 10752 (0x2A00)). For example, a Bluetooth device may identify other Bluetooth devices within its vicinity by reading the "Name" characteristic published by those other Bluetooth devices using GATT. Thus, Bluetooth device have the inherent ability to exchange data without formally pairing/bonding the devices (note that "paring" and "bonding" are sometimes used interchangeably; the remainder of this discussion will use the term "pairing").

One embodiment of the invention takes advantage of this capability to communicate with BTLE-enabled IoT devices without formally pairing with these devices. Pairing with each individual IoT device would extremely inefficient because of the amount of time required to pair with each device and because only one paired connection may be established at a time.

Figure 27:
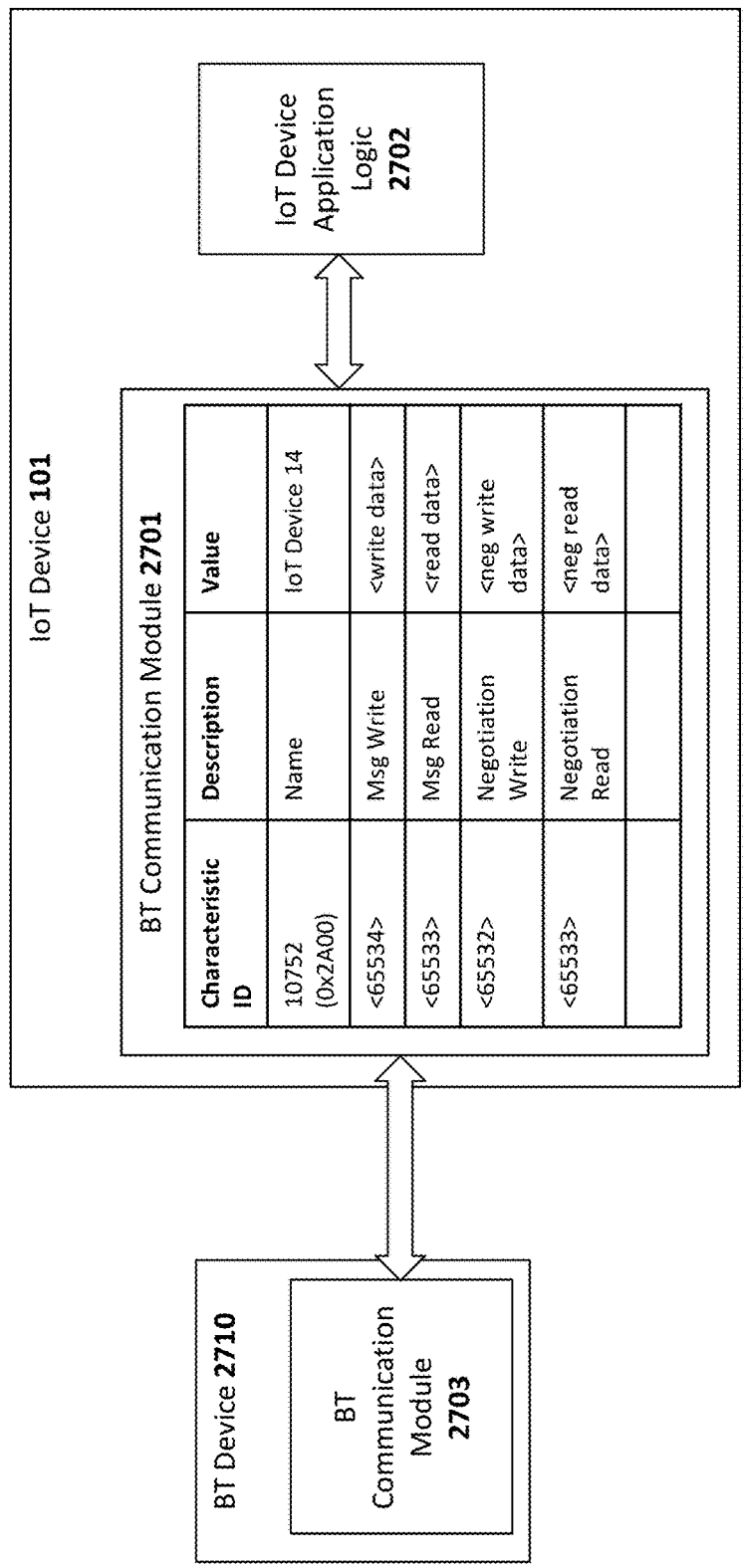
FIG. 27 illustrates techniques employed in one embodiment for writing and reading data to/from an IoT device without formally pairing with the IoT device.

FIG. 27 illustrates one particular embodiment in which a Bluetooth (BT) device 2710 establishes a network socket abstraction with a BT communication module 2701 of an IoT device 101 without formally establishing a paired BT connection. The BT device 2710 may be included in an IoT hub 110 and/or a client device 611 such as shown in FIG. 24A. As illustrated, the BT communication module 2701 maintains a data structure containing a list of characteristic IDs, names associated with those characteristic IDs and values for those characteristic IDs. The value for each characteristic may be stored within a 20-byte buffer identified by the characteristic ID in accordance with the current BT standard. However, the underlying principles of the invention are not limited to any particular buffer size.

In the example in FIG. 27, the "Name" characteristic is a BT-defined characteristic which is assigned a specific value of "IoT Device 14." One embodiment of the invention specifies a first set of additional characteristics to be used for negotiating a secure communication channel with the BT device 2710 and a second set of additional characteristics to be used for encrypted communication with the BT device 2710. In particular, a "negotiation write" characteristic, identified by characteristic ID <65532> in the illustrated example, may be used to transmit outgoing negotiation messages and the "negotiation read" characteristic, identified by characteristic ID <65533> may be used to receive incoming negotiation messages. The "negotiation messages" may include messages used by the BT device 2710 and the BT communication module 2701 to establish a secure communication channel as described herein. By way of example, in FIG. 25, the IoT device 101 may receive the IoT service session public key 2501 via the "negotiation read" characteristic <65533>. The key 2501 may be transmitted from the IoT service 120 to a BTLE-enabled IoT hub 110 or client device 611 which may then use GATT to write the key 2501 to the negotiation read value buffer identified by characteristic ID <65533>. IoT device application logic 2702 may then read the key 2501 from the value buffer identified by characteristic ID <65533> and process it as described above (e.g., using it to generate a secret and using the secret to generate a key stream, etc).

If the key 2501 is greater than 20 bytes (the maximum buffer size in some current implementations), then it may be written in 20-byte portions. For example, the first 20 bytes may be written by the BT communication module 2703 to characteristic ID <65533> and read by the IoT device application logic 2702, which may then write an acknowledgement message to the negotiation write value buffer identified by characteristic ID <65532>. Using GATT, the BT communication module 2703 may read this acknowledgement from characteristic ID <65532> and responsively write the next 20 bytes of the key 2501 to the negotiation read value buffer identified by characteristic ID <65533>. In this manner, a network socket abstraction defined by characteristic IDs <65532> and <65533> is established for exchanging negotiation messages used to establish a secure communication channel.

In one embodiment, once the secure communication channel is established, a second network socket abstraction is established using characteristic ID <65534> (for transmitting encrypted data packets from IoT device 101) and characteristic ID <65533> (for receiving encrypted data packets by IoT device). That is, when BT communication module 2703 has an encrypted data packet to transmit (e.g., such as encrypted message 2403 in FIG. 24A), it starts writing the encrypted data packet, 20 bytes at a time, using the message read value buffer identified by characteristic ID <65533>. The IoT device application logic 2702 will then read the encrypted data packet, 20 bytes at a time, from the read value buffer, sending acknowledgement messages to the BT communication module 2703 as needed via the write value buffer identified by characteristic ID <65532>.

In one embodiment, the commands of GET, SET, and UPDATE described below are used to exchange data and commands between the two BT communication modules 2701 and 2703. For example, the BT communication module 2703 may send a packet identifying characteristic ID <65533> and containing the SET command to write into the value field/buffer identified by characteristic ID <65533> which may then be read by the IoT device application logic 2702. To retrieve data from the IoT device 101, the BT communication module 2703 may transmit a GET command directed to the value field/buffer identified by characteristic ID <65534>. In response to the GET command, the BT communication module 2701 may transmit an UPDATE packet to the BT communication module 2703 containing the data from the value field/buffer identified by characteristic ID <65534>. In addition, UPDATE packets may be transmitted automatically, in response to changes in a particular attribute on the IoT device 101. For example, if the IoT device is associated with a lighting system and the user turns on the lights, then an UPDATE packet may be sent to reflect the change to the on/off attribute associated with the lighting application.

Figure 28:
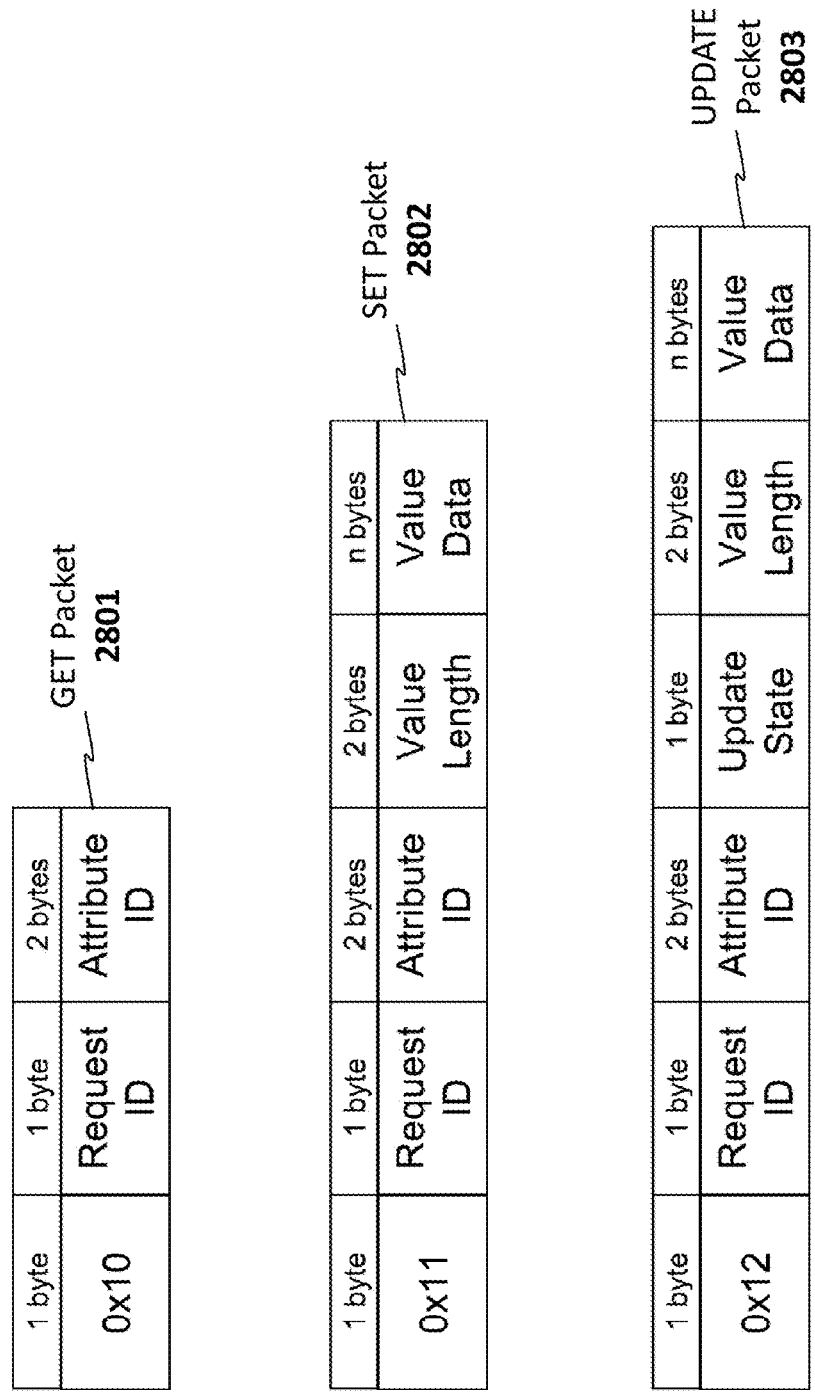
FIG. 28 illustrates an exemplary set of command packets employed in one embodiment of the invention.

FIG. 28 illustrates exemplary packet formats used for GET, SET, and UPDATE in accordance with one embodiment of the invention. In one embodiment, these packets are transmitted over the message write <65534> and message read <65533> channels following negotiation. In the GET packet 2801, a first 1-byte field includes a value (0X10) which identifies the packet as a GET packet. A second 1-byte field includes a request ID, which uniquely identifies the current GET command (i.e., identifies the current transaction with which the GET command is associated). For example, each instance of a GET command transmitted from a service or device may be assigned a different request ID. This may be done, for example, by incrementing a counter and using the counter value as the request ID. However, the underlying principles of the invention are not limited to any particular manner for setting the request ID.

A 2-byte attribute ID identifies the application-specific attribute to which the packet is directed. For example, if the GET command is being sent to IoT device 101 illustrated in FIG. 27, the attribute ID may be used to identify the particular application-specific value being requested. Returning to the above example, the GET command may be directed to an application-specific attribute ID such as power status of a lighting system, which comprises a value identifying whether the lights are powered on or off (e.g., 1=on, 0=off). If the IoT device 101 is a security apparatus associated with a door, then the value field may identify the current status of the door (e.g., 1=opened, 0=closed). In response to the GET command, a response may be transmitting containing the current value identified by the attribute ID.

The SET packet 2802 and UPDATE packet 2803 illustrated in FIG. 28 also include a first 1-byte field identifying the type of packet (i.e., SET and UPDATE), a second 1-byte field containing a request ID, and a 2-byte attribute ID field identifying an application-defined attribute. In addition, the SET packet includes a 2-byte length value identifying the length of data contained in an n-byte value data field. The value data field may include a command to be executed on the IoT device and/or configuration data to configure the operation of the IoT device in some manner (e.g., to set a desired parameter, to power down the IoT device, etc). For example, if the IoT device 101 controls the speed of a fan, the value field may reflect the current fan speed.

The UPDATE packet 2803 may be transmitted to provide an update of the results of the SET command. The UPDATE packet 2803 includes a 2-byte length value field to identify the length of the n-byte value data field which may include data related to the results of the SET command. In addition, a 1-byte update state field may identify the current state of the variable being updated. For example, if the SET command attempted to turn off a light controlled by the IoT device, the update state field may indicate whether the light was successfully turned off.

Figure 29:
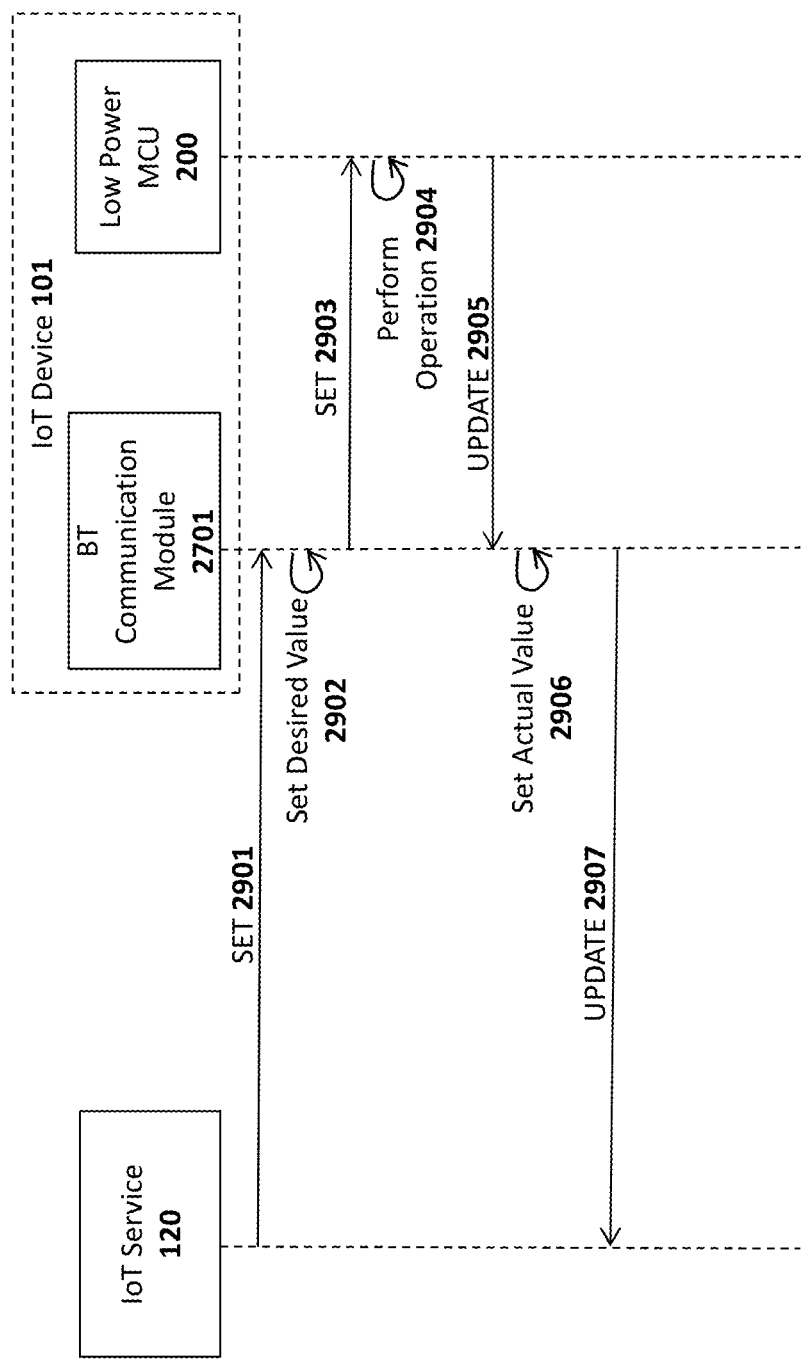
FIG. 29 illustrates an exemplary sequence of transactions using command packets.

FIG. 29 illustrates an exemplary sequence of transactions between the IoT service 120 and an IoT device 101 involving the SET and UPDATE commands. Intermediary devices such as the IoT hub and the user's mobile device are not shown to avoid obscuring the underlying principles of the invention. At 2901, the SET command 2901 is transmitted form the IoT service to the IoT device 101 and received by the BT communication module 2701 which responsively updates the GATT value buffer identified by the characteristic ID at 2902. The SET command is read from the value buffer by the low power microcontroller (MCU) 200 at 2903 (or by program code being executed on the low power MCU such as IoT device application logic 2702 shown in FIG. 27). At 2904, the MCU 200 or program code performs an operation in response to the SET command. For example, the SET command may include an attribute ID specifying a new configuration parameter such as a new temperature or may include a state value such as on/off (to cause the IoT device to enter into an "on" or a low power state). Thus, at 2904, the new value is set in the IoT device and an UPDATE command is returned at 2905 and the actual value is updated in a GATT value field at 2906. In some cases, the actual value will be equal to the desired value. In other cases, the updated value may be different (i.e., because it may take time for the IoT device 101 to update certain types of values). Finally, at 2907, the UPDATE command is transmitted back to the IoT service 120 containing the actual value from the GATT value field.

Figure 30:
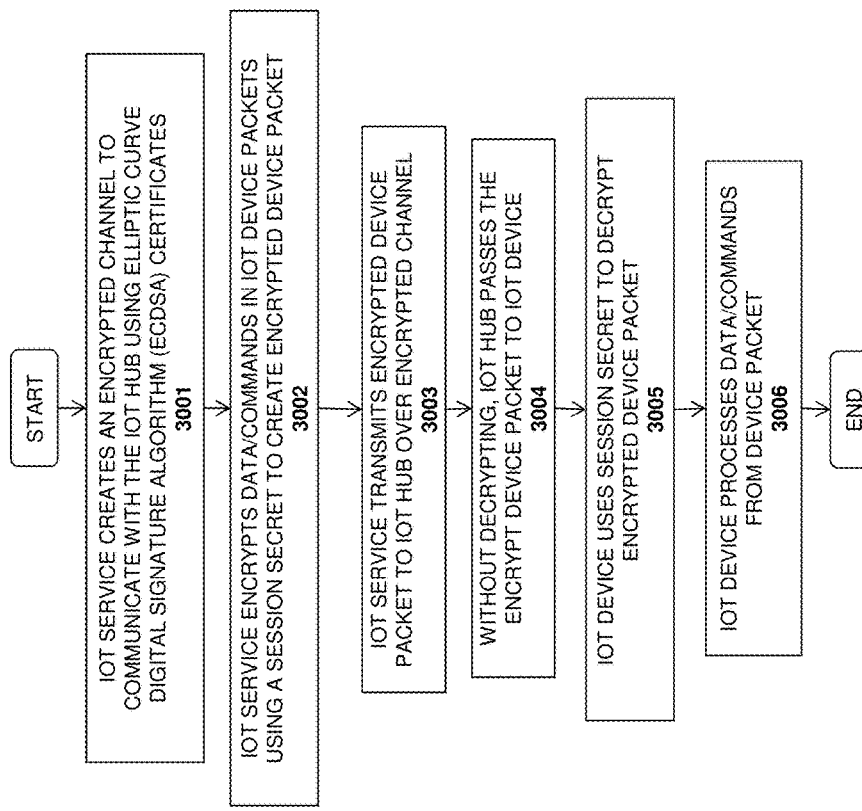
FIG. 30 illustrates a method in accordance with one embodiment of the invention.

FIG. 30 illustrates a method for implementing a secure communication channel between an IoT service and an IoT device in accordance with one embodiment of the invention. The method may be implemented within the context of the network architectures described above but is not limited to any specific architecture.

At 3001, the IoT service creates an encrypted channel to communicate with the IoT hub using elliptic curve digital signature algorithm (ECDSA) certificates. At 3002, the IoT service encrypts data/commands in IoT device packets using the a session secret to create an encrypted device packet. As mentioned above, the session secret may be independently generated by the IoT device and the IoT service. At 3003, the IoT service transmits the encrypted device packet to the IoT hub over the encrypted channel. At 3004, without decrypting, the IoT hub passes the encrypted device packet to the IoT device. At 22-5, the IoT device uses the session secret to decrypt the encrypted device packet. As mentioned, in one embodiment this may be accomplished by using the secret and a counter value (provided with the encrypted device packet) to generate a key stream and then using the key stream to decrypt the packet. At 3006, the IoT device then extracts and processes the data and/or commands contained within the device packet.

Thus, using the above techniques, bi-directional, secure network socket abstractions may be established between two BT-enabled devices without formally pairing the BT devices using standard pairing techniques. While these techniques are described above with respect to an IoT device 101 communicating with an IoT service 120, the underlying principles of the invention may be implemented to negotiate and establish a secure communication channel between any two BT-enabled devices.

Figure 31A:
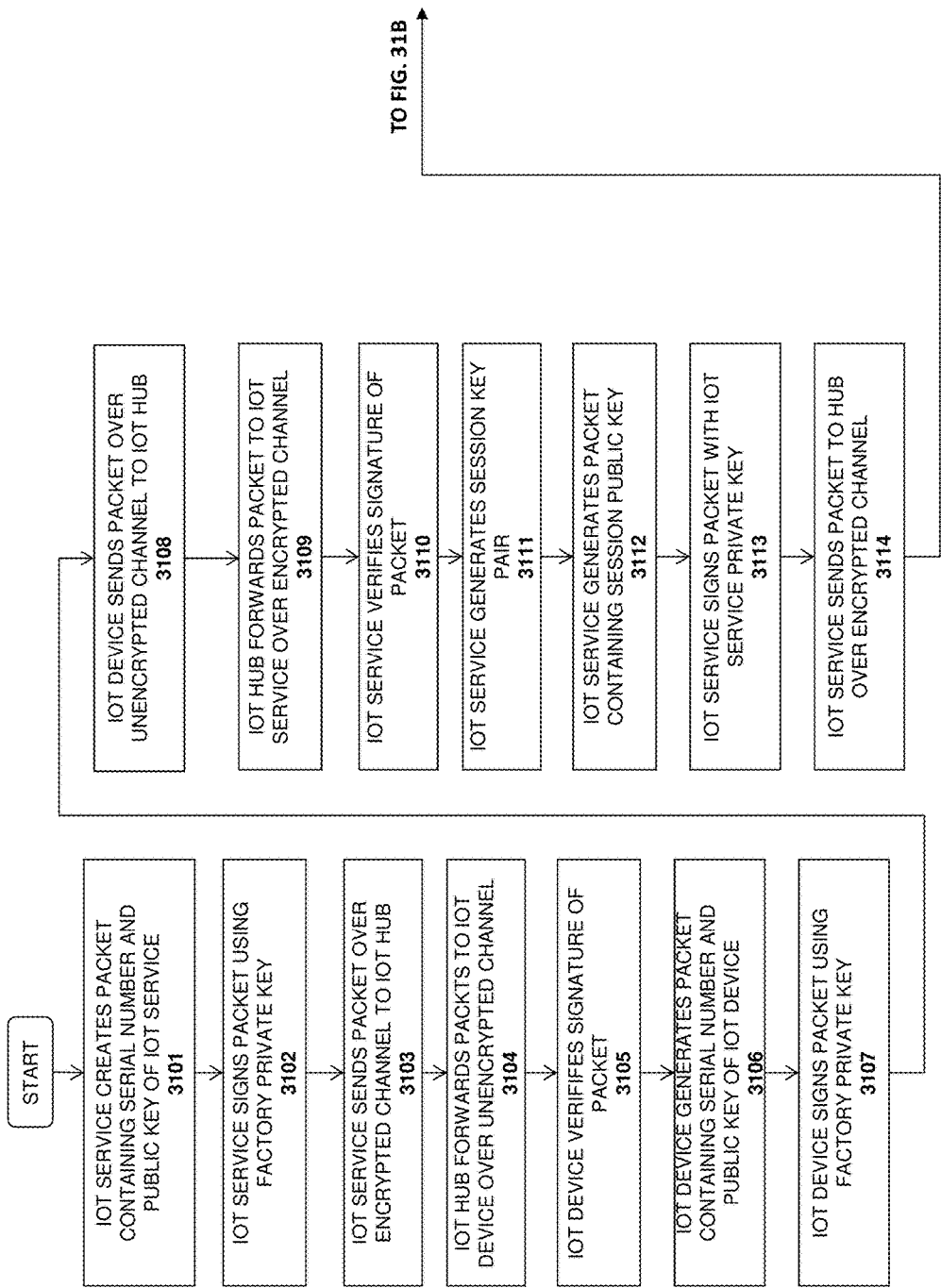
FIGS. 31A-C illustrate a detailed method for pairing devices in accordance with one embodiment of the invention.
Figure 31B:
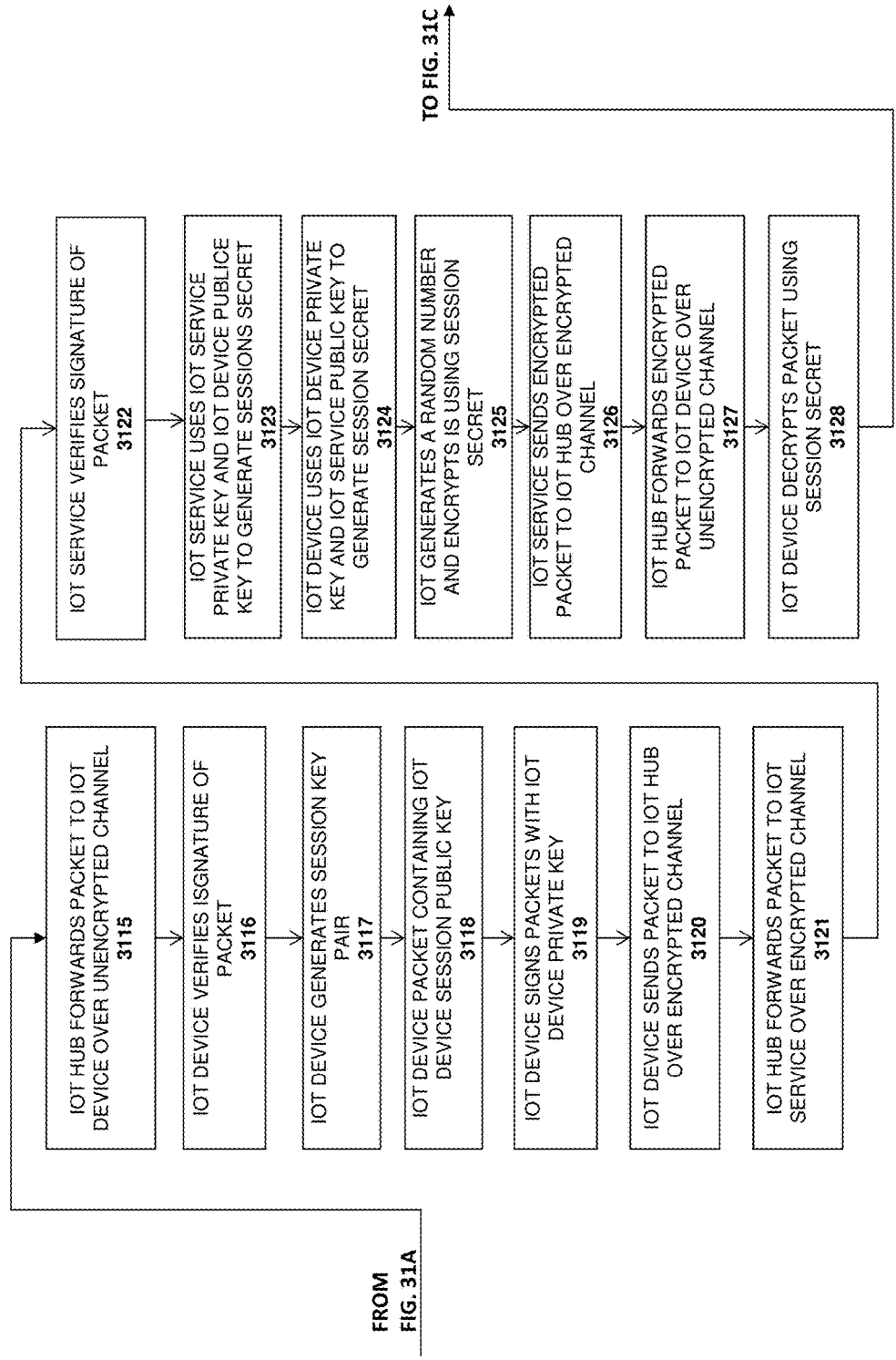
Figure 31C:
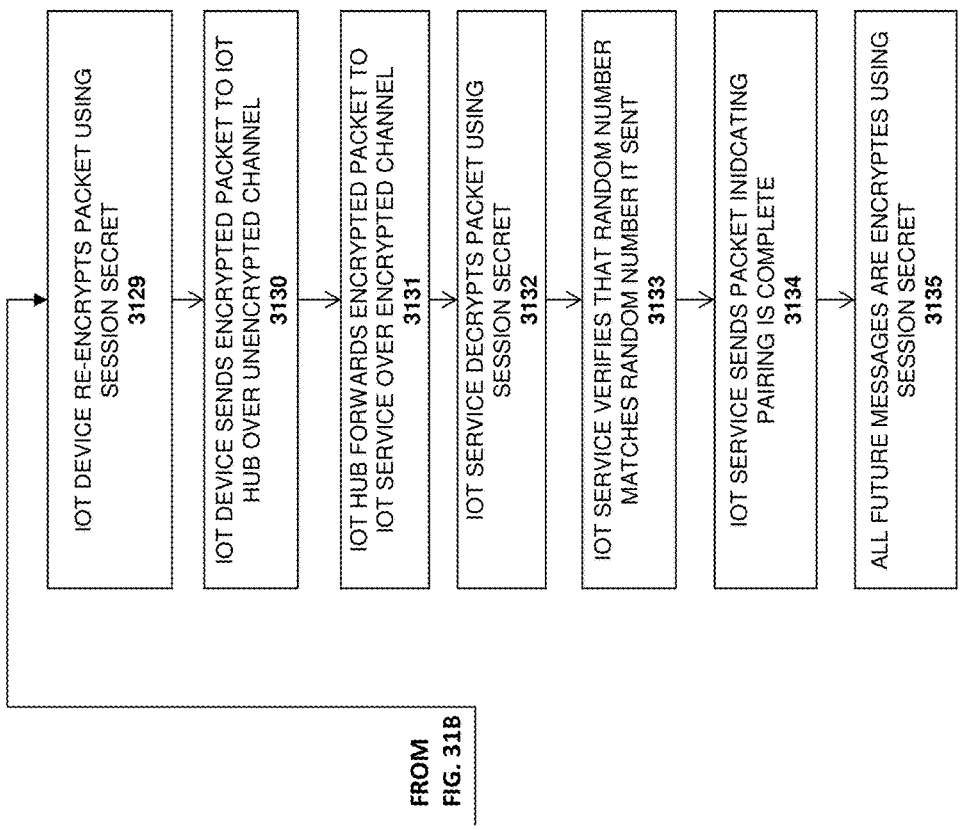

FIGS. 31A-C illustrate a detailed method for pairing devices in accordance with one embodiment of the invention. The method may be implemented within the context of the system architectures described above, but is not limited to any specific system architectures.

At 3101, the IoT Service creates a packet containing serial number and public key of the IoT Service. At 3102, the IoT Service signs the packet using the factory private key. At 3103, the IoT Service sends the packet over an encrypted channel to the IoT hub and at 3104 the IoT hub forwards the packet to IoT device over an unencrypted channel. At 3105, the IoT device verifies the signature of packet and, at 3106, the IoT device generates a packet containing the serial number and public key of the IoT Device. At 3107, the IoT device signs the packet using the factory private key and at 3108, the IoT device sends the packet over the unencrypted channel to the IoT hub.

At 3109, the IoT hub forwards the packet to the IoT service over an encrypted channel and at 3110, the IoT Service verifies the signature of the packet. At 3111, the IoT Service generates a session key pair, and at 3112 the IoT Service generates a packet containing the session public key. The IoT Service then signs the packet with IoT Service private key at 3113 and, at 3114, the IoT Service sends the packet to the IoT hub over the encrypted channel.

Turning to FIG. 31B, the IoT hub forwards the packet to the IoT device over the unencrypted channel at 3115 and, at 3116, the IoT device verifies the signature of packet. At 3117 the IoT device generates session key pair (e.g., using the techniques described above), and, at 3118, an IoT device packet is generated containing the IoT device session public key. At 3119, the IoT device signs the IoT device packet with IoT device private key. At 3120, the IoT device sends the packet to the IoT hub over the unencrypted channel and, at 3121, the IoT hub forwards the packet to the IoT service over an encrypted channel.

At 3122, the IoT service verifies the signature of the packet (e.g., using the IoT device public key) and, at 3123, the IoT service uses the IoT service private key and the IoT device public key to generate the session secret (as described in detail above). At 3124, the IoT device uses the IoT device private key and IoT service public key to generate the session secret (again, as described above) and, at 3125, the IoT device generates a random number and encrypts it using the session secret. At 3126, the IoT service sends the encrypted packet to IoT hub over the encrypted channel. At 3127, the IoT hub forwards the encrypted packet to the IoT device over the unencrypted channel. At 3128, the IoT device decrypts the packet using the session secret.

Turning to FIG. 31C, the IoT device re-encrypts the packet using the session secret at 3129 and, at 3130, the IoT device sends the encrypted packet to the IoT hub over the unencrypted channel. At 3131, the IoT hub forwards the encrypted packet to the IoT service over the encrypted channel. The IoT service decrypts the packet using the session secret at 3132. At 3133 the IoT service verifies that the random number matches the random number it sent. The IoT service then sends a packet indicating that pairing is complete at 3134 and all subsequent messages are encrypted using the session secret at 3135.

Apparatus and Method for Securely Tracking Event Attendees Using IoT Devices

Bluetooth Low Energy (BTLE) "beacons" have been developed with small battery-powered BTLE transmitters that transmit an identifier. A common use case is to alert a mobile device's user to nearby stores, services, products, and/or hazards. In some cases, the mobile device picks up the beacon's identifier and then uses it to look up additional information online (e.g., information related to the store, service, product, etc, in the vicinity of the beacon).

One embodiment of the invention uses IoT devices as "reverse beacons" (sometimes referred to herein as a "meacon" using the portmanteau of "me" and "beacon") which communicate with IoT hubs using the advanced security techniques described herein to securely identify and track a user as the user moves around an event such as a trade show or concert. In particular, in contrast to a typical beacon which provides identification data to a user's mobile device (which may then retrieve relevant information related to the identifying data), a meacon transmits data over a local BTLE channel uniquely identifying the event attendee to whom it has been assigned. As the user moves around the event, the meacon connects to different IoT hubs in different locations. The identity of both the attendee/meacon and each IoT hub to which the meacon connects may then be transmitted to an IoT service, which compiles the data collected from different IoT hubs to determine the portions of the event visited by the user. This information may then be used to transmit targeted content to the user, either during or after the event (e.g., content related to the booths visited by the user during a trade show).

Figure 32A:
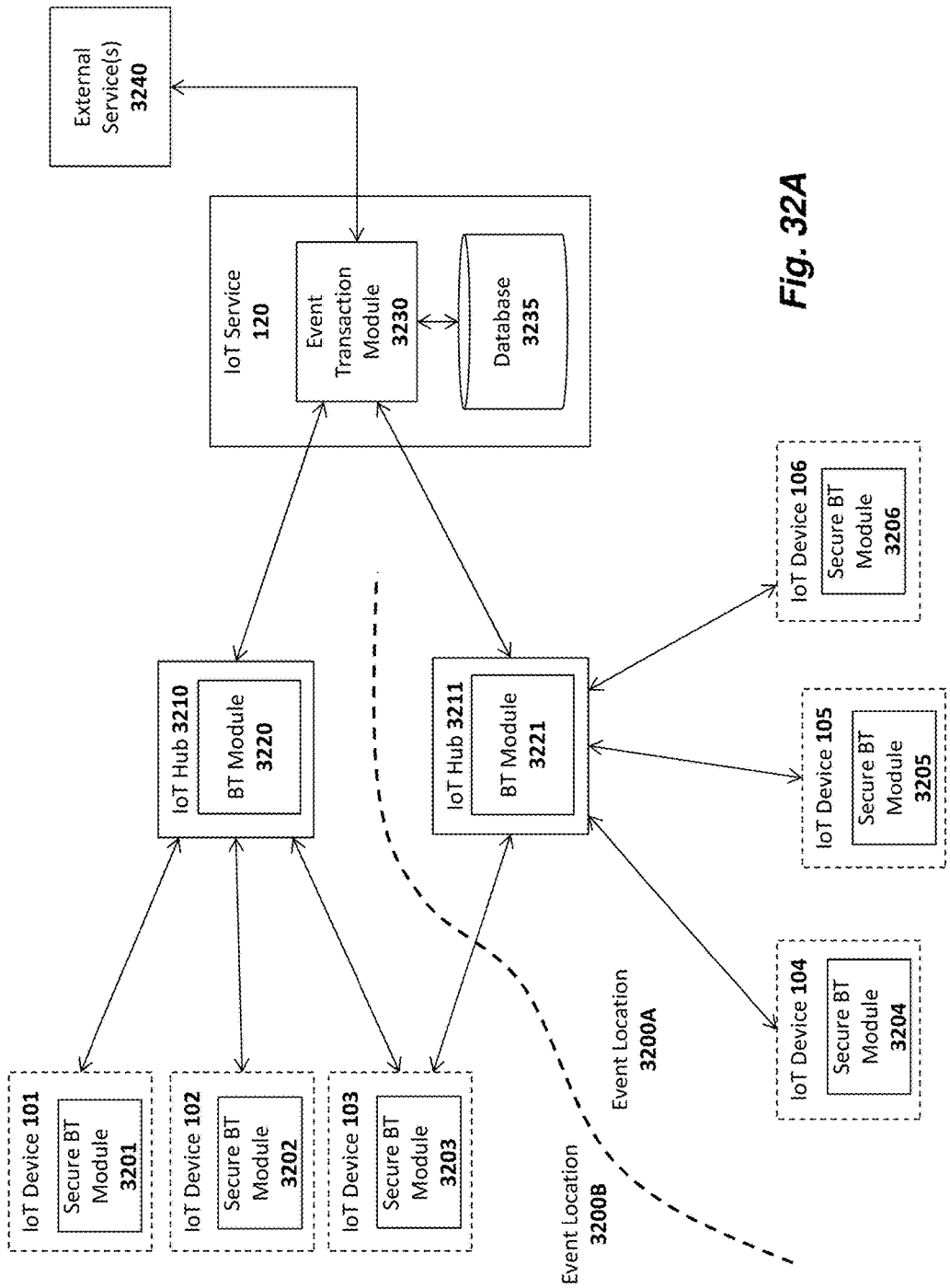
FIGS. 32A-C illustrate different embodiments of the invention for implementing a reverse beacon.

FIG. 32A illustrates an exemplary system architecture in which meacons are implemented as IoT devices 101-106 each equipped with a secure Bluetooth (BT) module 3201-3206, respectively. In one embodiment, the secure BT modules 3201-3206 connect to the IoT service 120 through the IoT hubs 3210-3211 using the various secure communication techniques described above (see, e.g., FIGS. 31A to 31C and associated text) to ensure that the data exchanged with the IoT service 120 is protected. In the example shown in FIG. 32A, users of IoT devices 104-106 at a first event location 3200A are communicatively coupled to IoT hub 3210 and users of IoT devices 101-103 at a second event location 3200B are communicatively coupled to IoT hub 3211. As in prior embodiments, each IoT hub 3210-3211 includes a BT module 3220-3221 for establishing the local BT connection with the secure BT modules 3201-3206 of each of the IoT devices 101-106. In addition, each IoT hub includes at least one additional communication interface such as a WiFi interface and/or cellular interface (e.g., an LTE interface) for establishing a connection to the IoT service 120 over the Internet.

In one embodiment, each IoT hub 3210-3211 is associated with a particular location within the event. For example, IoT hub 3210 may be associated with a first booth or set of booths at a trade show and IoT hub 3211 may be associated with a second booth or set of booths. By way of another example, at a concert, each IoT hub 3210-3211 may be associated with a different stage. Each IoT device 101-106 uses the techniques described above to communicate its current connection status to an event transaction module 3230 on the IoT service 120 which stores the current connection status in a database 3235. In one embodiment, the event transaction module 3230 includes or utilizes the various security components shown in FIG. 24A-FIG. 31C such as the encryption engine 3260, HSM 3230, and KSGM 3240 to support secure connections with the IoT devices 101-106, each of which includes an encryption engine 3261, HSM 3231, and KSGM 3241 to implement the security techniques described above when communicating with the IoT service 120.

In one embodiment, when an IoT device 101 connects to an IoT hub 3210 it transmits a data packet to the event transaction module 3230 on the IoT service 120 indicating that is has a connection to the IoT hub 3210. The IoT device 101 may periodically transmit such data packets to indicate its connection status to the event transaction module 3230 (e.g., every 1 minute, 5 minutes, 10 minutes, etc) which may then store the connection data within a database 3235 to compile a history of the locations visited by each user during the course of the event (e.g., the booths visited at the trade show).

Note that "connecting to" an IoT hub as used herein does not necessarily mean formally pairing with the IoT hub as might be done for a standard BTLE connection. Rather, "connecting to" the IoT hub can simply mean detecting a signal from the IoT hub which, as discussed above, may include the IoT hub's name (i.e., identified by BTLE characteristic ID 10752 (0x2A00)). In one embodiment, the connection to an IoT hub may utilize the message read/write and negotiation read/write socket abstractions illustrated in FIG. 27, which may be accomplished without using formal BTLE pairing. For example, the IoT device may use the negotiation read/write socket abstractions to form a secure channel, and may then use the message read/write socket abstractions to communicate the Name attribute of the IoT hub to the IoT service 120.

In some embodiments, each IoT device may concurrently connect to multiple IoT hubs 3210-3211 and report this data back to the event transaction module 3230. In FIG. 32A, for example, IoT device 103 is shown connecting to both IoT hub 3210 and IoT hub 3210. In one embodiment, the IoT device 103 may take signal strength measurements from two or more IoT hubs and this data may be used to determine the actual position of the IoT device 103 at the event with greater accuracy (e.g., using a received signal strength indicator (RSSI)). For example, if a concurrent connection is made to two IoT hubs 3210-3211 as illustrated in FIG. 32A, then the signal strength measurements may indicate the relative position of IoT device 103 between IoT hub 3210 and IoT hub 3211. If an IoT device connects to three or more IoT hubs, then triangulation techniques may be performed using the RSSI values to arrive at an even more precise calculation of the user's location (e.g., by triangulating the user's position with RSSI measurements). By way of example, if each booth at a trade show is equipped with an IoT hub, then each IoT device may connect to three or more IoT hubs at a given time, providing precise location measurements. In one embodiment, the location detection system may be calibrated prior to the event, by moving an IoT device into different known locations at the event venue and collecting RSSI measurements at those locations. A table of RSSI values may then be compiled on the IoT service and stored in the database 3235 to uniquely associated each location with a different set of RSSI values measured between the IoT device and the various IoT hubs. Additional techniques which may be employed for determining a user's location with signal strength values are described in the co-pending application entitled "System and Method for Accurately Sensing User Location in an IoT System," Ser. No. 14/673,551, Filed Mar. 20, 2015, which is assigned to the assignee of the present application and which is incorporated herein by reference.

As mentioned, in one embodiment, the locations visited by the user are stored within a database 3235 by the event transaction module 3230. In one embodiment, this data may be used to target content to the attendee, either during or after the event. For example, if it has been determined that the attendee spent a significant amount of time at a particular booth at a trade show, or watched a particular presentation given at a particular time, then targeted communications from the company operating the booth or giving the presentation may be sent to the user. The targeted content may be generated by one of more external services 3240 (e.g., such as an advertising service and/or the company running the booth).

Figure 32B:
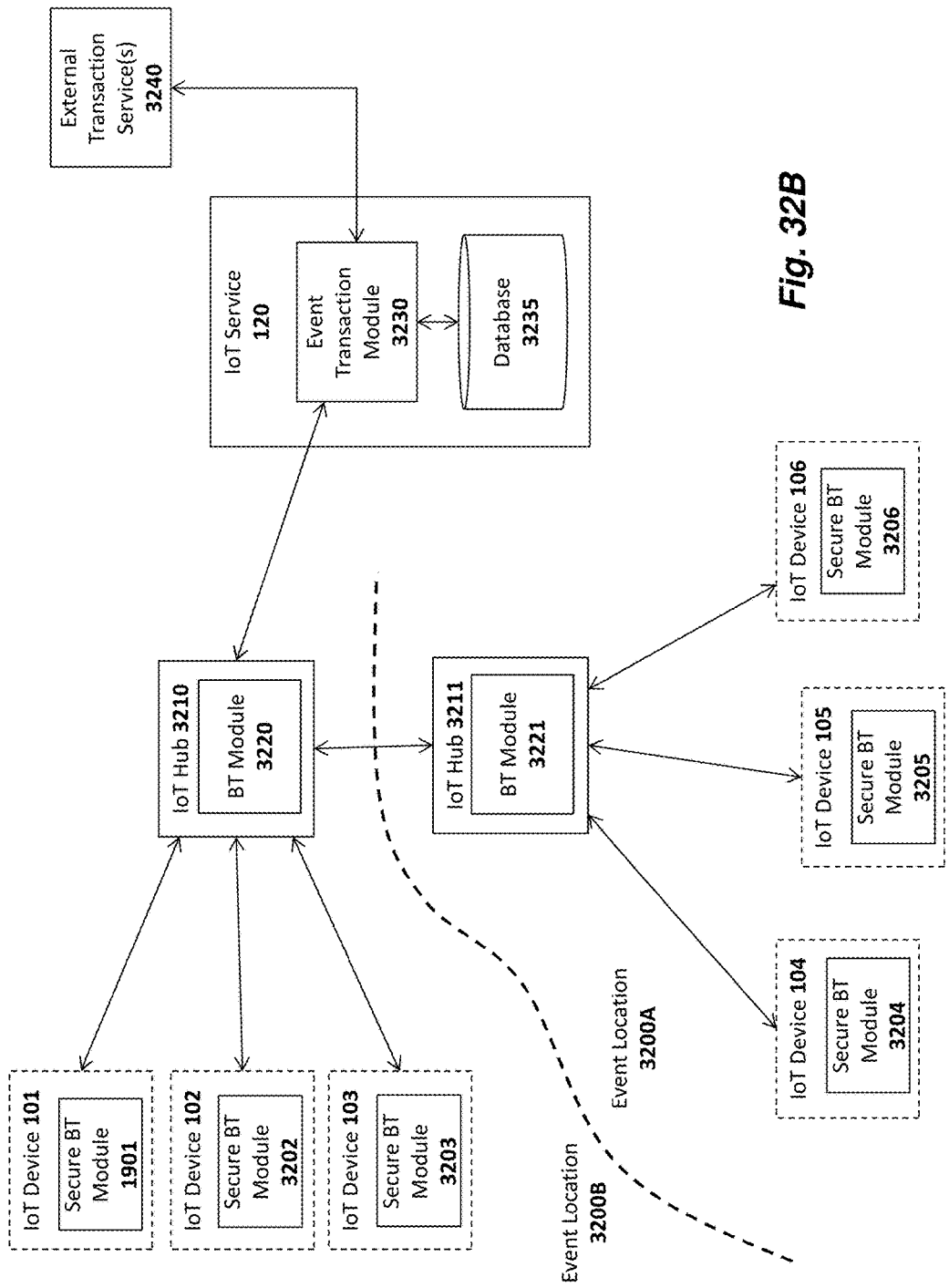

FIG. 32B illustrates an embodiment in which a single IoT hub 3210 provides connectivity to the IoT service 120 and all other IoT hubs 3211 communicate to the IoT service 120 via this IoT hub 3210. In this example, the IoT hub 3211 establishes a local wireless connection with IoT hub 3210 which provides the WAN connection to the Internet. This configuration may be particularly suitable for events of a smaller scale in which the communication channel shared by the IoT hub 3219 is sufficient to support all of the data communication to the IoT service 120.

Figure 32C:
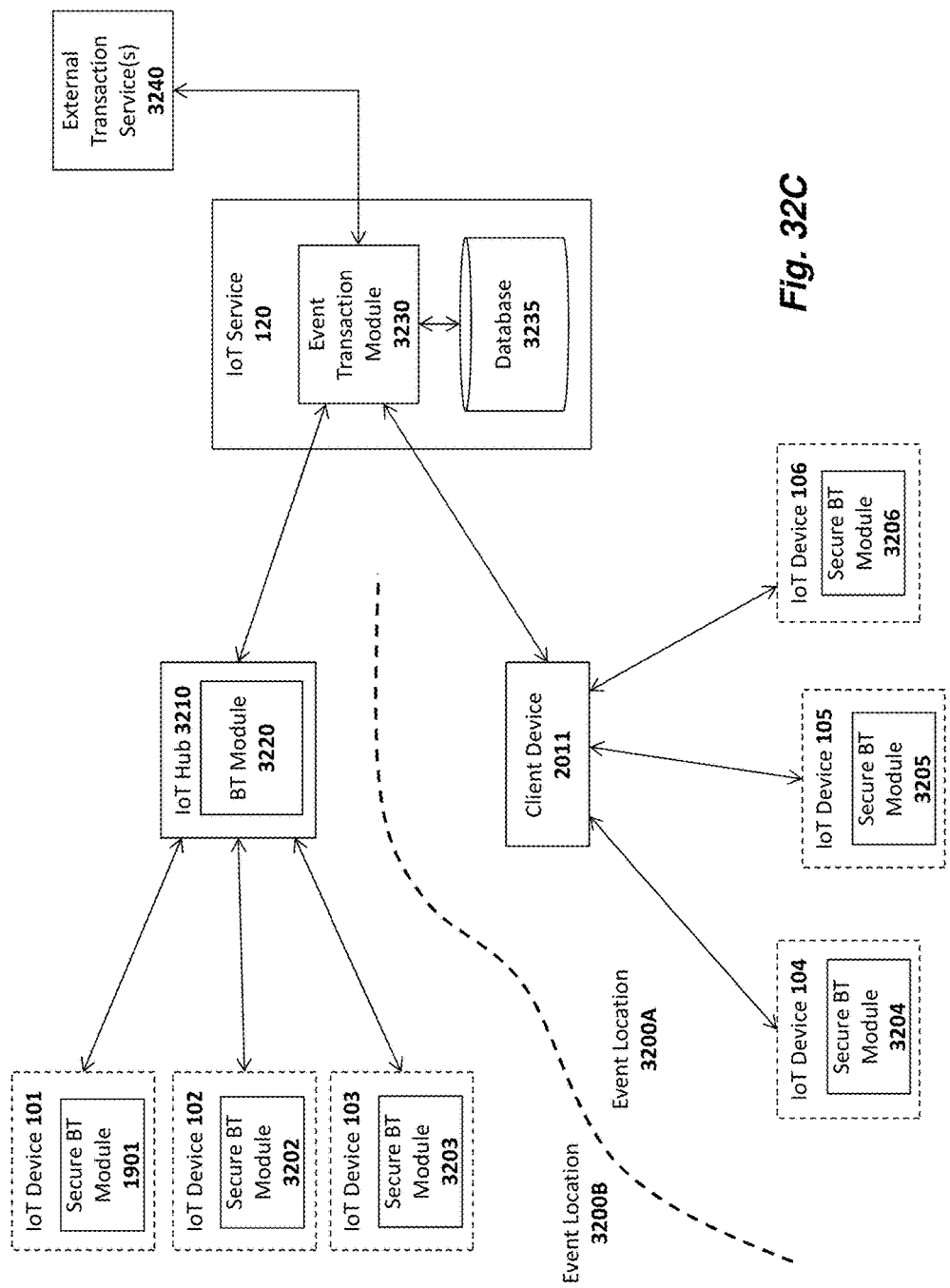

FIG. 32C illustrates yet another embodiment in which client devices 611 of users attending the event provide IoT device connectivity to the IoT service 120. The client devices 2011 of this embodiment establish a connection to the IoT service 120 via a WiFi or cellular data connection and connect to the IoT devices 104-106 via Bluetooth (e.g., utilizing the secure communication techniques described above with respect to FIG. 32B). An app or browser-based program code executed on the client device 2011 provides the network connectivity to the IoT devices 104-106. In this embodiment, the location of the client device 2011 may be determined from the client device's GPS chip or using other location detection techniques implemented on the client device 2011. As in prior embodiments, this location may be provided to the IoT service 120, compiled in the database 3235 and used to determine the locations within the event venue visited by the users of IoT devices 104-106 (i.e., based on the connectivity of those devices to the client device 2011 and the location of the client device 2011 when connected). In one embodiment, the client devices 2011 which connect the IoT devices 101-106 to the IoT service 120 are client devices of participants in the event such as the employees working booths at the tradeshow or individuals working for the event promoter. The client devices 2011 may be configured to perform this roll by installing an app or browser-based code on the client devices 2011 of all event participants/employees.

While only two event locations 3200A-B are illustrated in FIGS. 32A-C for the purpose of explanation, many more IoT hubs 3210-3211 may be set up in many more different event locations. For example, hundreds or even thousands of IoT hubs and/or client devices may be set up to collect data from each IoT device.

One embodiment of the invention allows an event attendee to pay for goods and services using the IoT device assigned to that attendee. In particular, when an event-configured IoT device is registered with the attendee (e.g., when the attendee initially arrives at the venue) various information related to the user may be collected and associated with the IoT device including the user's name, phone number, email address, and credit card information or other financial account information for making purchases. The IoT device itself may be identified using a unique IoT device identification code (e.g., a public key, serial number, etc, associated with the IoT device). In one embodiment, a record is created in the database 3235 associating the IoT device identification code with the attendee's data, including attendee's credit card information (or other financial account data such as the attendee's Paypal® account information).

Subsequently, when the user arrives at a booth or other location within the event where payment is required, the user may simply provide his/her IoT device for payment. In response, the IoT device will transmit an encrypted/signed message to the IoT service (e.g., using the security techniques discussed above) which includes the purchase amount and other information related to the purchase (e.g., the item/service purchased). The event transaction module 3230 on the IoT service 120 may then access an external service 3240 such as a credit card service to complete the transaction. If the transaction is approved, an indication may be transmitted back from the event transaction module 3230 to the IoT hub 3210, client device 2011 and/or the IoT device itself to confirm the transaction.

Figure 33:
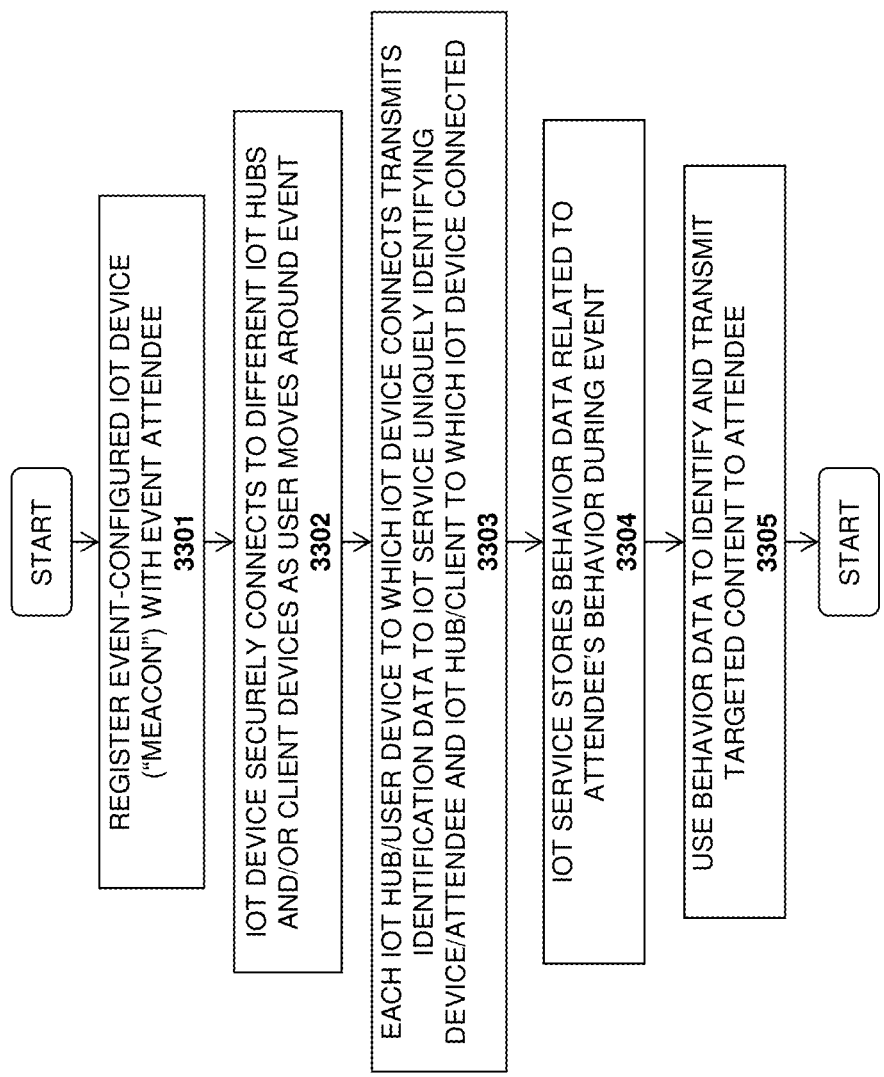
FIG. 33 illustrates a method in accordance with one embodiment of the invention.

A method in accordance with one embodiment of the invention is illustrated in FIG. 33. The method may be implemented within the context of the architectures described above but is not limited to any particular system architecture.

At 3301, an event-configured IoT device is registered with an event attendee. An "event-configured" IoT device is one which has the appropriate hardware and software installed thereon to form connections with IoT hubs and/or user devices to communicate with the IoT service (as described above). In one embodiment, registration of the IoT device includes recording the user's name, phone number, email address, and/or any other pertinent information and associating this data with an IoT device identification code (e.g., a public key, serial number, etc, associated with the IoT device). In one embodiment, a record is created in the database 3235 associating the IoT device identification data with the attendee.

At 3302, the IoT device securely connects to different IoT hubs and/or user devices as the user moves around the event and, at 3303, each IoT hub to which the IoT device connects transmits identification data to the IoT service uniquely identifying the IoT device and the IoT hub. As mentioned, this data may be used to identify the location of the user (potentially in combination with other data sent from other IoT hubs such as RSSI data). At 3304 the IoT service stores user behavior data related to the attendee's behavior at the event (e.g., in a database). In its simplest form, the behavior data comprises the various IoT hubs to which the IoT device connects during the event. However, as described above, various other data may be collected such as purchases made with the IoT device and the amount of time spent at each location within the event (as measured via IoT hub connections).

At 3305, the user behavior data is used to identify and transmit targeted content to the attendee. For example, if the behavior data indicates that the user spent most of his/her time at a particular set of booths during a tradeshow, then targeted content related to the companies demonstrating products at those booths may be sent to the attendee (e.g., promotional offers, links to additional product content, etc). Similarly, if the event is a concert with multiple stages, then the behavior data may indicate the performances viewed by the attendee. In this case, the targeted content may include offers or additional information related to the performers (e.g., free music tracks, discounts on upcoming shows, etc). The targeted content may be transmitted to the attendee in various ways including via text, email, and/or social network communications.

Apparatus and Method for Internet of Things (IoT) Authentication for a Mass Storage Device One embodiment of the invention uses the above-described "meacon" technology including the techniques for establishing secure communication channels to authenticate a mass storage device such as a hard drive. In particular, in one embodiment uses a small, battery powered token that the user must present either to the mass storage device itself or to a connected computer to authorize the user to use the mass storage device. In this embodiment, the "token" may be implemented as one of the IoT devices with a secure BT module described above (e.g., IoT device 104 with secure BT module 3204). Multiple such tokens may be authorized by the owner of the mass storage device. Once authorized, token usage may be monitored by the IoT service to track and control usage of the drive. In one embodiment, tokens may also be de-authorized by the user at any time (e.g., by logging in to the IoT service 120).

Figure 34:
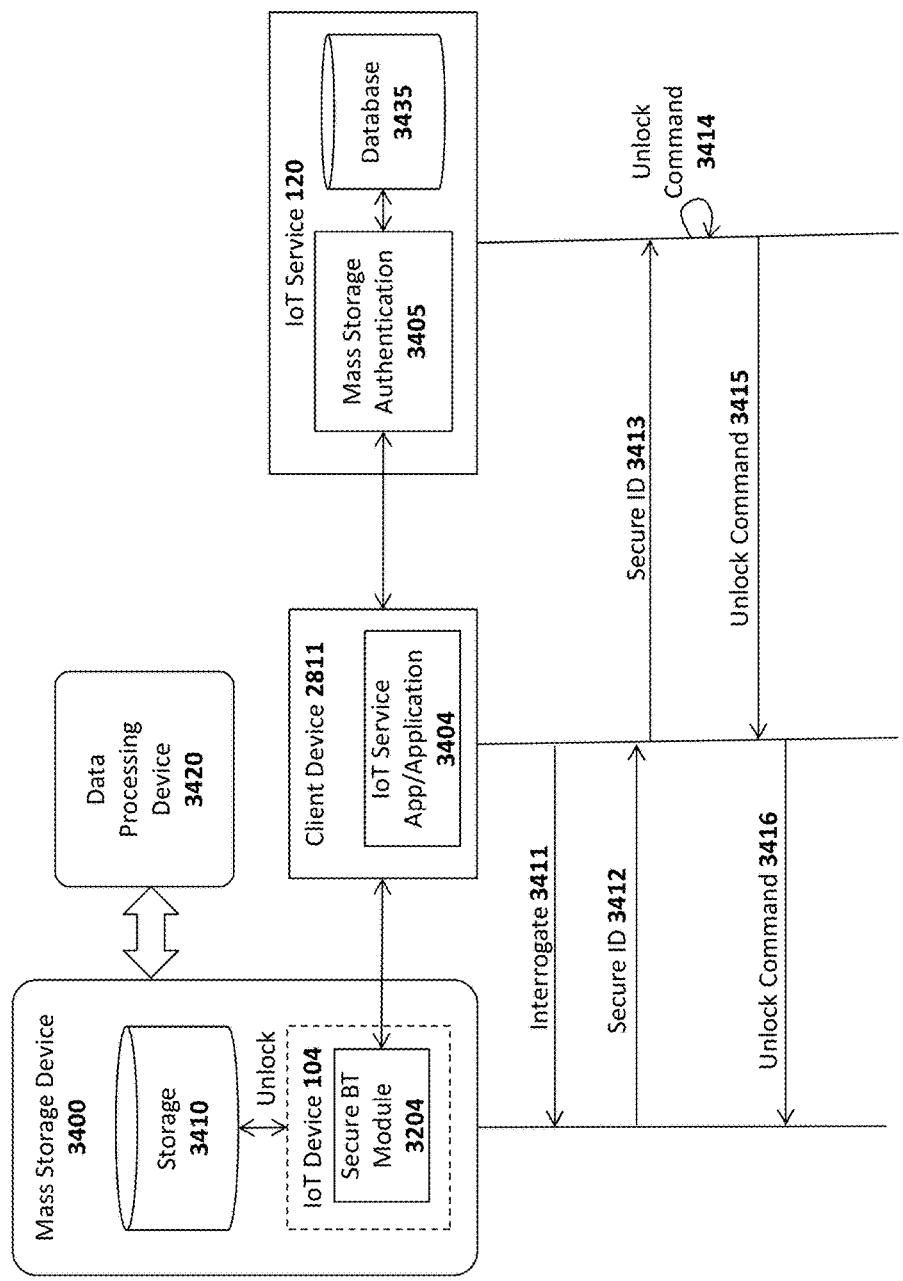
FIG. 34 illustrates one embodiment of a mass storage device with an Internet of Things (IoT) device for authentication.

FIG. 34 illustrates an exemplary embodiment of the invention in which a mass storage device 3400 is associated with an IoT device 104 equipped with a secure BT module 3204 (e.g., the IoT device 104 may be integrated within the enclosure of the mass storage device 3400). The IoT device 104 may use the secure BT module 3204 to securely connect with the IoT service 120 through a client device 2811 (e.g., using the various secure communication techniques described above). For example, the communication channel between the IoT device 104 and IoT service 120 may be encrypted as described above to protect the transmission of IoT device identification data and commands.

In one embodiment, the mass storage 3410 in the mass storage device 3400 is rendered inaccessible to data processing devices 3420 until an "unlock" signal is generated by the IoT device 104. Once the unlock signal is generated, the storage 3410 may be accessed via a data processing device 3420 (e.g., via a Universal Serial Bus (USB) interface).

In one embodiment, the IoT device 104 has a unique ID code which may be used to uniquely identify the IoT device 104 with the IoT service 120. The unique ID code may be stored in the database 3435 on the IoT service 120 along with other relevant data such as the identity of the user and/or the user's client device 2811. For example, in one embodiment, when the user purchases a new mass storage device 3400 the user may register the mass storage device 3400 with the IoT service 3400 by logging in and entering user data (e.g., user name). That is, the IoT service identifies the user when the user initially logs in to the IoT service 120 with the client device 2811. When the user then registers the mass storage device 3400 with the IoT service 120 (using the techniques described below), the mass storage authentication module 3405 associates the user with the mass storage device 3400 within the database 3435.

In addition, the app/application 3404 on the client device 2811 from which the user performs the registration may transmit data uniquely identifying the client device 2811 (e.g., such as a Device Unique ID or other type of code). In one embodiment, the mass storage authentication module 3405 on the IoT service 120 may then store the unique ID code of the IoT device 104 with the additional data sent from the client device 2811, thereby associating the mass storage device with the user and/or client device 2811.

In one embodiment, a user "unlocks" the storage 3410 by executing the IoT service app/application 3401 equipped with program code for performing the operations described herein. In particular, in response to the user indicating a desire to unlock the storage 3410 (e.g., via the GUI of the app/application 3404), the client device 2811 transmits an interrogate command 3411 to the IoT device 104 as illustrated. In response, at 3412, the IoT device 104 provides its Secure ID code to the IoT service app/application 3404, which forwards the Secure ID code (potentially with additional user/device data) at 3413. As long as the client device 2811 has successfully logged in and established a communication channel with the IoT service 120, the IoT service 120 may identify the user via the user's account information stored on the IoT service 120. In addition, an association between the secure ID code of the IoT device 104 and the storage device 3410 may be maintained in the database 3435.

Regardless of how the user is identified, at 3414 the mass storage authentication module 3405 on the IoT service generates an unlock command in response to receipt of the Secure ID 3413 transmitted from the client device 2811. The unlock command is transmitted from the IoT service 120 to the client device 2811 at 3415, which then forwards the unlock command to the IoT device 104 at 3416. In response, the IoT device 104 unlocks the storage 3410, thereby providing access to a data processing device 3420.

As mentioned, in one embodiment, the security techniques described above are implemented to encrypt communication between the IoT device 104 and the IoT service 120 (see, e.g., FIGS. 32A-31C and associated text). As such, both the Secure ID 3412 and the Unlock command 3415-3416 are protected by the encrypted communication channel (i.e., and are merely passed through the client device 2811).

Figure 35:
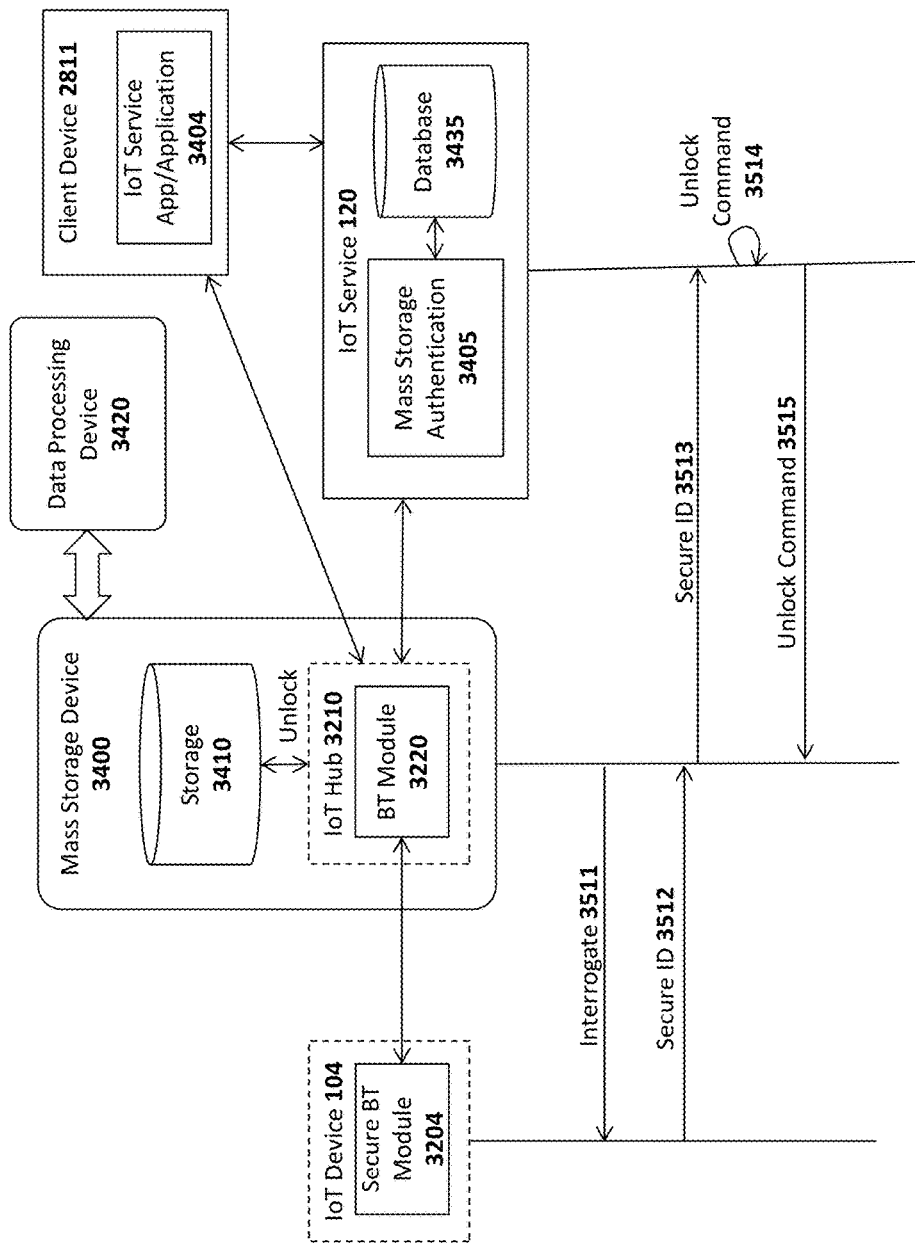
FIG. 35 illustrates another embodiment of a mass storage device with an IoT hub used for authentication.

FIG. 35 illustrates an embodiment in which the mass storage device 3400 is equipped with an IoT hub 3210 with a BTLE communication module 3220 for communicating with the secure BT module 3204 of an IoT device 104 and communicating with the IoT service 120 over the Internet (e.g., via a WiFi or cellular communication link, as described above). In this embodiment, the IoT device 104 may be a token which may be provided to users who are authorized to access the data within the mass storage device 3400. At 3511, the IoT hub 3210 transmits an interrogate command to the IoT device 104 and, in response, the IoT device 104 provides its secure ID at 3512. As in prior embodiments, the user may initiate the interrogate command via the IoT service app/application 3404 on the client device 2811 (e.g., either passed through the IoT service 120 or via a direct communication channel with the IoT hub 3210).

At 3513, the IoT hub passes the secure ID (and potentially other user/device data) to the mass storage authentication module 3405 on the IoT service 120. At 3514, the mass storage authentication module 3405 generates an unlock command 3514 and transmits the unlock command back to the IoT hub 3210 at 3515. In response, the IoT hub 3210 unlocks the storage 3410, thereby providing access to the data processing device 3420.

In one embodiment, a plurality of IoT devices 104 are provided with the purchase of the mass storage device 3400 and the association between the IoT devices 104 and mass storage device 3400 registered within the database 3435 of the IoT service 120. The mass storage device 3400 will then be unlocked only if one of the IoT devices 104 is within the wireless range of the IoT hub 3210 (i.e., so that the IoT device secure ID can be read and provided to the IoT service 120).

An one embodiment, the data processing device 3420 may be BTLE-enabled (i.e., may include a BTLE interface). In such a case, a BTLE connection may be established between the data processing device 3420 and the secure BT module 3204 of the IoT device 104 and a second network connection may be established between the data processing device 3420 and the IoT service 120. The unlock command may then be received by the data processing device 3420 and applied to the storage 3410 device over the USB connection (or other interface type) between the mass storage device 3400 and the data processing device 3420.

Figure 36:
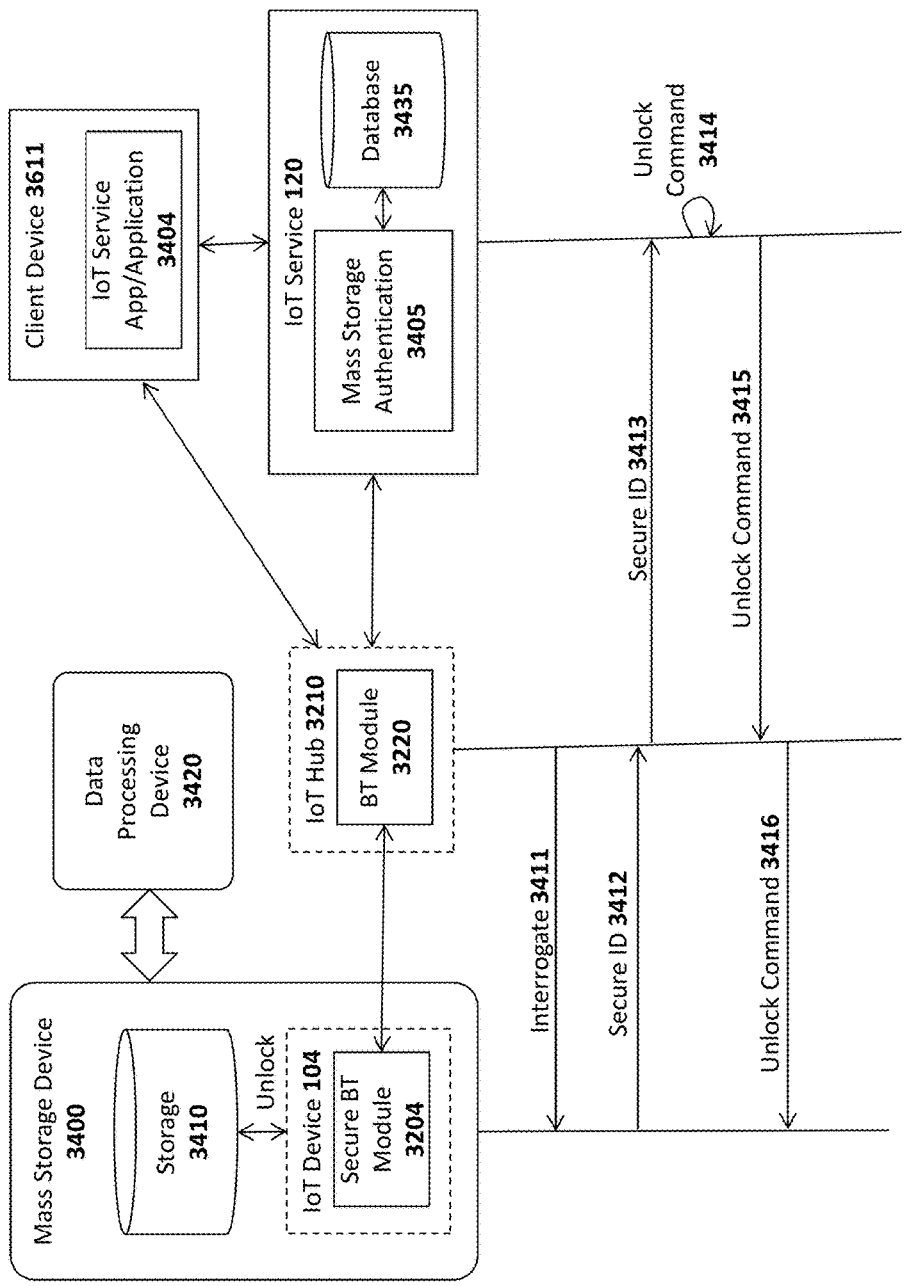
FIG. 36 illustrates another embodiment of the invention which performs authentication through an IoT hub.

FIG. 36 illustrates yet another embodiment in which an IoT hub 3210 is configured within the user's home. In this embodiment, the unlock operations are performed substantially as described above with respect to FIG. 34, with the only difference being that the secure ID and commands are transmitted through the IoT hub 3210 rather than the client device 2811. The process may be initiated from the IoT service app/application 3404 on the client device 2811.

This embodiment may also be configured to detect when the mass storage device leaves the user's home or business (e.g., as in the case if it is stolen). For example, when the connection between the BT module 3220 on the IoT hub 3210 and the secure BT module 3204 on the IoT device 104 has become inoperable, the IoT hub may transmit a "disconnection" notification to the IoT service 120. The IoT service 120 may then transmit a notification to the client device 2811 of the end user. For example, an alert may be generated on the client device 2811 informing the user that the mass storage device is no longer in communication with the IoT hub.

In addition, in one embodiment, the client device 2811 may connect to the IoT hub or IoT device integrated within the mass storage device 3400 to extract diagnostic information. This information may then be used, for example, if the user is having trouble getting a computer to work with the mass storage device 3400. In such a case, the user may use the client device 2811 to view drive health information directly from the drive (i.e., without a computer). This health data may also be fed directly back to the drive manufacturer (e.g., via the user's client device 2811).

In one embodiment, the IoT device 104 and/or IoT hub 3210 integrated within the mass storage device 3400 is powered with a small battery or supercap. Thus, in this embodiment, the secure BT module 3204 may be powered even when the mass storage device 3400 does not have power. Providing a power source to the IoT device in this manner allows a variety of functions to be implemented such as tracking (e.g., if the IoT device has location sensing capabilities), power loss notification, and notifications when the mass storage device is being taken from a monitored area (e.g., as described above, when the radio connection to Hub or phone is lost).

In addition, one embodiment includes a small beeper (like a piezo) to allow the user to remotely "find" a mass storage device or identify one in a collection of drives. For example, the IoT service app/application 3404 may include a "find my storage" feature in which the user enters a request for the beeper to generate a sound. The request may be sent through the IoT service and back to the IoT device within the mass storage device using the secure communication techniques described herein. This beeper may also be used to alert the user if there is a technical problem with the mass storage device (such as when the storage device's internal health checks have identified a problem).

Various types of storage 3410 may be used within the mass storage device 3400 while still complying with the underlying principles of the invention. For example, in one embodiment, the storage 3410 comprises a hard drive. However, various other forms of non-volatile storage may be used for the storage 3410 such as Flash memory.

Apparatus and Method for Internet of Things (IoT) Security Lock and Notification Device As mentioned above, a typical computer security lock comprises a steel cable, one end of which is attached to some immobile object (e.g., a desk, wall, etc.) and the other end attached to a locking mechanism which attaches to a locking affordance on a piece of computer equipment. Limitations of this system include the fact that the locked device can only be moved as far as the steel cable allows. Moreover, the locked device can be stolen by breaking the lock off at the computer (i.e., the computer plastic is the weakest link).

Figure 37:
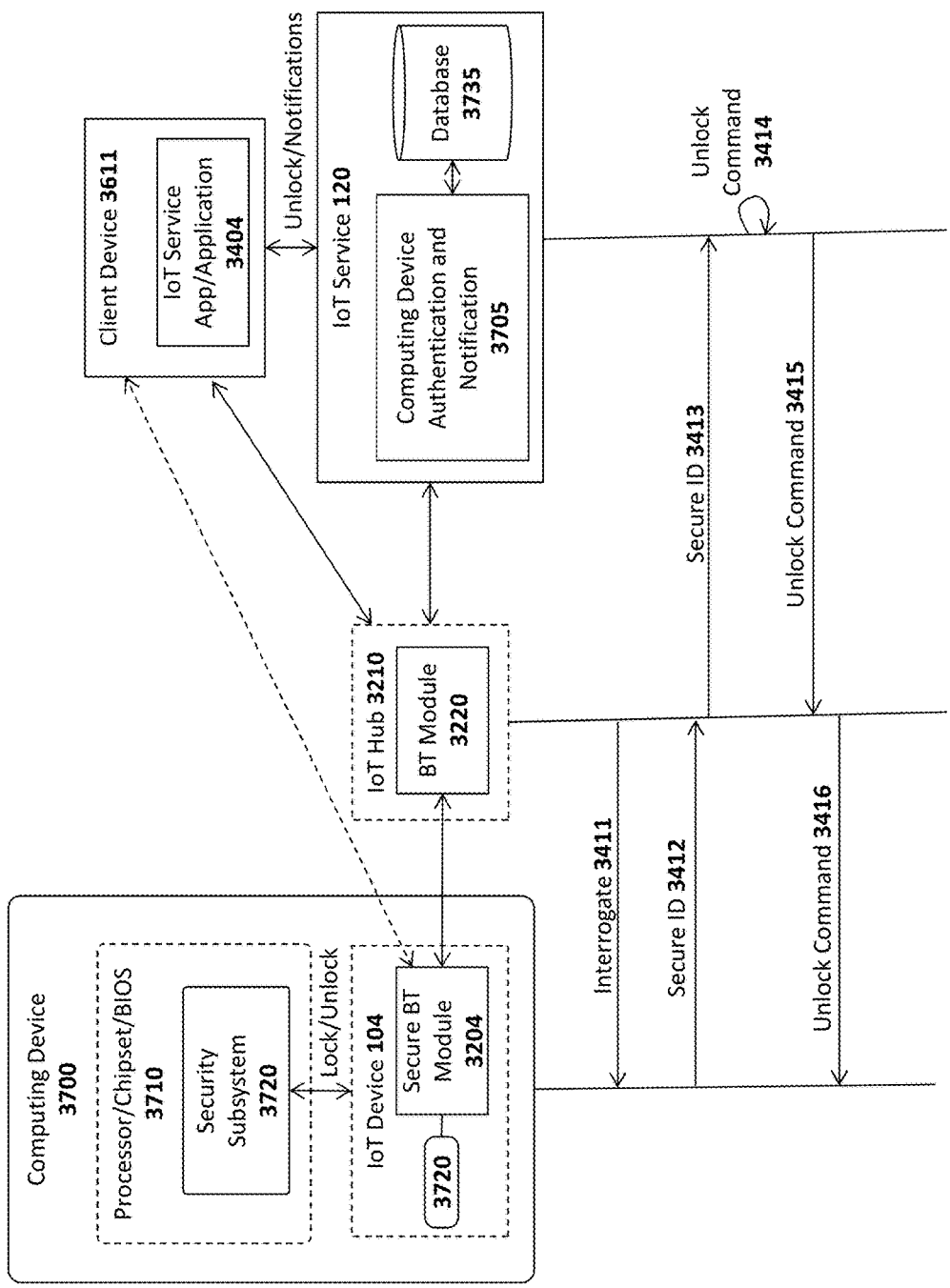
FIG. 37 illustrates one embodiment in which an IoT device is used for security within a computing device.

In one embodiment of the invention, the IoT device or IoT hub is used to perform the function of a security lock and a notification system within a computing device such as a personal computer (e.g., a PC or Mac). FIG. 37 illustrates one such embodiment in which the IoT device 104 is integrated within a computing device 3700 to perform locking and/or notification functions.

In particular, for locking/unlocking the computing device 3700 the IoT device 104 may operate substantially as described above to provide a secure ID 3411 in response to an interrogate command 3411. An authentication and notification module 3705 executed on the IoT service 120 may authenticate the secure ID by querying the database 3735 and, if authenticated, transmit an unlock command 3415-3416. Upon receipt, the IoT device 104 will generate an unlock command/signal to the security subsystem 3720 of the computing device 3700, which (as illustrated) may be implemented at the level of the computing system basic input-output system (BIOS), the chipset and/or the processor 3710. For example, if implemented at the BIOS level, the computing system may be prevented from booting unless the unlock command is received (e.g., Bitlocker or comparable encryption may be used on the mass storage device and the BIOS will not permit boot access without receipt of the unlock command). If implemented at the level of the chipset and/or processor, user access may only be granted access to the operating system if the unlock command is successfully received.

In one embodiment, a power source 3720 such as a rechargeable battery or supercapacitor is integrated within the IoT device 104 and is used to power the IoT device 104 when the computing device 3700 is unpowered. Thus, even when the computing device 3700 is turned off, the techniques described herein may be used to detect when the computing device 3700 is stolen. As described in greater detail below with respect to FIG. 31, one embodiment of the IoT device 104 is integrated on a miniature USB device which receives power from the computing device 3700 when it is powered on, thereby charging the power source 3720.

Figure 38:
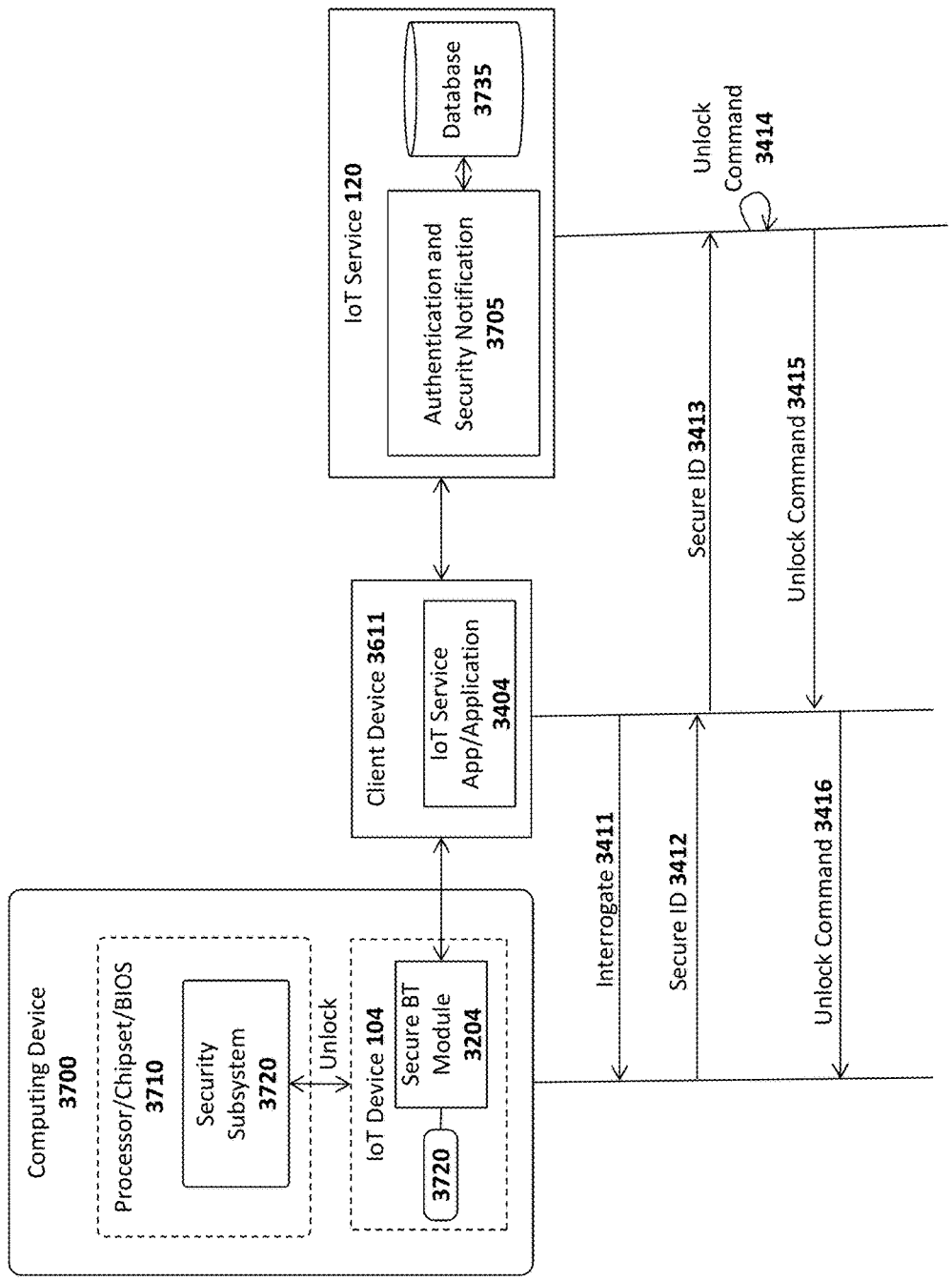
FIG. 38 illustrates another embodiment in which the IoT device establishes a communication channel through a client device.

FIG. 38 illustrates another embodiment in which communication between the IoT device 104 and the IoT service 120 is provided via the client device 3611. This embodiment may operate substantially as described with respect to FIG. 37, with the primary difference being that an IoT hub is not required to support communication. Rather, in this embodiment, the IoT service app/application 3604 provides the conduit for communication between the IoT device 104 and the IoT service 120.

In one embodiment, after implementing the unlock command as described above, the IoT device 104 may periodically search for the IoT hub 3210 and/or client device 3611. When it no longer detects the presence of the IoT hub 3210 and/or the client device 3611 (e.g., such as when the computing device 3700 is stolen), the IoT device 104 may generate a lock command causing the security subsystem to enter into a locked state. In one embodiment, the only way to unlock the security subsystem is to reconnect the IoT device 104 with the IoT hub 3210 or the client device 3611. Alternatively, once locked, the security subsystem 3720 may request an additional layer of authentication to unlock the system such as by prompting the user to enter a secret passcode or to provide biometric authentication (e.g., via a fingerprint reader).

In addition to the locking function described above, in one embodiment, a notification such as an alert is generated when the IoT device 104 is moved outside of the range of the IoT hub 3210 and/or the client device 3611. In particular, when the connection between the IoT device 104 and the IoT hub 3210/client device 3611 is lost, the authentication and notification module 3705 on the IoT service may detect this condition and transmit a notification to the user's client device 3611. Upon receipt of the notification, the user may take steps to investigate the status of the computing device 3700.

In one embodiment, the authentication and security notification module 3705 may receive a periodic "heartbeat" signal from the IoT device 104 when it is connected. Thus, it may detect that the IoT device 104 has been disconnected upon failure to receive such a signal for a specified period of time. In another embodiment, the authentication and security notification module 3705 may periodically request the status of the IoT device 104. Failure to receive a response to a query may indicate that the IoT device 104 is no longer connected and the computing device.

Figure 39:
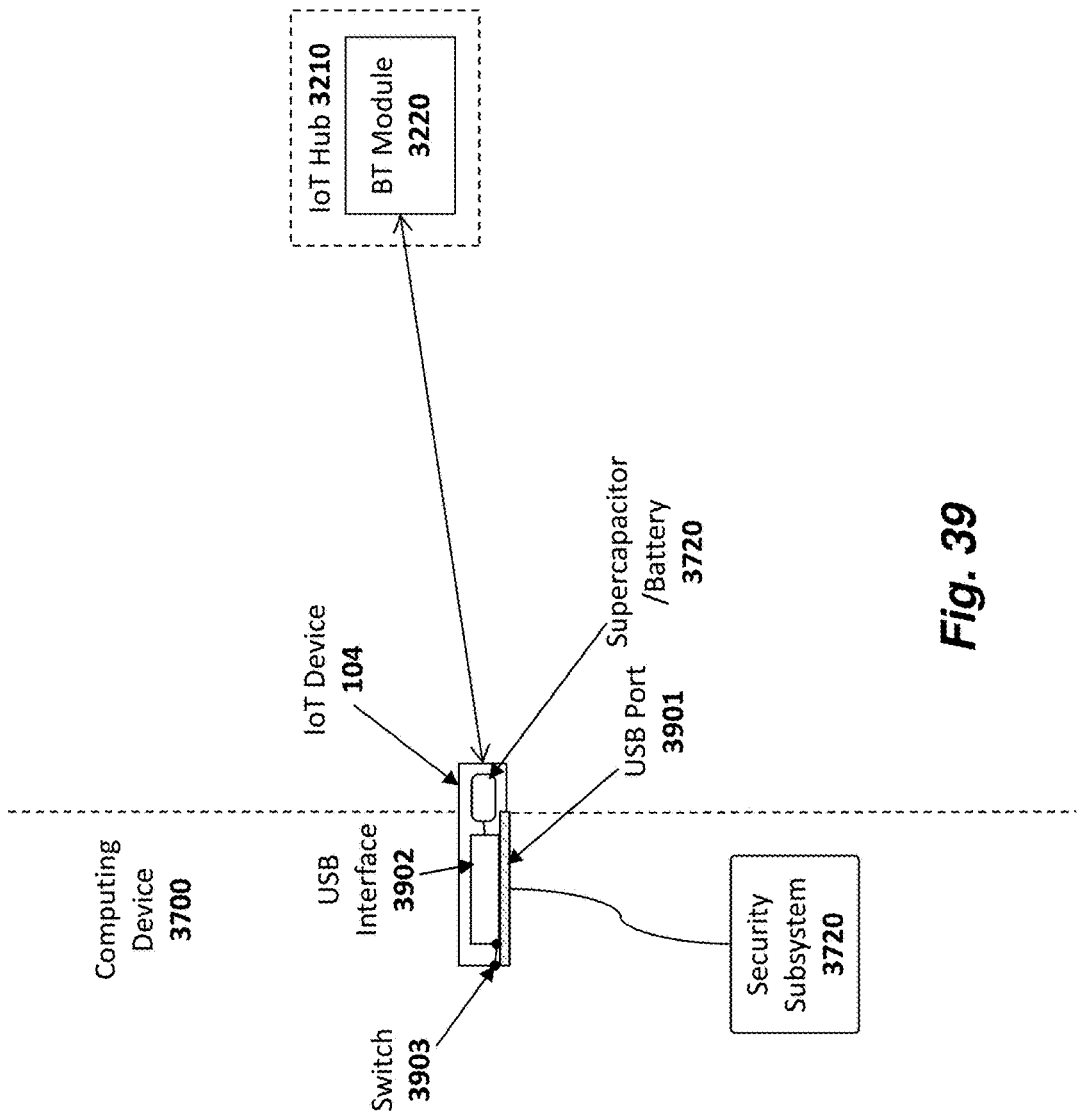
FIG. 39 illustrates one embodiment in which the IoT device is implemented as a USB device.

As mentioned, FIG. 39 illustrates an embodiment in which the IoT device 104 is integrated within a miniature USB package and communicatively coupled to the computing device via a USB port 3901. In particular, USB interface circuitry 3902 within the IoT device 104 supplies power, charging the supercapacitor/battery 3720 when plugged in to the USB port 3901. In one embodiment, an electrical and/or mechanical switch 3903 is included in the IoT device 104 to detect when the IoT device has been inserted and/or removed from the USB port (i.e., being set in one position when removed and a second position when inserted). In one embodiment, when the IoT device 104 is removed from the computing device 3700, the switch triggers and the IoT device responsively generates a notification of the IoT device removal, using power supplied by the supercapacitor/battery 3720. The notification may be sent to the IoT service 120 as described above and passed on to the user's client device 3611 so that the user may investigate the reason for the removal of the IoT device 104.

Internet of Things (IoT) Child Tracking System

Figure 40:
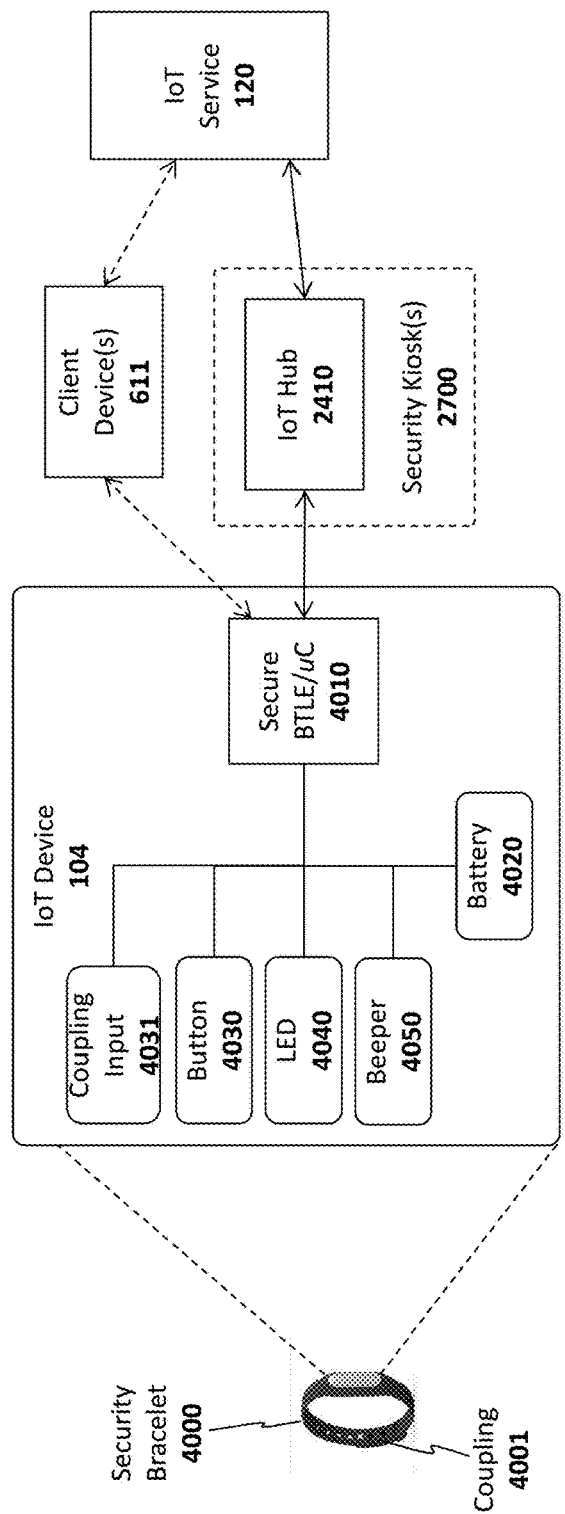
FIG. 40 illustrates an exemplary IoT device implemented within a security bracelet.

One embodiment of the invention comprises an Internet of Things (IoT) child tracking system which provides the ability to locate lost children at malls, events, or any other location with large groups of people, and to generate alarms in response to potential emergency situations. As illustrated in FIG. 40, one embodiment includes a security bracelet 4000 which may be affixed to the arm or leg of a child and which includes IoT device 104 integrated therein. In other embodiments, a different form factor may be used such as a pin to affix the IoT device 104 to an article of clothing (e.g., the child's socks, pants, shoes or shirt). The underlying principles of the invention are not limited to any particular mechanism for attaching the IoT device 104 to a child.

The IoT device 104 may operate substantially as described above. In particular, in one embodiment, the IoT device 104 may automatically connect to various IoT hubs 2410 and/or client devices 611 distributed throughout the location to track the child. Moreover, the IoT device 104 may establish secure communication channels with the IoT service 120 using the various security/encryption techniques described above.

At least some of the IoT hubs 2410 may be integrated within kiosks 4100 strategically positioned throughout the location. As described below, the kiosks 4100 may be used to dispense the security bracelets 4000 and register the child with the IoT security system.

In one embodiment, each IoT device 104 includes a battery 4020 to supply power to the IoT device components, a secure BTLE radio/microcontroller 4010 to securely establish BTLE connections with the IoT hubs 2410 within the kiosks 4100 (e.g., using the communication techniques described above), a beeper 4050 to generate alert signals, one or more LEDs 4040 to generate visible alerts/notifications, and a security button 4030 to manually generate alert conditions.

In one embodiment, the battery 4020 comprises a rechargeable Lithium Ion or similar battery which is automatically recharged when a security bracelet 4000 is deposited into a security kiosk 4100. The LEDs 4020 may include a variety of different colors and may utilize different blink patterns to identify different conditions. For example, when the security bracelet has been registered and associated with a child (e.g., affixed to the arm of a child), the LEDs 4040 may periodically blink to at a reduced rate to provide a notification that the security bracelet is operating correctly and in communication with the system. When an alarm condition is generated, the LEDs may blink at an accelerated rate or may be turned on continuously. In addition, the beeper 4050 may generate a high-pitched alarm sound to notify those in the vicinity of the alarm condition.

Figure 41:
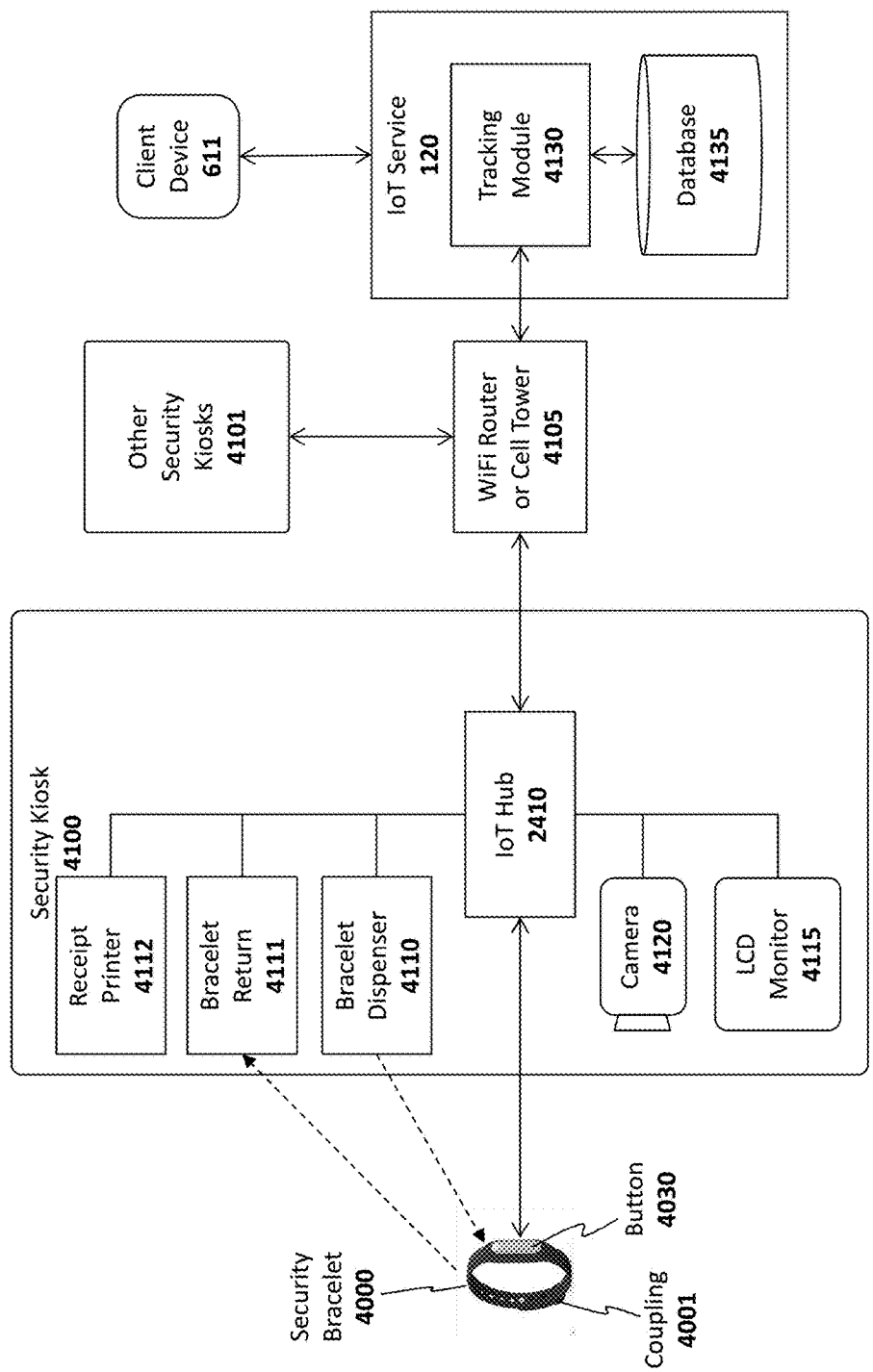
FIG. 41 illustrates an exemplary security kiosk comprising a bracelet dispenser and an IoT hub.

As illustrated in FIG. 41, one embodiment of a security kiosk 4100 includes an IoT hub 2410 to establish local wireless connections with security bracelets 4000 (e.g., using secure BTLE channels) and a cellular and/or WiFi network interface within the IoT hub 2410 to establish a network connection to the IoT service 120 via a WiFi router or cell tower 4105. The illustrated kiosk 4100 includes a bracelet dispenser 4110 for providing security bracelets to parents registering children with the security system and a bracelet return acceptor 4111 into which parents may return the security bracelets when leaving the location. Also illustrated is a camera 4120 for capturing an image of the child and an LCD monitor for providing instructions and receiving input via a graphical user interface (e.g., using a touch screen display). As illustrated the security kiosk 4100 may establish communication with one or more other security kiosks 4101 at the location via the WiFi router or cell tower 4105. In one embodiment, communication between kiosks occurs through the IoT service 120, although such an implementation is not required for complying with the underlying principles of the invention.

In one embodiment, to register a child with the security system, the child and parent arrive at the location, and interact with the kiosk 4100 using the touch-screen LCD monitor 4115. The operations performed by the kiosk 4100 to interact with parents/children and the graphical user interface displayed on the LCD monitor 4115 may be implemented using software executed by a processor in the IoT hub 2410 (e.g., Logic/uC 301) or another general purpose or special purpose processor within the security kiosk 4100 (not shown). Alternatively, the operations performed by the kiosk 4100 may be implemented using an ASIC, FPGA or other type of logic circuit.

In one embodiment, the child is instructed via the LCD monitor 4115 to stand in a location on front of the camera 4120 and look into the camera. An image of the child may be displayed within the LCD monitor 4115 during this process (e.g., with a box surrounding the region where the child's face should be). When the kiosk 4100 detects that a suitable photo can be taken, the camera 4120 captures a photo of the child and the bracelet dispenser 4110 dispenses a security bracelet 4000. In one embodiment, the IoT hub 2410 (or other hardware/software on the kiosk 4100) associates the secure IoT device 104 of the bracelet 4000 with the picture of the child. In addition to taking the picture, the parent may be prompted to enter additional information such as the child's name, an address, and/or a phone number all of which is associated with the IoT device 104.

In one embodiment, the security kiosk 4100 then transmits the photo, the identity of the IoT device 104, and the other information through the cellular/WiFi interface of the IoT hub 2410 and the WiFi router/cell tower 4105, to a tracking module 4130 on the IoT service 120. In one embodiment, the tracking module 4130 stores the association between the IoT device 104, the photo, and any other information related to the child within a database 4135. In one embodiment, each security kiosk 4100 may include local tracking modules and local databases (not shown) to store the same association. In this embodiment, when a new association is made between a child and an IoT device 104, the association is propagated to each kiosk 4101 at the location so that it may be accessed efficiently when needed. In fact, the IoT service 120 is not required in one embodiment or, if it is used, the system will still operate properly when the connection to the IoT service 120 becomes inoperative. For example, all of the security kiosks 4100-4101 at the location may connect with one another over a local area network (e.g., using WiFi or BTLE) to exchange data related to each child and security bracelet 4000. The data for each child may be distributed among all of the kiosks and/or a distributed database or file system may be implemented across the kiosks.

In one embodiment, a receipt printer 4112 prints a receipt containing a QR code or barcode which is also associated with the IoT device 104 and child within the database 4135 and/or on local storage at the kiosks 4100-4101. In one embodiment, rather than printing a physical QR code or barcode (or in addition to printing), the QR code or barcode is texted or emailed to the parent's client device 611. For example, the parent may enter an email address or text number at the kiosk 4100 when registering their child. In one embodiment, an app or application may be installed on the client device 611 which communicates with the IoT service 120 and/or the security kiosks 4100-4101 to receive the QR core or barcode.

In one embodiment, the parent then puts the security bracelet 4000 on the child. In one embodiment, an electro-mechanical coupling 4001 which connects the bracelet to the child is implemented as a sensor input to the IoT device 104. A coupling input 4031 on the IoT device 104 detects when the coupling is opened and closed. Consequently, as described below, when the security bracelet 4000 is decoupled, the IoT device 104 may transmit an alert condition to the security kiosks 4100-4101 which may then then perform security operations related to the decoupling of the security bracelet 4000.

In one embodiment, once the security bracelet 4000 is coupled to the child, the only way for the security bracelet 4000 to be removed without generating an alarm is for the parent to present the QR code or barcode to the kiosk 4100 where the bracelet is returned. In one embodiment, the camera 4120 or another type of QR code/barcode reader at the kiosk 4100 captures the QR code/barcode and the parent is then prompted via the LCD monitor to remove the security bracelet 4000 from the child and return it in the bracelet return 4111.

In one embodiment, when the bracelet is removed without first providing the QR code or barcode, the IoT device 104 transmits an alert notification to the closest kiosk within range. The kiosk then retrieves the photo of the child from the database 4135 using the IoT device 104 identification code (e.g., via communication with the IoT service 120). As mentioned, a copy of the photo may also be retrieved locally at the kiosks 4100-4101 (i.e., if the kiosks maintain a local copy). Once the photo is retrieved, an alarm condition is generated and a photo of the child is displayed on each of the kiosks 4100 at the location along with audible and/or visual alarms. In addition, an alarm notification may be transmitted to the client device(s) 611 of the parent(s).

Similarly, in one embodiment, an alarm notification is sent to the closes kiosk within range when the security button 4030 on the IoT device 104 is pressed. As when the security bracelet 4000 is removed, a photo of the child may be displayed on all of the kiosks at the location.

In one embodiment, an alarm condition is generated when the security bracelet 4000 is detected exiting from the location. For example, in one embodiment, kiosks or stand-alone IoT hubs/devices may be strategically positioned near exits to the location and one or more additional kiosks or IoT hubs/devices may be positioned near the exits but slightly further inside the location. All of the kiosks/IoT hubs may be configured to detect the signal strength received from a security bracelet 4000. In one embodiment, when an IoT hub near an exit detects the signal strength of the bracelet rising and then falling to zero over a period of time, and if a signal from the secure bracelet 4000 is not detected at one or more of the additional kiosks/IoT hubs positioned slightly further inside the location, then this data may indicate that the security bracelet 4000 has exited the location. An alarm condition may then be generated as described above (e.g., displaying the photo of the child on each of the kiosks). In one embodiment, one or more kiosks or IoT hubs may be strategically positioned outside of the location and an exit condition may be detected in response to one of these kiosks or IoT hubs receiving a signal from a security bracelet.

FIGS. 42-46 illustrate a sequence of operations which may be performed by the kiosks and security bracelets to implement an IoT security system in accordance with embodiments of the invention.

Figure 42:
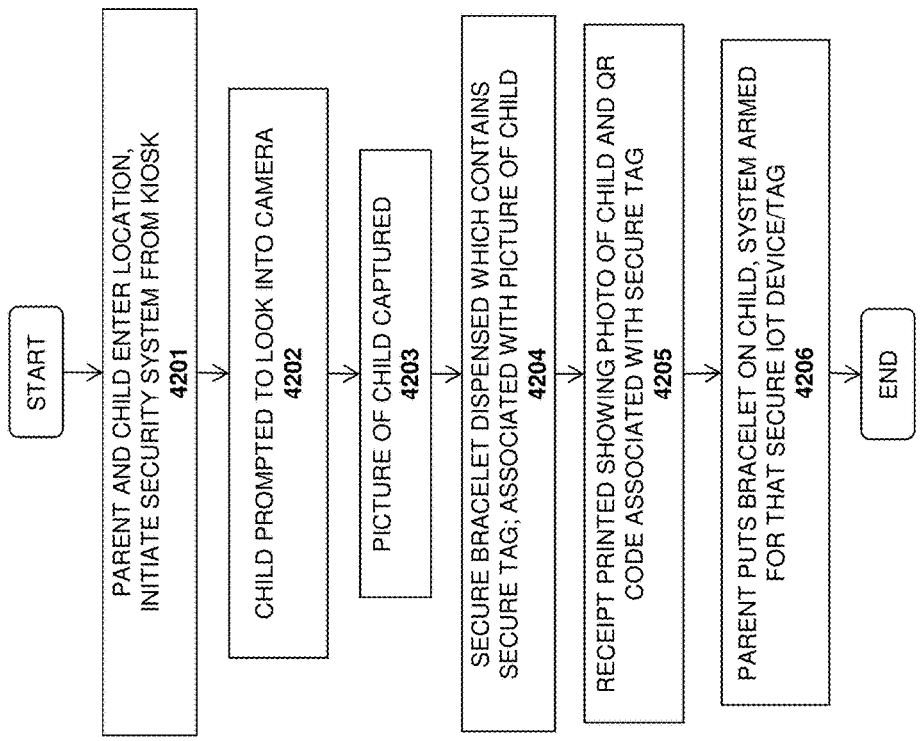
FIG. 42 illustrates one embodiment of a method for registering with an IoT child security system.

In FIG. 42, a parent and child enter a particular location (e.g., a museum, a mall, an event, etc) and initiate the security system from a particular kiosk. At 4202, the child is prompted to move into position and look into the camera and, at 4203, a picture of the child is captured. In one embodiment, image detection logic detects when the child's face is in the proper position. In another embodiment, a button may be selected (e.g., on the GUI) to take the picture. At 4204, the secure bracelet with an integrated secure IoT device (sometimes referred to as a "secure tag") is dispensed and the picture of the child and any other relevant information (e.g., a parent's phone number) is associated with the secure IoT device. At 4205, a receipt is printed showing a photo of the child and a QR code associated with the secure IoT device. Alternatively, as mentioned, the receipt may be transmitted to the parent via a text or email message. At 4206, the parent connects the secure bracelet on the child, thereby arming the system with the secure IoT device contained within the secure bracelet.

Figure 43:
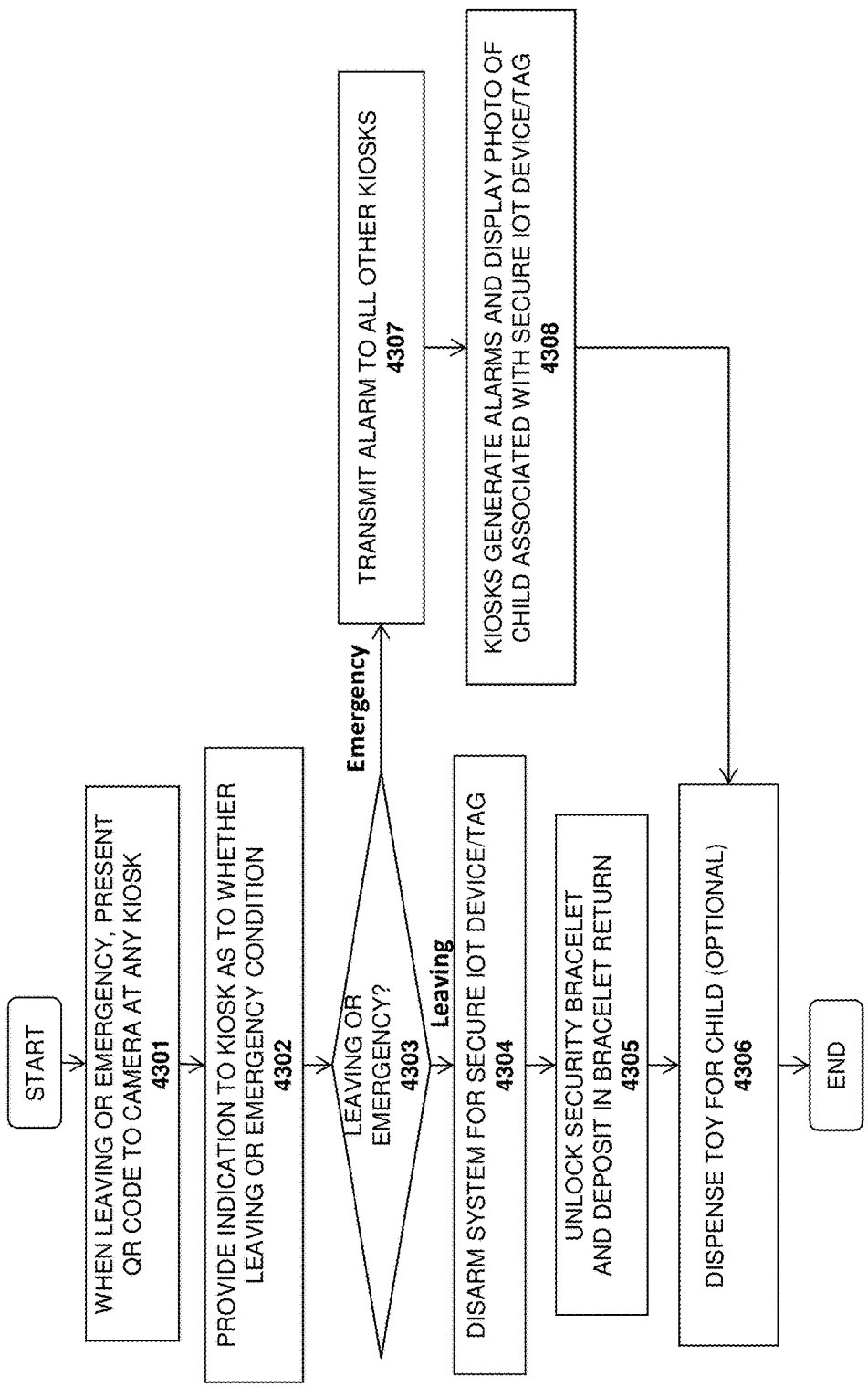
FIG. 43 illustrates one embodiment of a method for de-registering from the security system or generating an alert condition.

FIG. 43 illustrates a method through which the parent may interact with the kiosk to generate an emergency condition or to return the secure bracelet and leave the location. At 4301, the parent presents the QR code to the camera at any kiosk in the system. At 4302, the parent provides an indication as to whether the parent and child are leaving or whether there is an emergency (e.g., the child is lost). If an emergency, determined at 4303, then at 4307, an alarm is transmitted to all kiosks. At 4308, a picture of the child associated with the secure tag/IoT device is displayed at all kiosks.

If the parent provides an indication that they parent and child are leaving, then at 4304, the system is disarmed for the secure IoT device. At 4305, the parent may safely unlock the security bracelet and deposit the bracelet back in the bracelet return of the kiosk. At 4306, as an optional step, a toy may be dispensed for the child.

Figure 44:
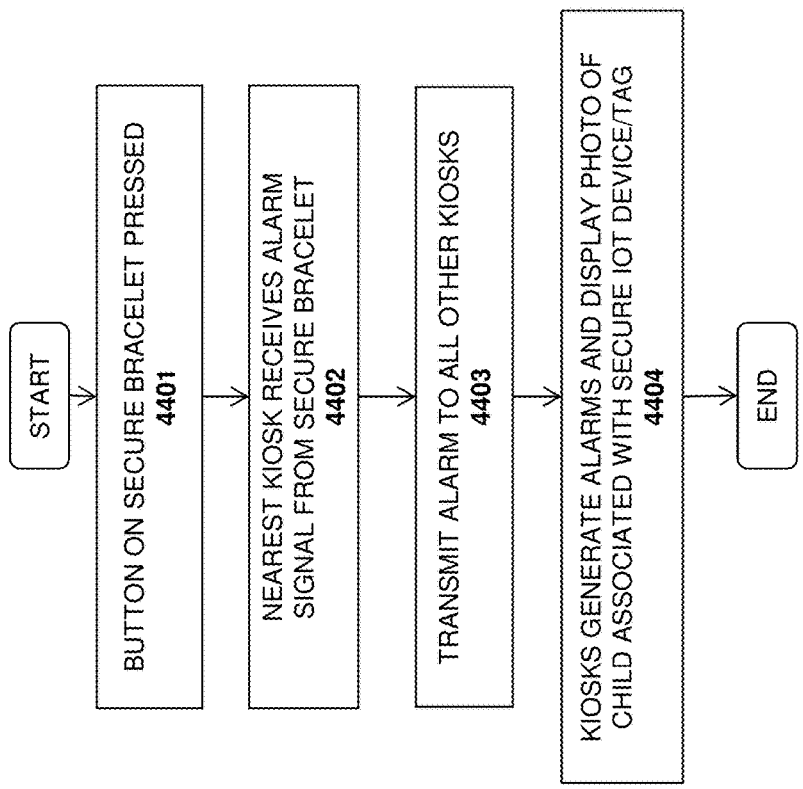
FIG. 44 illustrates one embodiment of a method for generating an alarm condition using a security bracelet.

FIG. 44 illustrates another embodiment of a method for generating an alarm condition after a secure bracelet has been dispensed and associated with a child. At 4401, the security button is pressed on the secure bracelet. At 4402, the nearest kiosk receives the alarm signal generated by the IoT device within the secure bracelet. At 4403, the alarm condition is transmitted to all other kiosks at the location. Finally, at 4404, all of the kiosks generate alarms and display the video of the child associated with the secure IoT device.

Figure 45:
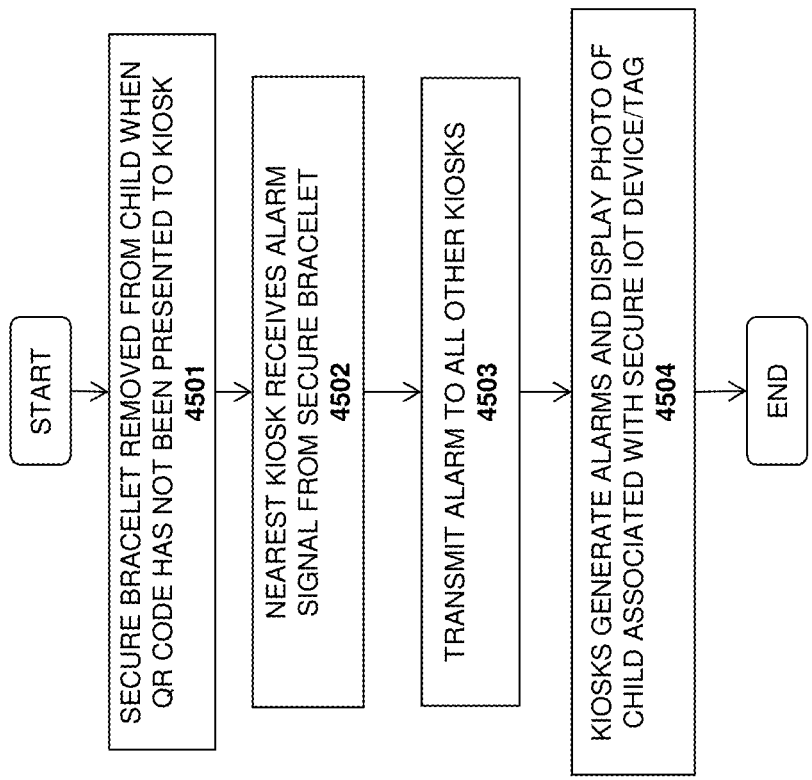
FIG. 45 illustrates one embodiment of a method in which an alarm condition is generated in response to removal of the security bracelet.

FIG. 45 illustrates another embodiment of a method for generating an alarm condition when the secure bracelet is removed from the child. At 4501, the secure bracelet is removed from the child at a time when the QR code or barcode has not been presented to the kiosk for authentication. Consequently, at 4502, the secure IoT device in the secure bracelet transmits an alarm to the nearest kiosk at 4502 which forwards the alarm to all of the other kiosks. At 4504, the kiosks generate alarms and display photos of the child associated with the secure IoT device/tag.

Figure 46:
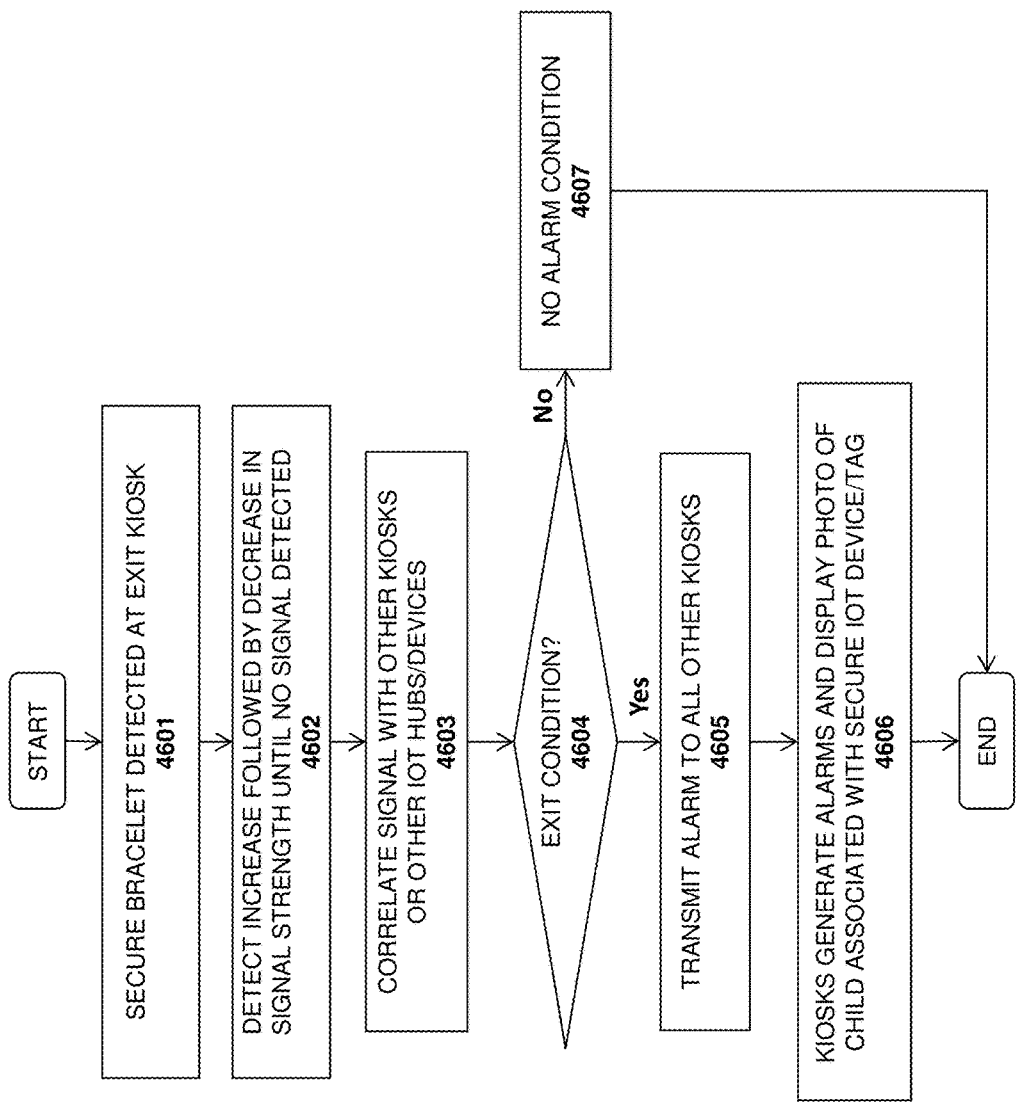
FIG. 46 illustrates one embodiment of a method in which an alarm condition is generated in response to detecting a bracelet exiting a location.

FIG. 46 illustrates another embodiment of a method for generating an alarm condition when the secure bracelet is detected to exit the location. At 4601, the secure bracelet is detected at an exit kiosk (i.e., a kiosk strategically positioned near an exit). At 4602, an increase in signal strength is detected, followed by a decrease in signal strength until no signal is detected (indicating that the security bracelet may have passed by the kiosk or separate IoT hub/device). At 4603, the signal is correlated with other kiosks, IoT hubs or IoT devices. For example, as mentioned, additional kiosks or IoT hubs/devices may be positioned within a specified distance from the exits (i.e., further in towards the center of the location). If a kiosk/IoT hub/device positioned at the exit detects an increase in signal strength of the secure bracelet followed by a decrease and then no signal, the system will check to determine whether the additional kiosks or IoT hubs/devices positioned further in to the location see a signal from the secure bracelet. If no signal is detected at these additional kiosks or IoT hubs/devices, then an exit condition may be determined at 4604 and an alarm condition may be generated at 4605 and each of the kiosks may generate alarms and display a photo of the child associated with the secure bracelet at 4606. The correlation among the kiosks/IoT hubs/devices may be done via communication through the IoT service or through direct, local communication among the kiosks and IoT hubs/devices (e.g., which may be connected over a WiFi LAN or via chained BTLE connections).

If, on the other hand, the additional kiosks or IoT hubs/device detect a signal from the secure bracelet when correlated with the signals measured form the exit kiosks at 4602, then an exit condition is not identified at 4604 (i.e., because the secure bracelet has been detected further in towards the location). Consequently, at 4607 no alarm condition is generated.

Apparatus and Method for Crowd and Asset Tracking

In one embodiment, the various tracking techniques described above (or subsets thereof), and the additional embodiments set forth below, may be used to implement asset and/or crowd tracking capabilities with robust user management and notifications. In particular, these techniques may be used to support on-premises theft prevention and crowd and asset tracking within a specified location such as a home or business by monitoring the location of IoT devices attached to users and/or protected assets. In one embodiment, the IoT hubs described herein may be embedded within existing assets such as computer docks, laptop cabinets, wireless routers, printers, etc., positioned throughout a given location to provide more location granularity and more precise asset/user tracking. Using multiple distributed hubs, for example, RSSI measurements may be used as described above to accurately track the location of IoT devices affixed to users and assets.

Various different types of assets may be tracked for different applications including, but not limited to laptops, desktops, projectors, medical equipment, tools, machinery, printers, copiers, shredders, storage device, etc., using the platforms and methods described herein. Embodiments of the invention also provide the ability for network managers to set up alerts according to asset's proximity to one another, to specific location(s) (e.g., identified by the presence of IoT hubs or other devices) and/or to individual(s) with wearable security IoT devices.

The user/crowd monitoring and management techniques described herein may be used in various organizations including, but not limited to, schools, hospitals, factories, and businesses. These techniques may be employed to ensure, for example, that certain individuals are in particular areas (e.g., in a particular room), certain individuals are NOT in particular areas, certain individuals are in particular areas together, certain individuals are in particular areas at certain designated times, and/or to detect when a wearable security IoT device has been detached from the user. In one embodiment, if the desired conditions are not being met, an alarm within the IoT device may be activated and/or notifications may be sent to the IoT service, and ultimately transmitted to one or more interested users (e.g., managers or security personnel).

Figure 47:
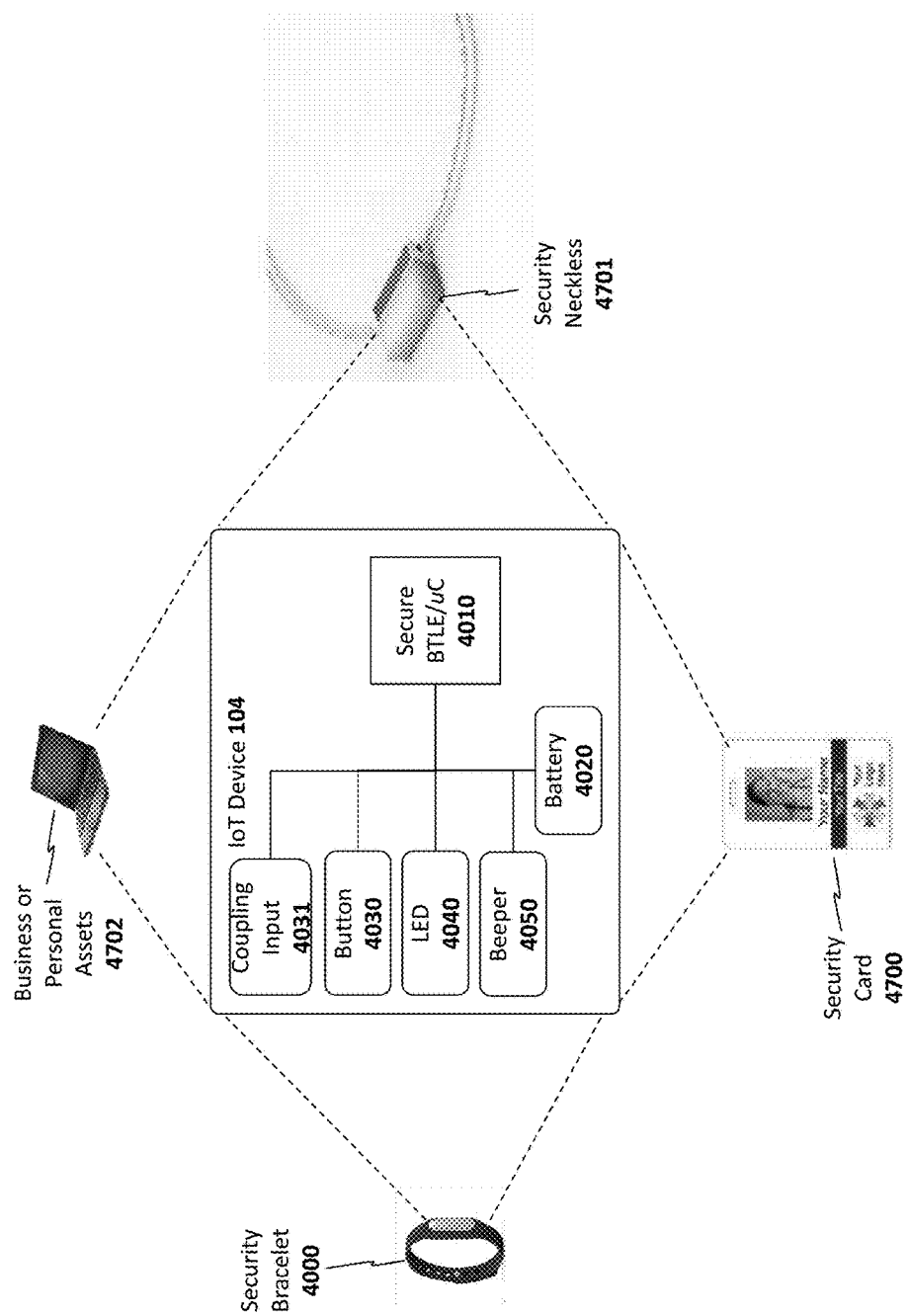
FIG. 47 illustrates different security IoT device implementations.

As illustrated in FIG. 47, an IoT device 104 having the features described above, may be integrated in various different form factors including a security bracelet 4000 (described above), a security card 4700, a security neckless 4701 and embedded or affixed to business/personal assets 4702. The level of precision with which these various IoT devices may be tracked will depend on the number of IoT hubs or other IoT devices positioned throughout a given location. For example, with a significant number of IoT hubs distributed in a location, signal strength measurements may be collected to precisely triangulate the position of each IoT device 104. By contrast, if only a single IoT hub is within range of a given IoT device 104, then the IoT device may be tracked with a lower level of granularity.

Figure 48:
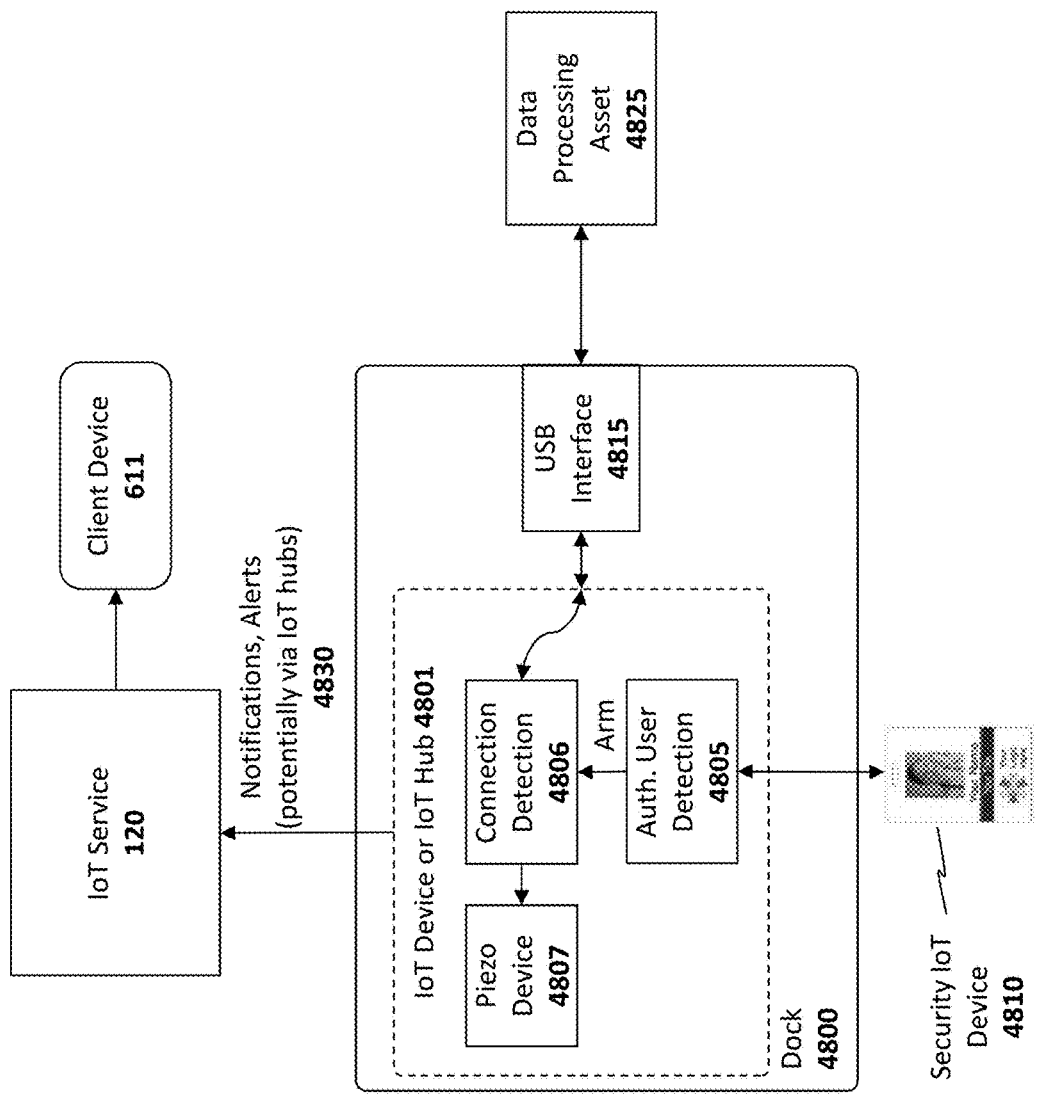
FIG. 48 illustrates one embodiment of the invention for protecting a data processing asset.

FIG. 48 illustrates one particular implementation for protecting a data processing asset 4825 (e.g., a computer), in which an IoT device or IoT hub 4801 (hereinafter referred to simply as IoT hub 4801) is embedded within a docking station 4800 connected to the data processing asset 4825 through a USB interface 4815 (or other form of docking connector). In one embodiment, authorized user detection logic 4805 implemented by the IoT hub 4801 detects when a security IoT device 4810 of an authorized user is within range (e.g., by connecting with the IoT device over a BTLE or other wireless channel). In one embodiment, if no security IoT device 4810 of an authorized user is within range, then a connection detection module 4806 on the IoT hub is armed to monitor the USB (or other) connection with the data processing asset 4825. In one embodiment, upon detecting that the data processing asset 4825 has been detached from the USB interface 4815, the connection detection logic 4806 will trigger a piezo device 4807 (or other form of audible alert unit) to generate an audible alarm. In addition, the IoT hub 4801 may transmit an alert or other notification 4830 to the IoT service 120, which may forward the notification/alarm to client devices 611 of interested users (e.g., managers, security personnel, etc). In one embodiment, the users to be notified are securely authenticated with the IoT service and are registered to receive such alerts/notifications. The notified users may then take steps to determine the cause of the alerts/notifications.

Significantly, if an authorized user is in the vicinity of the dock 4800, then the authorized user detection logic 4805 will not arm the connection detection logic 4806, and the user may detach the data processing asset 4825 without generating an alert condition. For example, if the data processing asset 4825 is a notebook/laptop computer, then the user may decouple the computer from the dock 4800 at the end of the day (e.g., to take the computer home) without generating an alert. However, if an unauthorized user attempts to take the computer, an alarm condition will be generated.

In one embodiment, the IoT device or IoT hub 4801 is integrated within the USB cable connecting the data processing asset 4825 and the dock 4800. In this embodiment, the connection detection logic 4806 may detect a disconnection based on current/voltage levels and generate an alert condition as in the other embodiments.

The dock 4800 may comprise any type of computer dock and may be connected to the data processing asset 4825 over a variety of different interface types. For example, in one embodiment, the dock is used to communicatively couple the data processing asset 4825 to a monitor, a network connection (e.g., Ethernet) and a plurality of USB devices. In this embodiment, the connection between the dock 4800 and the data processing asset 4825 may be a proprietary interface designed by the manufacturer of the data processing asset (rather than or in addition to USB). The connection detection logic 4806 may be configured to detect the detachment of the proprietary interface.

Figure 49:
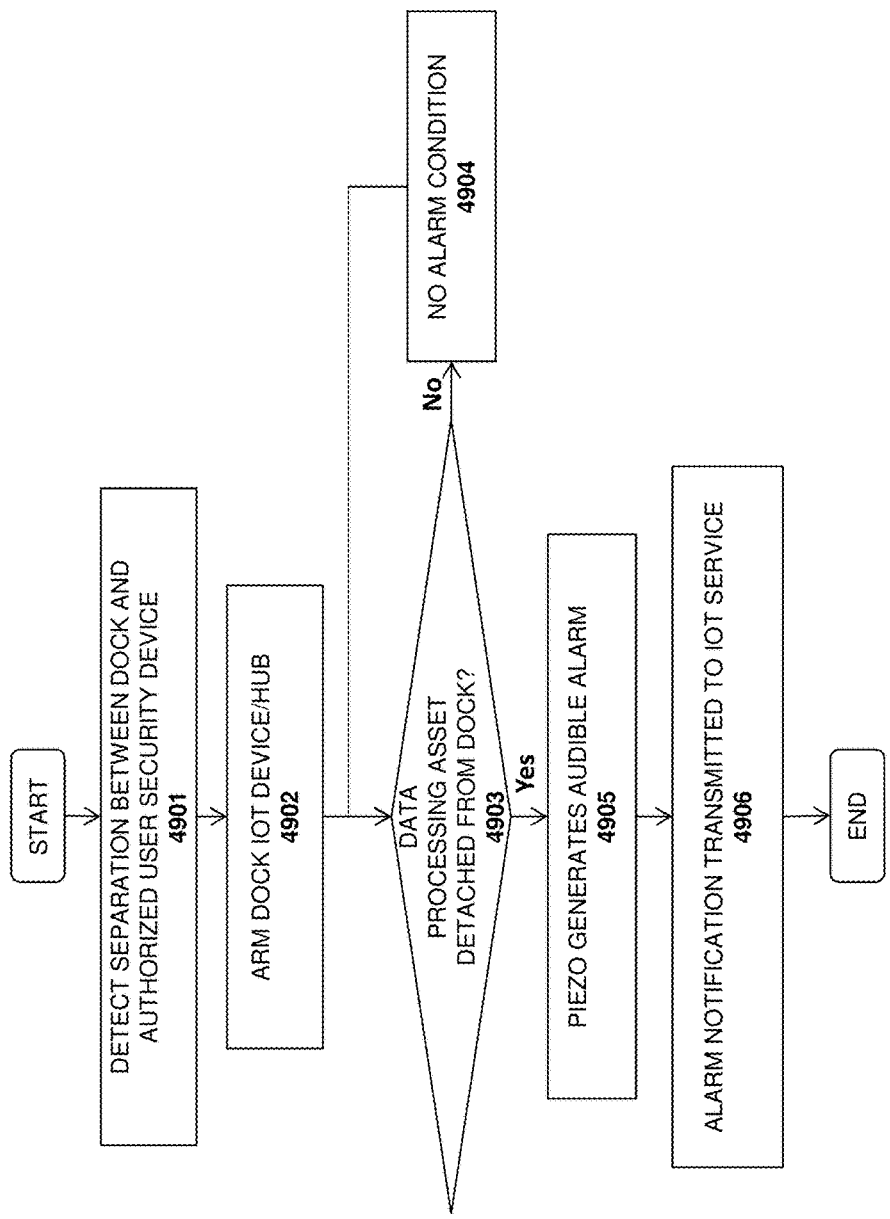
FIG. 49 illustrates one embodiment of a method for protecting a data processing asset.

A method in accordance with one embodiment of the invention is illustrated in FIG. 49. The method may be implemented within the context of the system architectures described herein, but is not limited to any particular system architecture.

At 4901, a separation between a dock and an authorized user security device is detected. For example, the authorized user may have left the room with his/her security IoT device 4810. In response, at 4902, the dock is armed. If the data processing asset is detached from the dock, determined at 4903, then the piezo is triggered to generate an audible alarm at 4905 and, at 4906, an alarm notification is transmitted to the IoT service from which it may be distributed to one or more registered users. As long as the data processing asset is not detached from the dock at 4903, no alarm condition is generated at 4904.

Figure 50:
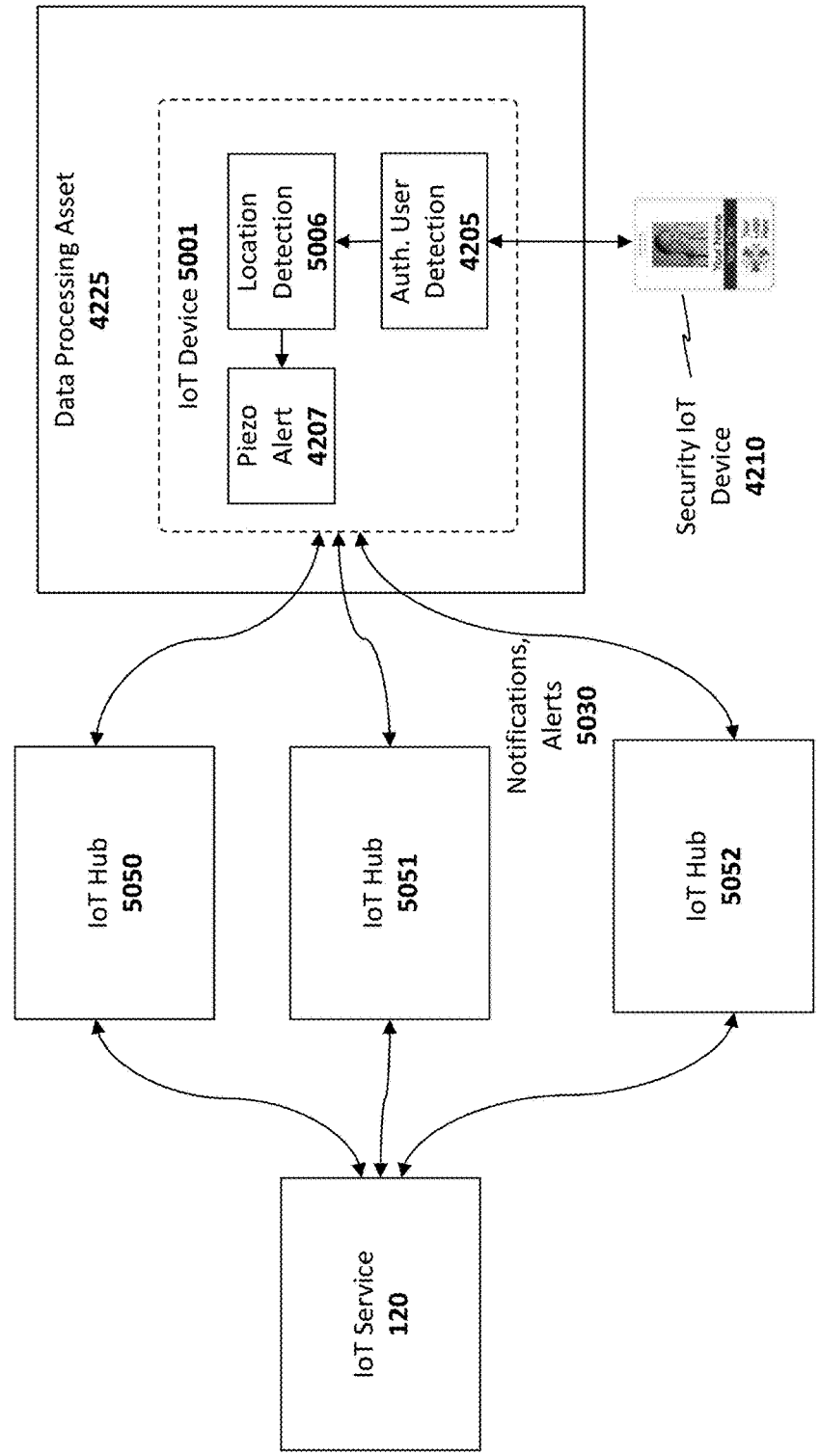
FIG. 50 illustrates one embodiment of the invention for tracking the location of a data processing asset and generating notifications/alerts.

FIG. 50 illustrates another embodiment in which the data processing asset 4825 is itself equipped with an IoT device 5001 to track the current location of the data processing asset. In particular, the IoT device 5001 may connect to one or more IoT hubs 5050-5051 to determine its current location, which may be determined at various levels of granularity depending on the techniques used and the number of IoT hubs to which it connects. For example, with a plurality of IoT hubs within range, signal strength measurements may be used to precisely track the location of the IoT device 5001 (e.g., using the techniques described above).

In operation, authorized user detection logic 4805 implemented by the IoT device 4801 detects when a security IoT device 4810 of an authorized user is within range (e.g., by connecting with the IoT device over a BTLE or other wireless channel). In one embodiment, if no security IoT device 4810 of an authorized user is within range, then a location detection module 5006 on the IoT hub is armed to monitor the current location of the data processing asset 4825 based on the current IoT hub(s) 5050-5052 which the IoT device 5001 can currently see (i.e., which IoT hubs have a detectable wireless signal and potentially the strength of each signal). For example, measuring signal strength from each IoT hub 5050-5051, the IoT device may be able to identify its current location with precision. Alternatively, the currently location may be determined with less precision such as by simply being able to detect a connection to a particular IoT hub.

In one embodiment, upon detecting that the IoT device 5001 has moved outside of a designated location (e.g., because it can no longer see an IoT hub and/or it can see an IoT hub outside of the designated location) the location detection logic 5006 will trigger a piezo device 4807 (or other form of audible alert unit) to generate an audible alarm. In addition, the IoT device 5001 may transmit an alert or other notification 5030 to the IoT service 120, which may forward the notification/alarm to client devices 611 of interested users (e.g., managers, security personnel, etc). As in prior embodiments, the users to be notified are securely authenticated with the IoT service 120 and are registered to receive such alerts/notifications. The notified users may then take steps to determine the cause of the alerts/notifications.

Figure 51:
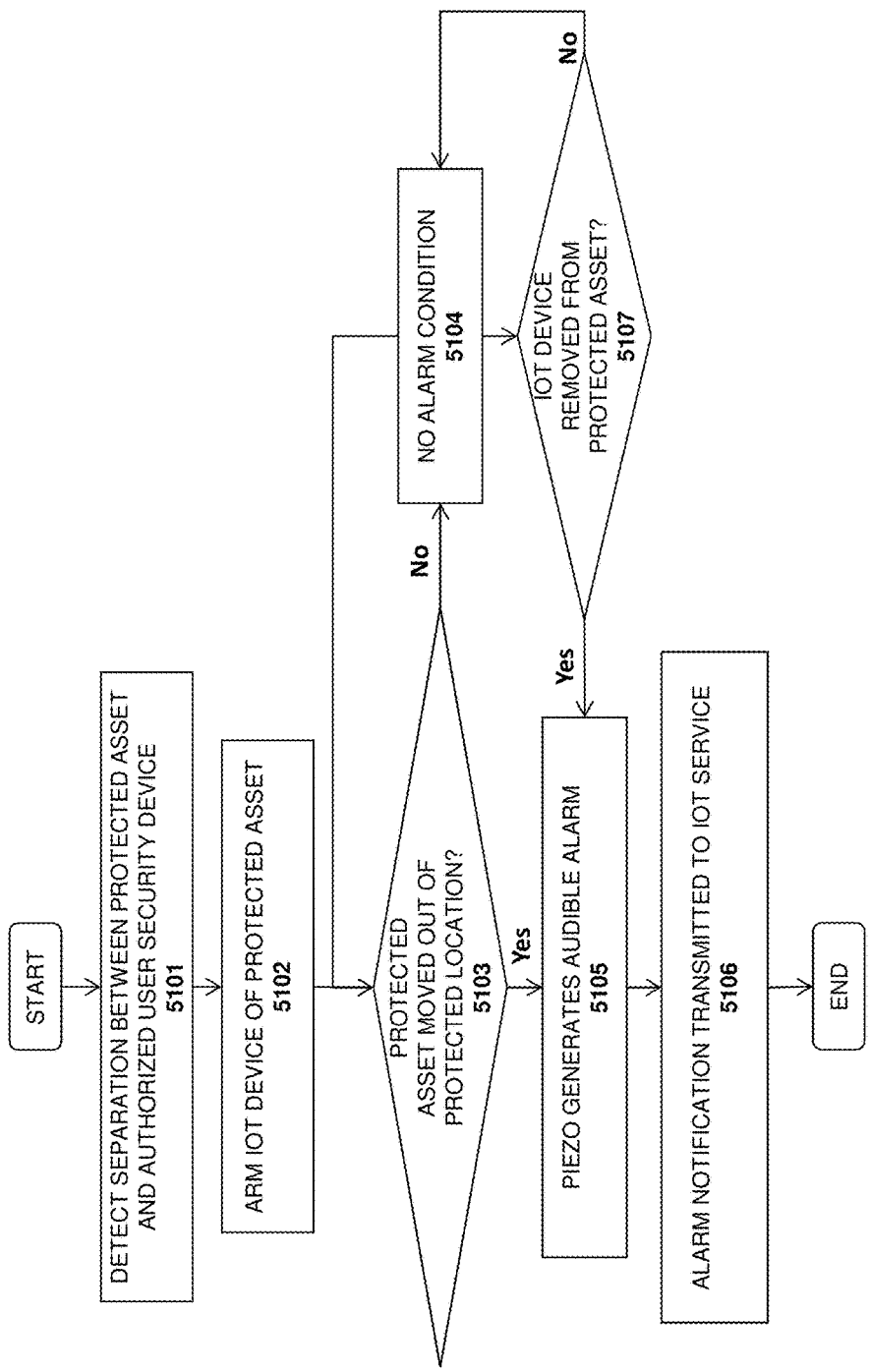
FIG. 51 illustrates one embodiment of a method for tracking the location of a data processing asset and generating notifications/alerts.

A method in accordance with one embodiment of the invention is illustrated in FIG. 51. The method may be implemented within the context of the system architectures described herein, but is not limited to any particular system architecture.

At 5101, a separation between an IoT device of a protected asset and an IoT device of an authorized user security device is detected (e.g., because one cannot see the wireless signal of the other). For example, the authorized user may have left the room with his/her security IoT device. In response, at 4302, the IoT device of the protected asset is armed. At 5103, a determination is made as to whether the data processing asset has been moved out of a protected location. As mentioned, this may be accomplished using signal strength measurements from IoT hubs or other IoT device. In addition, signal strength measurements from IoT hubs outside of the protected area may indicate that the IoT device has been moved. If so, then the piezo is triggered to generate an audible alarm at 5105 and, at 5106, an alarm notification is transmitted to the IoT service from which it may be distributed to one or more registered users. As long as the data processing asset is not moved outside of the protected location at 5103, no alarm condition is generated at 5104.

In one embodiment, a determination is made at 5107 as to whether the IoT device has been removed from the protected asset. In one embodiment, a switch on the IoT device is configured to trigger when removed from the protected asset. If so, then the piezo is triggered to generate an audible alarm at 5105 and, at 5106, an alarm notification is transmitted to the IoT service from which it may be distributed to one or more registered users.

The embodiments of the invention described above may be implemented for various specific applications including within schools, hospitals and clinics, and construction sites. For example, in a school environment, these embodiments provide the ability to track assets such as laptops, projectors, and other school equipment by affixing/embedding IoT devices within such equipment. Alerts may be set up if certain assets leave certain areas of the school or leave the school altogether.

In addition, the described embodiments provide the ability to track students and staff using wearable IoT devices. The current location of each student may then be accessed via a client device connected to the IoT service. Moreover, alerts may be set up if certain individuals should not be together in certain areas (e.g., for bullying prevention), or if a student leaves the school. The IoT hubs may be set up in laptop carts, cabinets, or other locations for more precise location tracking. In addition, these techniques may be used to grant students and teachers temporary access to certain areas of the school (e.g., not triggering an alert during certain times of the day).

In a hospital & clinic environment, the techniques described herein may be used to track costly medical equipment and to set up alerts if certain assets leave certain designated areas or leave the hospital/clinic. In addition, using the wearable IoT devices as described herein, patients and staff may be tracked around the hospital/clinic. Alerts may be generated if certain individuals should not be together in certain areas (e.g., chemo patients and radiation areas), or if they leave the floor or clinic/hospital. IoT hubs may be included in various places such as laptop carts and medical cabinets for more precise tracking. In one embodiment, the techniques described above may be used to protect narcotics cabinets. For example, only designated users may be permitted to access such cabinets. If an IoT device of an authorized user is not detected nearby, the IoT hub/device within the narcotics cabinet may be armed and will then generate an alert/notification when opened.

In another embodiment, the techniques described herein are applied to a construction site environment, providing the ability to track assets such as laptop, tools, and various types of construction equipment. Alerts may be set up if certain assets are detected outside of certain designated areas. This embodiment also provides the ability to track workers and staff as in prior embodiments (e.g., tracking the users' mobile phones and/or wearable IoT devices). In addition, alerts may be generated if certain individuals should not be together, in certain areas (workers on probation and areas with heavy machinery), or if they leave a particular areas or site. As in prior embodiments, the IoT hubs may be embedded in various devices such as heavy machinery and/or on the structure being built.

The embodiments of the invention described herein may be used in various other/alternate environments than those described above including, for example, any temporary or permanent checkpoint or access gate (e.g., TSA checkpoints) and factory floors.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A system for protecting a data processing asset comprising:
   a plurality of Internet of Things (IoT) hubs distributed throughout a facility;
   a plurality of wearable IoT security devices, each of the plurality of wearable IoT security devices is assigned to a different user, the plurality of wearable IoT security devices comprise one of: security badges, security bracelets and security necklaces;
   an IoT service to store an association between each of the plurality of wearable IoT security devices and each respective user;
   at least one IoT hub of the plurality of IoT hubs comprising:

authorized user detection logic to detect a wearable IoT security device of a user in wireless proximity to the at least one IoT hub through a Bluetooth Low Energy (BTLE) link;

a dock for the data processing asset, the dock including connection detection logic to detect a local connection of the data processing asset through a wired data connection, the data processing asset is removable from the dock without causing an alert and/or notification when the wearable IoT security device is in the wireless proximity to the at least one IoT hub;

wherein the authorized user detection logic is to arm the connection detection logic upon detecting that the wearable IoT security device has moved out of the wireless proximity to the at least one IoT hub due to a loss of the BTLE link;

wherein the connection detection logic is to generate an alert and/or notification after being armed by the authorized user detection logic upon detecting no local connection of the data processing asset due to a loss of the wired data connection and the data processing asset is no longer within the designated protected area, the alert and/or notification being transmitted from the at least one IoT hub to the IoT service via a secure communication channel using elliptic curve encryption.

2. The system as in claim 1 further comprising:
a piezo device integrated on the at least one IoT hub to generate an audible alarm responsive to the alert and/or notification generated by the connection detection logic.

3. The system as in claim 1 further comprising:
a wired interface to provide the local connection between the data processing asset and the at least one IoT hub.

4. The system as in claim 3, wherein the wired interface comprises a Universal Serial Bus (USB) interface.

5. The system as in claim 3, wherein the data processing asset comprises a notebook or desktop computer.

6. The system as in claim 1 further comprising:
a client device of a user registered on the IoT service to receive the alert and/or notification generated by the connection detection logic, the alert and/or notification to be transmitted from the IoT service to the client device over the Internet.

7. A system for protecting a data processing asset comprising:
a plurality of Internet of Things (IoT) hubs distributed throughout a facility in communication with an IoT service;
a plurality of wearable IoT security devices, each of the plurality of wearable IoT security devices is assigned to a different user, the plurality of wearable IoT security devices comprise one of: security badges, security bracelets and security necklaces;
the IoT service to store an association between each of the plurality of wearable IoT security devices and each respective user;
an IoT device comprising:
authorized user detection logic to detect a wearable IoT security device of a user in wireless proximity to the IoT device through a Bluetooth Low Energy (BTLE) link, the IoT device is affixed or integrated within the data processing asset,
location detection logic to determine a current location of the IoT device based on signal strength values received from a first subset of the plurality of IoT hubs within wireless range of the IoT device affixed or integrated within the data processing asset;
wherein the authorized user detection logic is to arm the location detection logic upon detecting that the wearable IoT security device has moved out of the wireless proximity to the IoT device due to a loss of the BTLE link; and
wherein the location detection logic is to generate an alert and/or notification after being armed by the authorized user detection logic upon detecting that the IoT device has moved outside of a designated protected location based on receiving different signals from a second subset of the plurality of IoT hubs within wireless range of the IoT device affixed to or integrated within the data processing asset, the alert and/or notification being transmitted from the IoT device to the IoT service via a secure communication channel using elliptic curve encryption.

8. The system as in claim 7 further comprising:
a piezo device integrated on the IoT device to generate an audible alarm responsive to the alert and/or notification generated by the connection detection logic.

9. The system as in claim 7, wherein the plurality of IoT hubs are positioned at different locations.

10. The system as in claim 9, wherein the location detection logic is to determine the current location of the IoT device based on a set of IoT hubs from which it can receive wireless signals.

11. The system as in claim 10, wherein the location detection logic is to determine the current location based on signal strength values of the signals received from the first subset of the plurality of IoT hubs.

12. The system as in claim 11 further comprising:
a client device of a user registered on the IoT service to receive the alert and/or notification generated by the connection detection logic, the alert and/or notification to be transmitted from the IoT service to the client device over the Internet.

13. The system as in claim 7, wherein the data processing asset comprises a notebook or desktop computer.

* * * * *